United States Patent
Murakami

(10) Patent No.: US 9,446,786 B2
(45) Date of Patent: Sep. 20, 2016

(54) ARM STOPPER MECHANISM MOUNTING APPARATUS AND STEERING APPARATUS USING SAME

(71) Applicant: Showa Corporation, Gyoda-shi (JP)

(72) Inventor: Takuya Murakami, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/668,403

(22) Filed: Mar. 25, 2015

(65) Prior Publication Data

US 2016/0090117 A1     Mar. 31, 2016

(30) Foreign Application Priority Data

Sep. 25, 2014    (JP) .................. 2014-195766

(51) Int. Cl.
- B62D 5/02    (2006.01)
- B62D 7/22    (2006.01)
- B62D 5/04    (2006.01)

(52) U.S. Cl.
CPC . *B62D 5/02* (2013.01); *B62D 5/04* (2013.01); *B62D 5/0403* (2013.01); *B62D 7/228* (2013.01)

(58) Field of Classification Search
CPC ....... B62D 5/02; B62D 5/0403; B62D 7/228
USPC .......................................................... 180/444
See application file for complete search history.

(56) References Cited

U.S. PATENT DOCUMENTS

| | | | |
|---|---|---|---|
| 6,003,887 A * | 12/1999 | Howard | B62D 7/22 280/89.11 |
| 2007/0175696 A1 | 8/2007 | Saito et al. | |

FOREIGN PATENT DOCUMENTS

JP    2007-196927 A    8/2007

* cited by examiner

*Primary Examiner* — Joseph Rocca
*Assistant Examiner* — Felicia L Brittman
(74) *Attorney, Agent, or Firm* — Leason Ellis LLP

(57) ABSTRACT

Disclosed is an arm stopper mechanism mounting apparatus including: an output shaft; a housing that is provided with a hole for inspecting the sealability of the interior thereof; a sealing member that seals the hole, and can be detached from the hole when the sealability is inspected; and an arm stopper mechanism that has a steering arm and a stopper. The steering arm includes an output shaft hole into which the output shaft is fitted; two tie rod holes to which the tie rods are respectively attached; and two striking surfaces which strike against the stopper. The stopper includes two contact surfaces. An angle made by the two contact surfaces of the stopper is greater than an angle made by the two striking surfaces of the steering arm, and is 90° or greater.

7 Claims, 27 Drawing Sheets

(SCHEMATIC CONFIGURATION WHEN SEEN FROM BELOW)

(SCHEMATIC CONFIGURATION WHEN SEEN FROM BELOW)

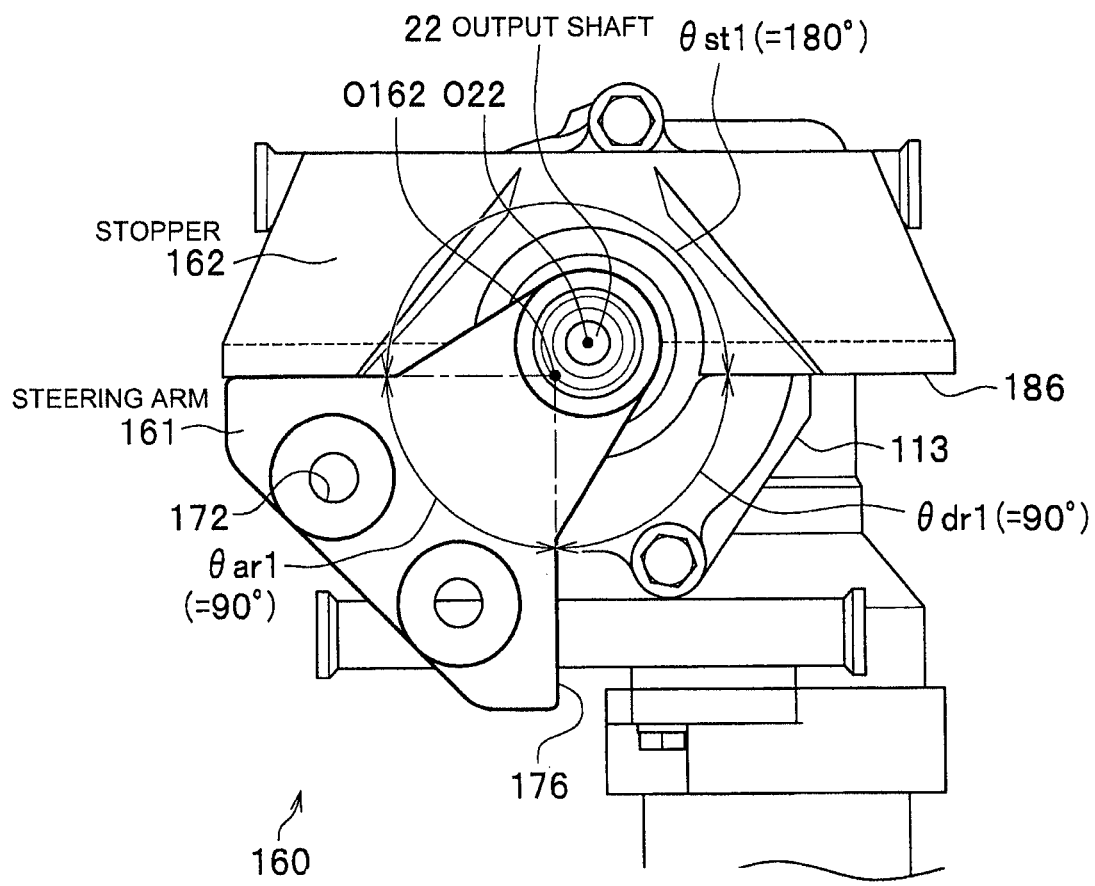

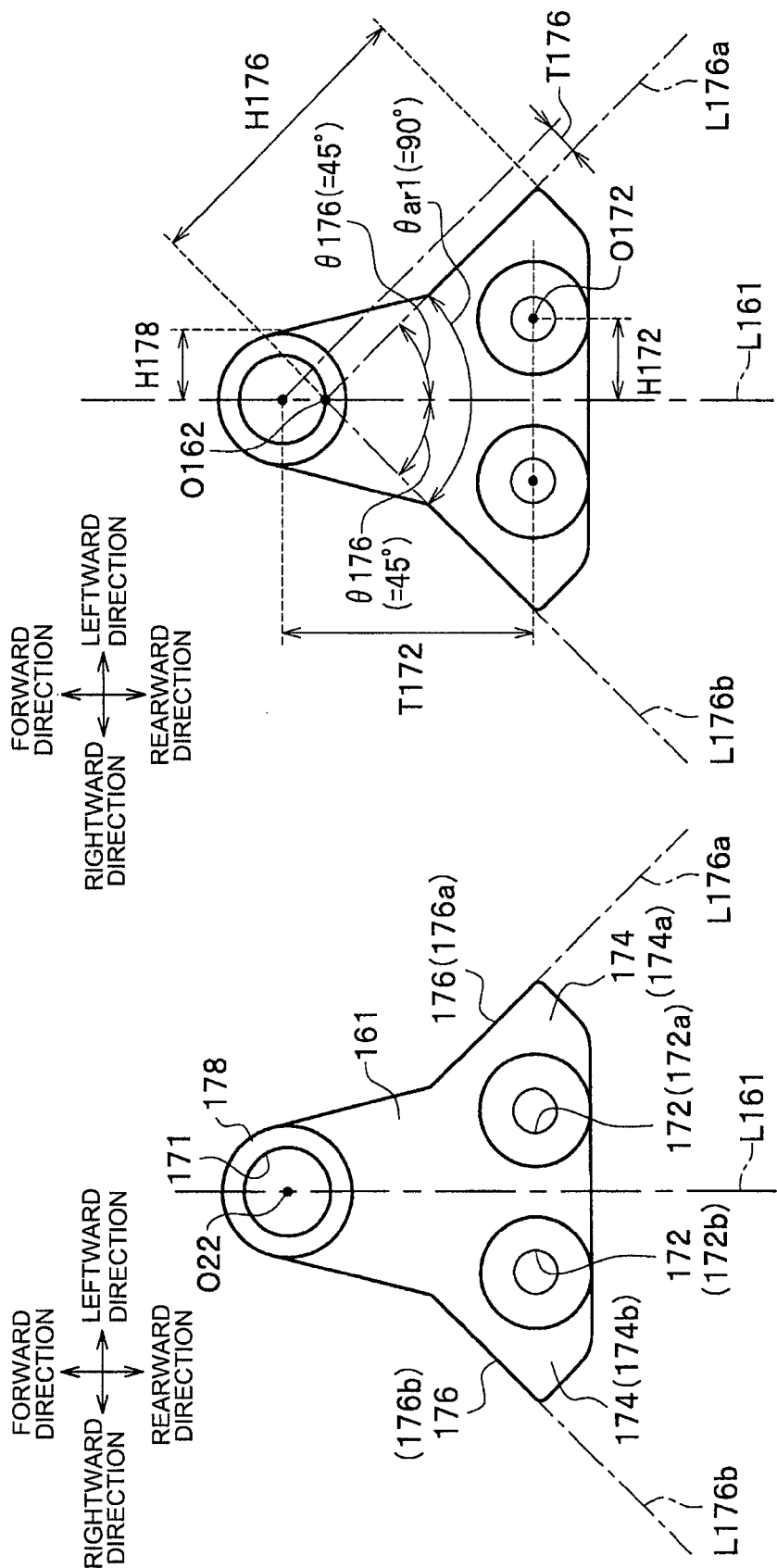

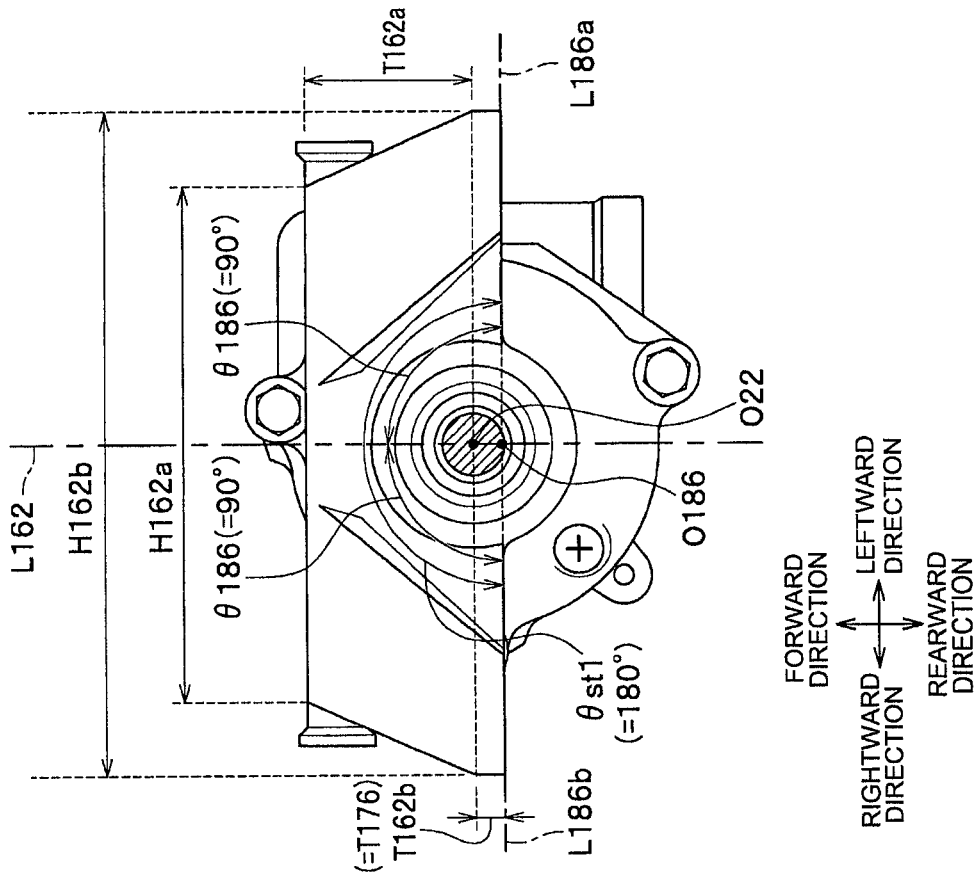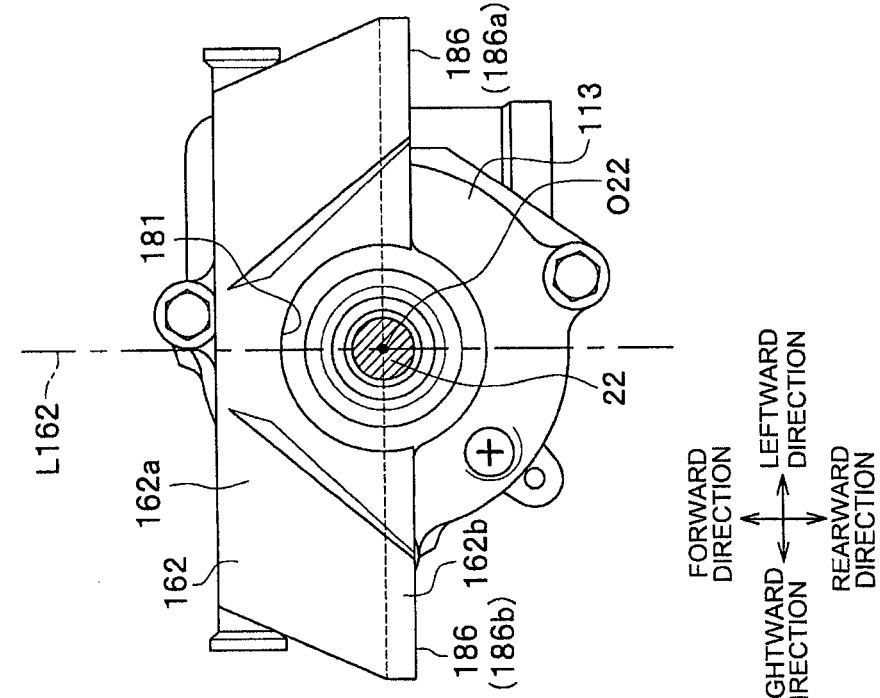

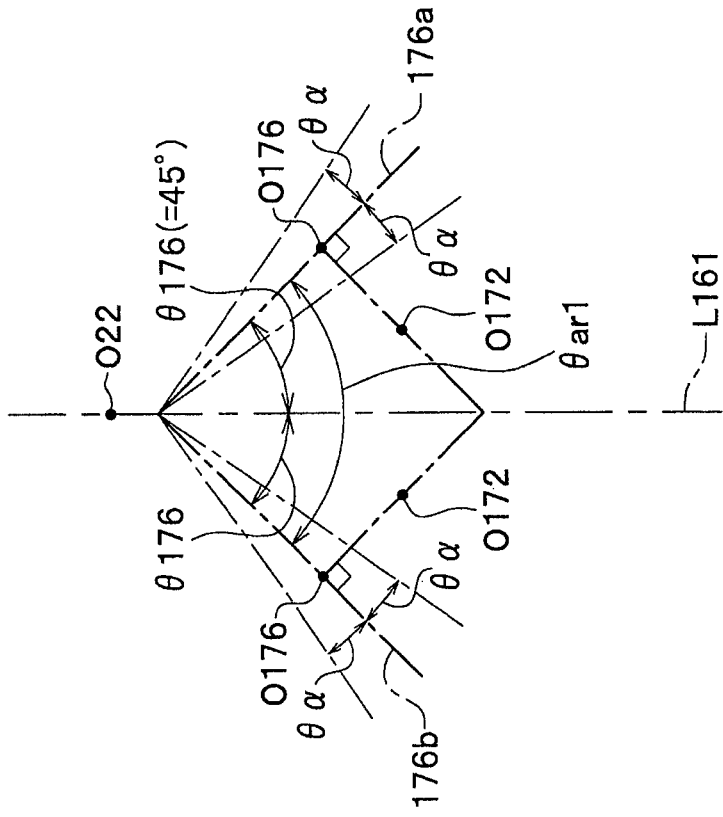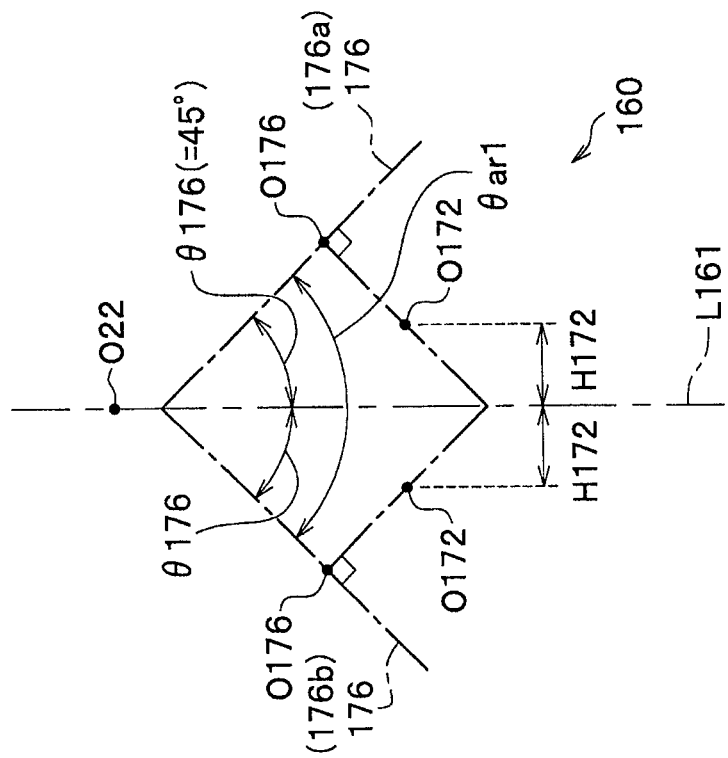

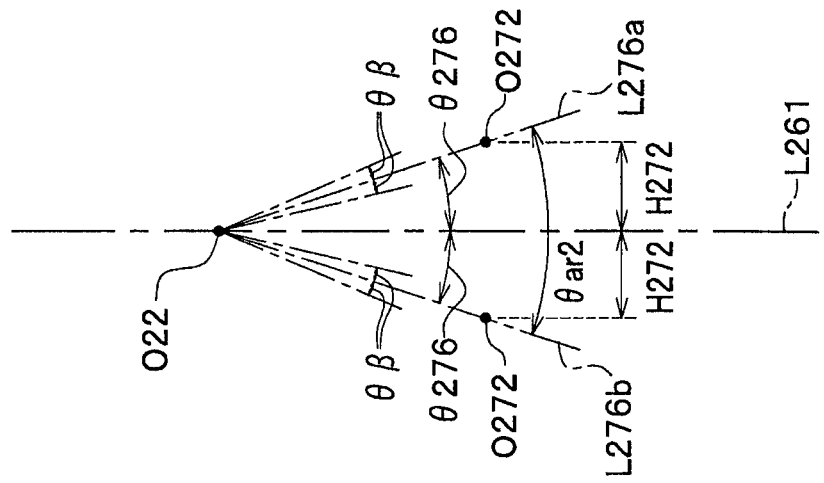
FIG. 20C
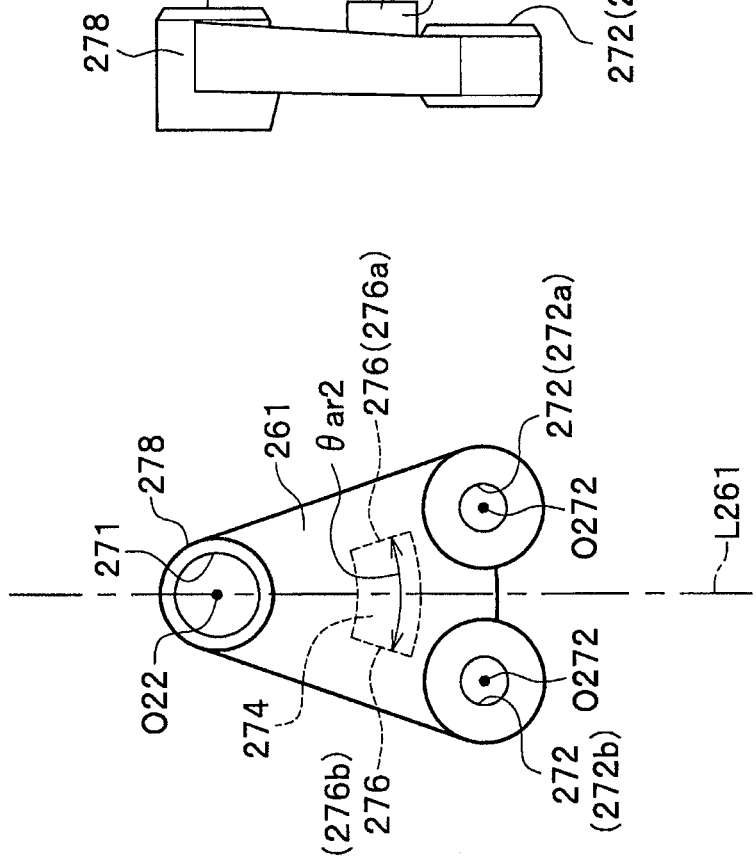
FIG. 20B
FIG. 20A

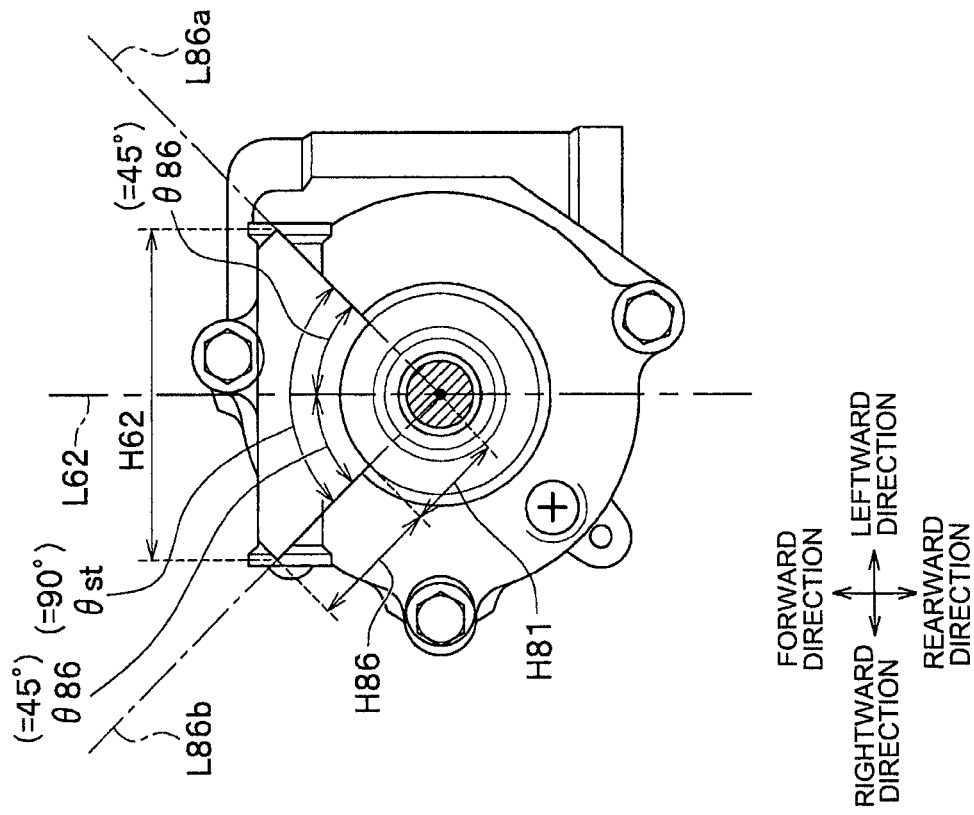
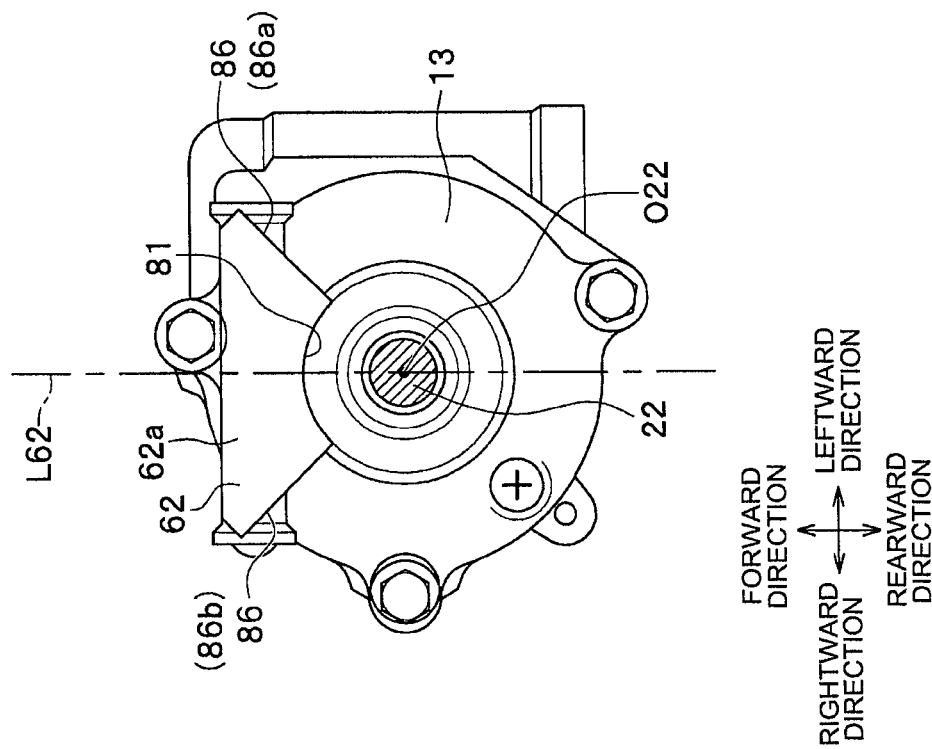

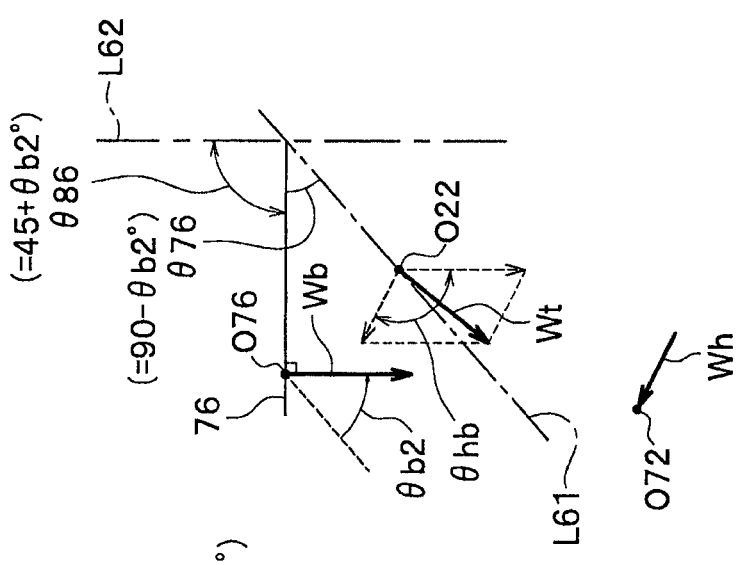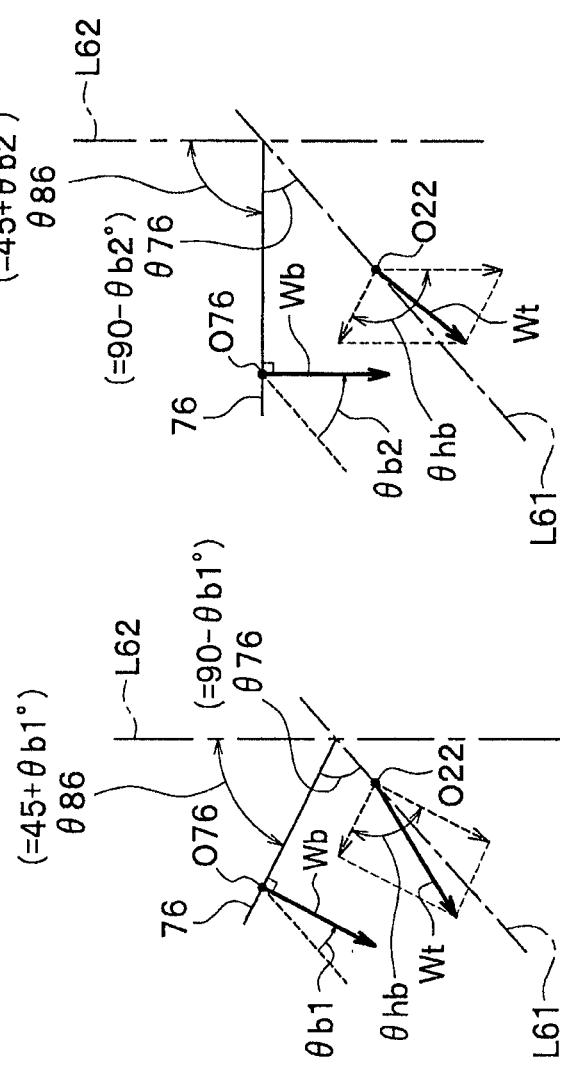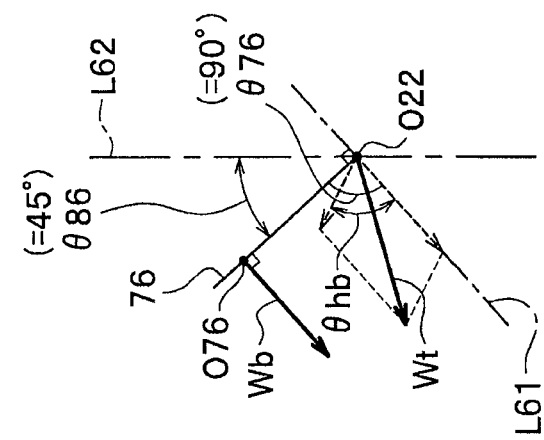

ARM STOPPER MECHANISM MOUNTING APPARATUS AND STEERING APPARATUS USING SAME

CROSS-REFERENCE TO RELATED APPLICATIONS

This application claims the benefit of Japanese Patent Application JP 2014-195766, filed Sep. 25, 2014, the entire content of which is hereby incorporated by reference, the same as if set forth at length.

BACKGROUND OF THE INVENTION

1. Field of the Invention

The present invention relates to an arm stopper mechanism mounting apparatus on which an arm stopper mechanism for restricting the turning angle of a steering arm to which tie rods are respectively attached is mounted, and to a steering apparatus using the arm stopper mechanism mounting apparatus.

2. Description of Related Art

In a saddle-type vehicle such as an all terrain vehicle (ATV), a steering apparatus (particularly, a motor-driven power steering apparatus) is installed between a steering shaft of handlebars and a steering member of wheels (front wheels). The motor-driven power steering apparatus is an apparatus that supplements a steering force applied by a driver on the handlebars with an assist torque that is generated from an electric motor.

The motor-driven power steering apparatus has built-in members such as an input shaft, a torsion bar, and an output shaft. The input shaft is connected to the steering shaft of the handlebars. The torsion bar connects the input shaft and the output shaft. A steering arm is attached to the output shaft (for example, refer to JP-A-2007-196927) (FIG. 2).

The steering arm is a steering member of the wheels (front wheels). The steering arm is configured to turn about the output shaft. The steering arm is provided with tie rod holes to which tie rods are respectively attached. The wheels are respectively connected to the tie rods.

When the driver turns the handlebars to the maximum steering angle or greater in a clockwise direction or a counter-clockwise direction, the motor-driven power steering apparatus is required to restrict the turning of the handlebars in such a manner that a vehicle does not roll over in a lateral direction. While the vehicle is traveling on a rough road, even without the driver's turning of the handlebars, an external force originating from a protrusion (convex portion) or the like on a road surface may be input to the motor-driven power steering apparatus and the handlebars via the wheels (front wheels), and thereby this may turn the handlebars to the maximum steering angle or greater. Even in this case, the motor-driven power steering apparatus is required to restrict the turning of the handlebars in such a manner that the vehicle does not roll over in the lateral direction. The motor-driven power steering apparatus is provided with an arm stopper mechanism for such a function which restricts the turning angle of the steering arm via a stopper.

The stopper is provided to protrude downward from a lower surface of a housing of the motor-driven power steering apparatus. When the driver turns the handlebars to the maximum steering angle or greater in the clockwise direction or the counter-clockwise direction, or when the handlebars turn to the maximum steering angle or greater due to an external force that is input via the wheels (front wheels), a striking surface of the steering arm strikes against a contact surface of the stopper. Accordingly, the turning angle of the steering arm is restricted by the arm stopper mechanism via the stopper, and thereby the turning of the handlebars is restricted.

In this motor-driven power steering apparatus, when a bending load applied to the output shaft increases, an excessive load may be applied to a bearing that supports the output shaft, or to a housing in the vicinity of the bearing. Accordingly, in the motor-driven power steering apparatus, a bending load is preferably prevented from being applied to the output shaft.

SUMMARY OF THE INVENTION

However, for example, the motor-driven power steering apparatus in the related art has the following problems (1) and (2).

(1) The motor-driven power steering apparatus in the related art has a problem in that since the arm stopper mechanism in the related art is not configured to prevent a bending load from being applied to the output shaft, a relatively large bending load may be applied to the output shaft, which will be described below.

For example, when one striking surface of the steering arm strikes against one contact surface of the stopper, the value of a bending load vector, which is applied to the output shaft and bends the output shaft, is the value of a combined vector of an input load vector which is input from the wheels via the tie rods, and a striking load vector which is applied to the striking surface of the steering arm from the stopper.

For this reason, as the angle made by the respective directions of the input load vector and the striking load vector decreases, the value of the bending load vector tends to increase. In contrast, as the angle made by the respective directions of the input load vector and the striking load vector increases, the value of the bending load vector tends to decrease.

Accordingly, for example, when the angle made by the respective directions of the input load vector and the striking load vector is an acute angle (angle of 0° or greater and less than 90°), the value of the bending load vector becomes greater than the value of a combined vector which is obtained when the input load vector is orthogonal to the striking load vector. In contrast, when the angle made by the respective directions of the input load vector and the striking load vector is an obtuse angle (angle of 90° to 180°), the value of the bending load vector becomes less than or equal to the value of a combined vector of the input load vector and the striking load vector which are orthogonal to each other.

When the striking surface of the steering arm is in contact with the contact surface of the stopper, the direction of the input load vector is determined by a direction in which the tie rod is attached to the tie rod hole. The direction of the striking load vector is perpendicular to the striking surface (or the contact surface of the stopper) of the steering arm. Accordingly, the striking load vector is applied to a center position (hereinafter, referred to as a "striking center position") of a contact portion between the striking surface of the steering arm and the contact surface of the stopper.

Here, a "center line of the entirety of the vehicle" refers to an imaginary straight line that passes through the center point of the vehicle in the lateral direction, and extends in a longitudinal direction of the vehicle.

In the arm stopper mechanism in the related art, for example, the angle made by two striking surfaces of the steering arm is set to be 180°, and the angle made by two contact surfaces of the stopper is set to be 90° in such a manner that the angle made by the two contact surfaces of the stopper (angle between the two contact surfaces, and formed in the stopper (for example, refer to an angle θst in FIG. 26B)) is smaller than the angle made by the two striking surfaces of the steering arm (angle between the two striking surfaces), and formed in the steering arm (for example, refer to an angle θar in FIG. 25B)).

In the arm stopper mechanism in the related art, since the angle made by the two contact surfaces of the stopper is set to be 90°, two striking centers are respectively positioned at 45° right and 45° left from "a starting point of the contact surfaces" with respect to the "center line of the entirety of the vehicle".

In the arm stopper mechanism in the related art, when one striking surface of the steering arm strikes against one contact surface of the stopper, the striking load vector is applied to the striking center position in a direction which is oriented at 45° with respect to the "center line of the entirety of the vehicle". In the arm stopper mechanism in the related art, because of the attachment direction of the tie rods, the input load vector is applied to the surroundings of the tie rod holes in a direction in which the angle made by the input load vector and the striking load vector becomes an acute angle (angle of 0° or greater and less than 90°) (refer to FIG. 27).

In designing the configuration of the arm stopper mechanism in the related art, the angle made by the respective directions of the input load vector and the striking load vector is not taken into consideration. For this reason, in the related art, in the motor-driven power steering apparatus using the arm stopper mechanism, a relatively large bending load may be applied to the output shaft, and at this time, an excessive load may be applied to the bearing that supports the output shaft, or to the housing in the vicinity of the bearing.

According to consideration in this regard by the inventor of the present invention, since the bending load vector is a combined vector of the input load vector and the striking load vector, it is possible to prevent the occurrence of a bending load by configuring the arm stopper mechanism in such a manner that the input load vector and the striking load vector cancel each other out.

According to the inventor of the present invention, it is possible to prevent the occurrence of a bending load by configuring the arm stopper mechanism in such a manner that a relationship between the angle between the two contact surfaces of the stopper and the angle between the two striking surfaces of the steering arm is reverse to that in the arm stopper mechanism in the related art (that is, in such a manner that the angle between the two contact surfaces of the stopper is greater than the angle between the two striking surfaces of the steering arm), and the angle between the two contact surfaces of the stopper is set to be greater than or equal to the angle (90°) of the arm stopper mechanism in the related art.

(2) There is a problem in that since the motor-driven power steering apparatus in the related art does not have means for inspecting the sealability of the interior of the housing, flying debris such as dust or mud, or water may intrude into the housing as described below.

Typically, the housing of the motor-driven power steering apparatus includes a plurality of case members. In a state where the respective mating surfaces of the case members face each other, the case members are joined together with bolts or the like so that a sealed space is formed in the housing. The housing accommodates a middle portion of a rotating shaft that is formed of the input shaft, the torsion bar, and the output shaft. A sheet-like seal member or a seal member such as an O-ring or an oil seal seals the gap between the case members and the gap between the case members and the rotating shaft.

The motor-driven power steering apparatus in the related art does not have means for inspecting the sealability of the interior of the housing. For this reason, in the motor-driven power steering apparatus in the related art, when an inner space of the housing is not satisfactorily sealed, flying debris such as dust or mud, or water may intrude into the housing.

The present invention is made to solve the problems, and an object of the present invention is to provide an arm stopper mechanism mounting apparatus which is a part of a steering apparatus, and on which an arm stopper mechanism for reducing a bending load applied to an output shaft is mounted, and in which the sealability of the interior of a housing can be inspected, and to provide a steering apparatus using the arm stopper mechanism mounting apparatus.

According to a first aspect of the present invention to solve the problems, there is provided an arm stopper mechanism mounting apparatus including: an output shaft that outputs a steering force to wheels of a vehicle; a housing that is provided with a hole for inspecting a sealability of an interior of the housing, and turnably accommodates the output shaft; a sealing member that seals the hole, and is detachable from the hole when the sealability is inspected; and an arm stopper mechanism that includes a steering arm which turns about the output shaft while being positioned near a lower surface of the housing, and to which two tie rods, to which the wheels are respectively connected, are attached, and a stopper which is provided in a vicinity of the output shaft, and restricts an angle of the turning of the steering arm. When an imaginary straight line that passes through the output shaft and extends in a longitudinal direction of the vehicle is defined as a center line of the steering arm, the steering arm includes, in a neutral state: an output shaft hole which is provided on the center line, and into which the output shaft is fitted; two tie rod holes which are respectively provided at positions that are separated by a distance from the center line to a right and a left, and that are separated by a distance from the output shaft hole to a rear side of the vehicle, and to which the tie rods are respectively attached; and two striking surfaces which are respectively provided at positions that are separated by a distance from the center line to a right and a left, and that are separated by a distance from the output shaft hole to a rear side of the vehicle, and which are to strike against the stopper. The stopper includes two contact surfaces that are respectively provided at positions that are separated by a distance from the center line to a right and a left, and that are present in a turning direction of the striking surfaces of the steering arm, and that are respectively to be brought into contact with the striking surfaces. An angle made by the two contact surfaces of the stopper is greater than an angle made by the two striking surfaces of the steering arm, and is 90° or greater.

A bending load vector is a combined vector of an input load vector and a striking load vector. For this reason, when the input load vector and the striking load vector are applied to cancel each other out, it is possible to reduce the bending load. The configuration in which the input load vector and the striking load vector cancel each other out is realized by increasing an angle made by the respective directions of the input load vector and the striking load vector. The configuration in which the angle made by the respective directions of the input load vector and the striking load vector is increased can be realized by decreasing an angle made by the center line and the striking surface in the steering arm (angle between the center line and the striking surface in the steering arm, and an angle formed in the steering arm, for example, an angle θ176 illustrated in FIG. 8B), or by increasing an angle made by a center line and the contact surface in the stopper (angle between the center line and the contact surface in the stopper, and an angle formed in the stopper, for example, an angle θ186 illustrated in FIG. 9B).

In the arm stopper mechanism of the arm stopper mechanism mounting apparatus according to the first aspect of the present invention, the angle made by the two contact surfaces of the stopper is set to be greater than the angle made by the two striking surfaces of the steering arm, and 90° or greater. With this configuration of the arm stopper mechanism, the input load vector and the striking load vector can be applied to cancel each other out. As a result, in the arm stopper mechanism, it is possible to reduce the value of the bending load vector applied to the output shaft, and thereby it is possible to reduce a bending load applied to the output shaft. Accordingly, in the arm stopper mechanism, it is possible to reduce a load applied to bearings which support the output shaft, and the housing in the vicinity of the bearings.

In the arm stopper mechanism mounting apparatus according to the first aspect of the present invention, the housing is provided with the hole for inspecting the sealability of the interior of the housing. In the arm stopper mechanism mounting apparatus, it is possible to inspect the sealability of the interior of the housing via the hole.

After the sealability of the interior of the housing is inspected, the hole is sealed with the sealing member. Accordingly, in the arm stopper mechanism mounting apparatus, the sealability of the interior of the housing is ensured (that is, the waterproofing performance and the dust resistance performance of the housing are ensured). For this reason, in the arm stopper mechanism mounting apparatus, it is possible to prevent flying debris such as dust or mud, or water from intruding into the housing.

In the arm stopper mechanism mounting apparatus according to the first aspect of the present invention, the hole is preferably positioned at a side surface of the housing. In the arm stopper mechanism mounting apparatus with this configuration, it is possible to efficiently prevent flying debris such as dust or mud, or water from intruding into the housing.

In the arm stopper mechanism mounting apparatus according to the first aspect of the present invention, the sealing member preferably has a ventilation mechanism that does not allow liquid to pass therethrough, but allows air to pass therethrough. In the arm stopper mechanism mounting apparatus with this configuration, even though air in the housing expands due to the heated housing, it is possible to discharge the expanded air to the outside of the housing. For this reason, in the arm stopper mechanism mounting apparatus with this configuration, it is possible to prevent the expansion of air from causing a harmful influence (for example, a high load being applied to the seal member having relatively low pressure resistance).

According to a second aspect of the present invention, there is provided a steering apparatus including: the arm stopper mechanism mounting apparatus according to the first aspect of the present invention; and attached members that include an upper holder which covers an upper portion of the housing, and that are attached to the arm stopper mechanism mounting apparatus. In the steering apparatus with this configuration, it is possible to protect the upper portion of the housing, and members (for example, the input shaft that is connected to the output shaft) which are disposed in the upper portion of the housing. According to the second aspect of the present invention, a steering apparatus may include the arm stopper mechanism mounting apparatus according to the first aspect of the present invention; a motor; and a transmission mechanism that transmits the generated torque of the motor to the output shaft. In the steering apparatus with this configuration, it is possible to transmit the generated torque of the motor to the output shaft via the transmission mechanism. According to the second aspect of the present invention, a steering apparatus may include the arm stopper mechanism mounting apparatus according to the first aspect of the present invention; and a steering mechanism that transmits a steering force of a driver to the output shaft. In the steering apparatus with this configuration, it is possible to transmit a steering force of the driver to the output shaft.

Since the steering apparatus according to the second aspect of the present invention has the arm stopper mechanism mounting apparatus according to the first aspect; it is possible to reduce a bending load applied to the output shaft. Accordingly, the steering apparatus can improve the controllability of handlebars.

In the steering apparatus, it is possible to inspect the sealability of the interior of the housing via the hole. Accordingly, in the steering apparatus, it is possible to prevent flying debris such as dust or mud, or water from intruding into the housing.

According to the present invention, it is possible to reduce a bending load applied to the output shaft, and to inspect the sealability of the interior of the housing.

BRIEF DESCRIPTION OF THE DRAWINGS

FIG. 7 is a schematic bottom view illustrating the configuration of the arm stopper mechanism according to the first embodiment.

FIGS. 8A and 8B are schematic bottom views illustrating the steering arm of the arm stopper mechanism according to the first embodiment.

FIGS. 9A and 9B are schematic bottom views illustrating the configuration of a stopper of the arm stopper mechanism according to the first embodiment.

FIGS. 10A and 10B are schematic views illustrating an ideal configuration of portions of the steering arm of the arm stopper mechanism according to the first embodiment.

FIGS. 20A, 20B and 20C are schematic bottom views illustrating the configuration of a steering arm of the arm stopper mechanism according to the second embodiment.

FIGS. 26A and 26B are schematic bottom views illustrating the configuration of a stopper of the arm stopper mechanism according to the comparative example.

FIGS. 28A, 28B and 28C are schematic views illustrating the relationship between an input load vector and a striking load vector, and a bending load vector.

DETAILED DESCRIPTION OF THE INVENTION

Figure 1:
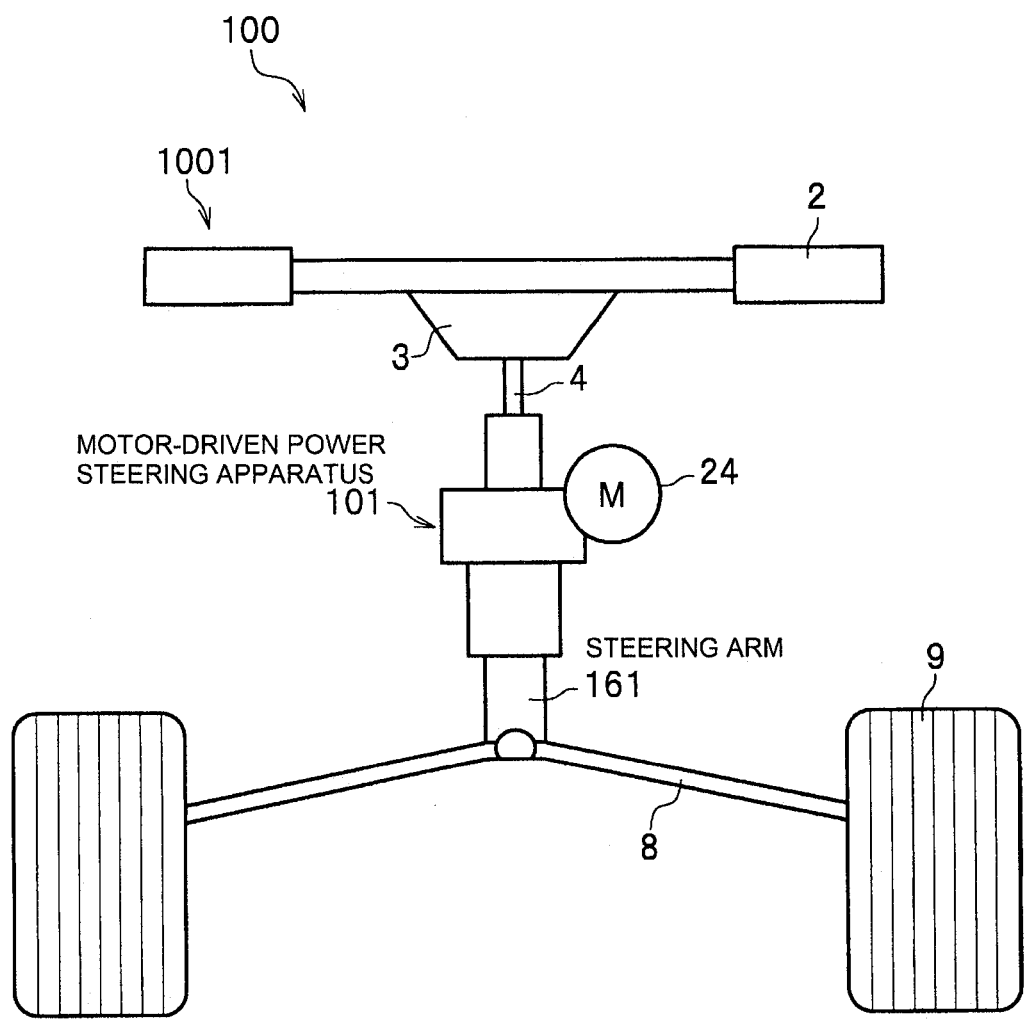
FIG. 1 is a schematic view illustrating the configuration of a saddle-type vehicle.

Hereinafter, embodiments of the present invention (hereinafter, referred to as the "embodiments") will be described in detail with reference to the accompanying drawings. The drawings illustrate schematically to the extent that persons skilled in the art can sufficiently understand the present invention. Accordingly, the present invention is not limited to only the examples which are illustrated. In the drawings, the same reference signs are assigned to common configuration elements or similar configuration elements, and descriptions thereof will be omitted.

Here, an "upward" direction, a "downward" direction, a "forward" direction, a "rearward" direction, a "leftward" direction and a "rightward" direction are defined based on the orientation of the vehicle. In some drawings, the configurations when seen from the bottom of the vehicle are illustrated. In these drawings, the "rightward" direction and the "leftward" direction are seen as if being reversed. However, since the "rightward" and "leftward" directions indicate the directions defined in the bottom view configuration of the vehicle, the "rightward" and "leftward" directions can be accepted as illustrated in the drawings.

First Embodiment

Hereinafter, the configuration of an arm stopper mechanism 160 (refer to FIG. 2) according to a first embodiment will be described. Here, the characteristics of the arm stopper mechanism 160 according to the first embodiment will be described in the following sequence for descriptive purposes.

1: Schematic Configurations of Saddle-type Vehicle and Motor-driven Power Steering Apparatus 2: Schematic Configuration between Steering Arm and Wheels (Front Wheels)

3: Load Vector Applied to Steering Arm 4-1: Configuration of Arm Stopper Mechanism according to Comparative Example 4-2: Load Vectors Applied to Main Portions of Arm Stopper Mechanism according to Comparative Example 5: Relationship between Input Load Vector, and Striking Load Vector, and Bending Load Vector 6-1: Configuration of Arm Stopper Mechanism according to First Embodiment 6-2: Load Vectors Applied to Main Portions of Arm Stopper Mechanism according to First Embodiment 1: Schematic Configurations of Saddle-Type Vehicle and Motor-Driven Power Steering Apparatus First, the schematic configuration of a saddle-type vehicle 100 will be described with reference to FIG. 1. FIG. 1 is a schematic view illustrating the configuration of the saddle-type vehicle 100. The saddle-type vehicle 100 is a vehicle equipped with a motor-driven power steering apparatus 101 that is provided with the arm stopper mechanism 160 according to the first embodiment.

As illustrated in FIG. 1, the saddle-type vehicle 100 is an all terrain vehicle (ATV) such as a buggy vehicle or a snowmobile, and has a steering system 1001. The steering system 1001 includes handlebars 2; a handle stay 3; a steering shaft 4; right and left tie rods 8; right and left front wheels (front wheels) 9; and a motor-driven power steering apparatus (steering apparatus) 101.

In the steering system 1001, the handle stay 3 is provided with the handlebars 2 which are steering handlebars, and is fixed to the steering shaft 4. The steering shaft 4 is turnably supported by a vehicle body's support member (not illustrated). The motor-driven power steering apparatus 101 is installed between the steering shaft 4 and the right and left tie rods 8 which are respectively connected to the right and left wheels (front wheels) 9. The motor-driven power steering apparatus 101 is an apparatus that supplements a steering force applied by a driver on the handlebars 2 with an assist torque that is generated from an electric motor 24.

The motor-driven power steering apparatus 101 includes an arm stopper mechanism 160 (refer to FIG. 2) according to the first embodiment. The arm stopper mechanism 160 includes a steering arm 161 and a stopper 162, and is a mechanism that restricts the turning angle of the steering arm 161 using the stopper 162.

Figure 2:
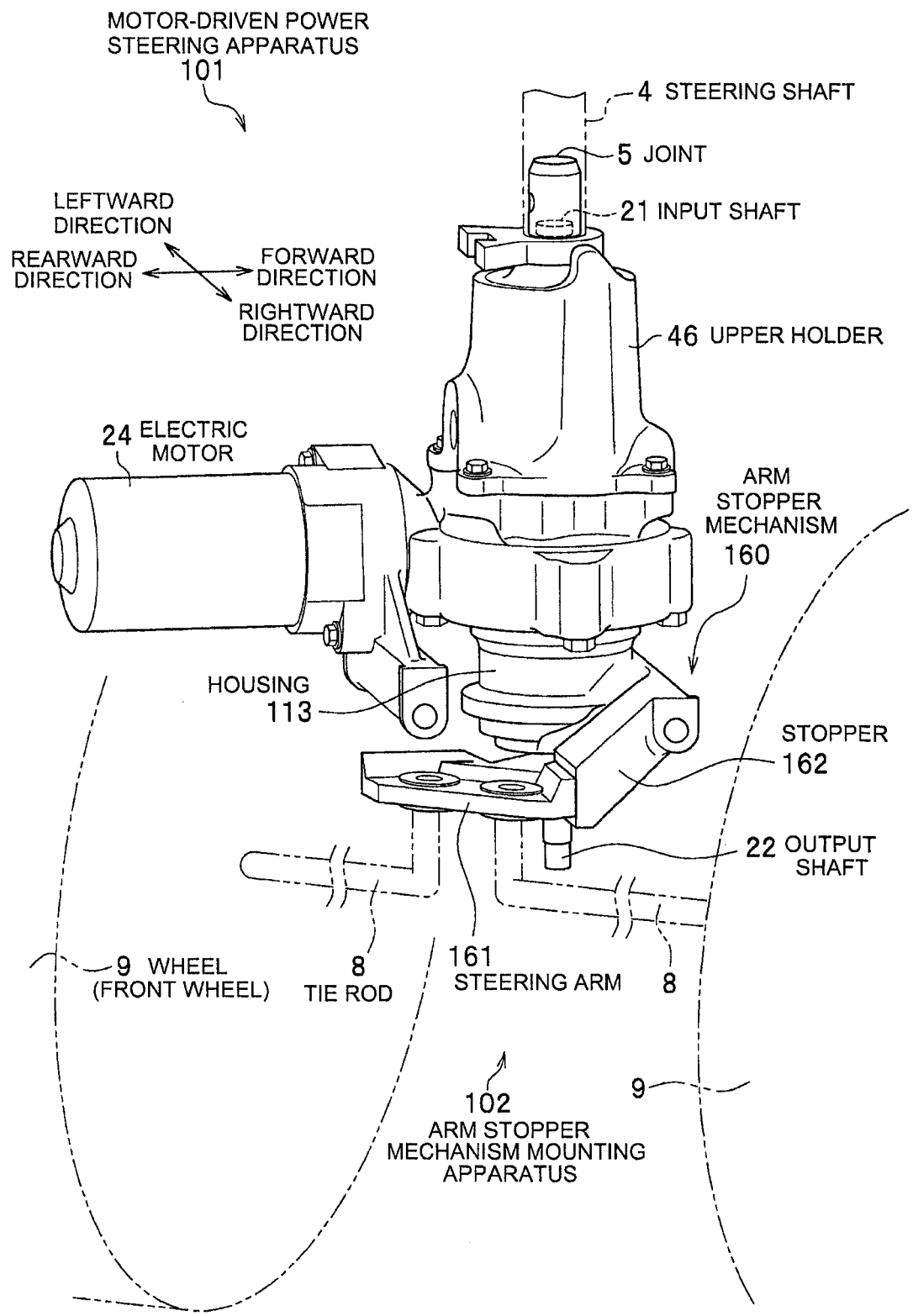
FIG. 2 is a schematic side view illustrating the configuration of a motor-driven power steering apparatus with an arm stopper mechanism according to a first embodiment.
Figure 3:
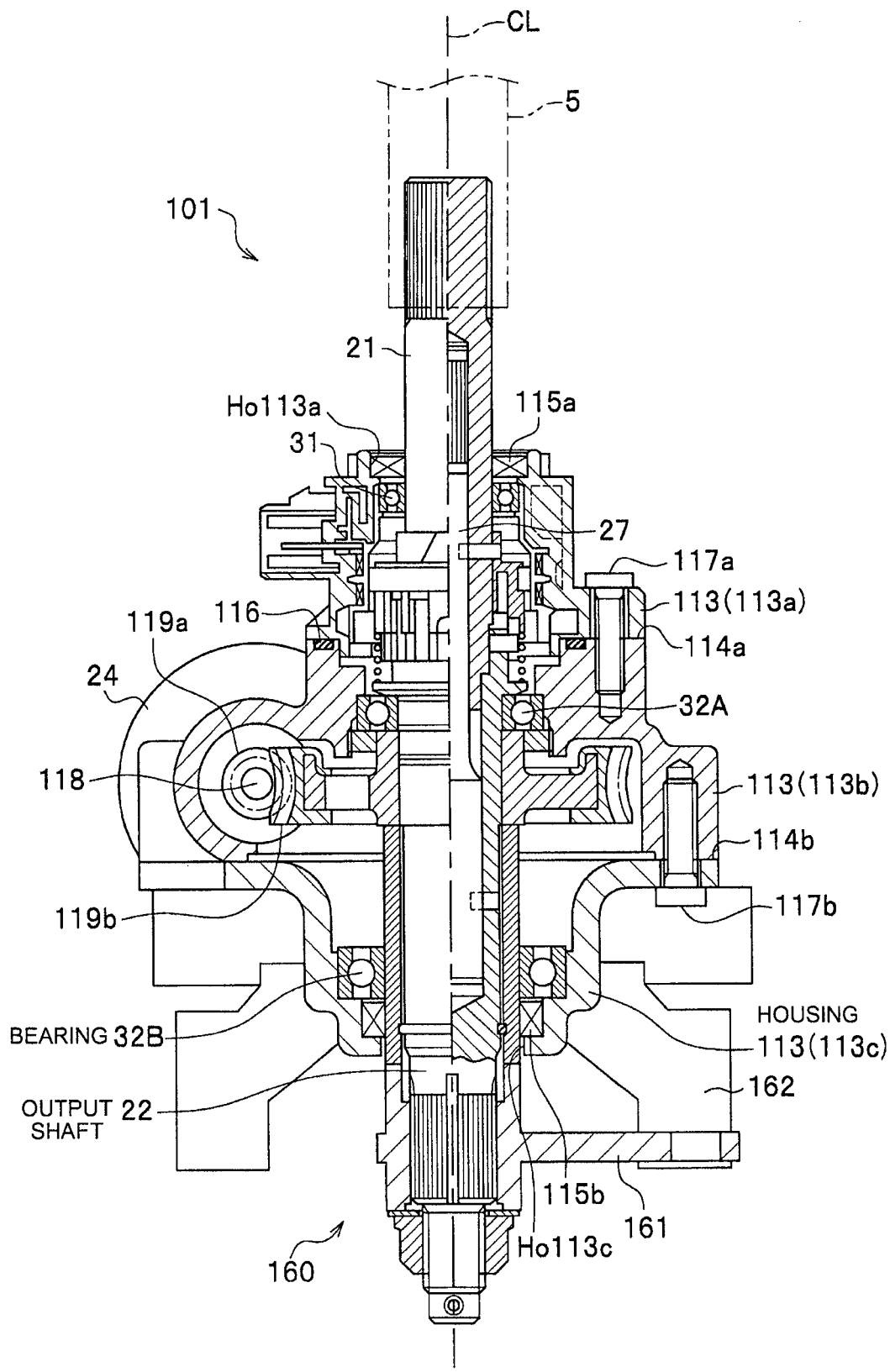
FIG. 3 is a schematic view illustrating the internal configuration of the motor-driven power steering apparatus with the arm stopper mechanism according to the first embodiment.

Subsequently, the schematic configuration of the motor-driven power steering apparatus 101 will be described with reference to FIGS. 2 and 3. FIG. 2 is a schematic side view illustrating the configuration of the motor-driven power steering apparatus 101 with the arm stopper mechanism 160 according to the first embodiment. FIG. 3 is a schematic view illustrating the internal configuration of the motor-driven power steering apparatus 101.

As illustrated in FIG. 2, the motor-driven power steering apparatus 101 has built-in members such as an input shaft 21, a torsion bar 27 (refer to FIG. 3), an output shaft 22, and bearings 31, 32A, and 32B (refer to FIG. 3).

As illustrated in FIG. 3, the input shaft 21, the torsion bar 27, and the output shaft 22 are disposed on the same center axis CL. An upper portion of the input shaft 21 is connected to the steering shaft 4 of the handlebars via a joint 5. In contrast, a lower portion of the input shaft 21 is made as a hollow portion, and an upper portion of the torsion bar 27 is inserted into the lower portion of the input shaft 21. The torsion bar 27 is a bar-shaped spring member that uses an elastic force originating from the twisted spring member. An upper end portion of the torsion bar 27 is serration-joined to an inner surface of the hollow portion of the input shaft 21. An upper portion of the output shaft 22 is made as a hollow portion, and a lower portion of the torsion bar 27 is inserted into the upper portion of the output shaft 22. A lower end portion of the torsion bar 27 is connected to the output shaft 22 via a connection pin. As such, the torsion bar 27 connects the input shaft 21 and the output shaft 22.

A housing 113 of the motor-driven power steering apparatus 101 includes a first housing 113*a*, a second housing 113*b*, and a third housing 113*c* which are sequentially disposed from the top of the housing 113.

The first housing 113*a* is a case member which is made to have a dome shape and covers the top of the second housing 113*b*. The first housing 113*a* is made to have a hollow shape, and a ceiling portion of the first housing 113*a* is made to be smaller than a bottom portion thereof, and thereby the input shaft 21 can be accommodated in the first housing 113*a*. An opening portion H0113*a* is formed in the ceiling portion of the first housing 113*a*, and the input shaft 21 passes through the opening portion H0113*a*.

The second housing 113*b* is a case member that is made to have a cylindrical shape. The second housing 113*b* is made to have a hollow shape so that the second housing 113*b* can accommodate a worm gear 119*a*, a worm wheel 119*b*, the upper portion of the output shaft 22, and the like. The worm gear 119*a* and the worm wheel 119*b* are a transmission mechanism that transmits the generated torque of the electric motor 24 to the output shaft 22. The electric motor 24 is attached to an outer portion of the second housing 113*b* in a state where a rotating shaft 118 is inserted into the second housing 113*b*. The worm gear 119*a* is joined to the rotating shaft 118 of the electric motor 24 via a joint (not illustrated). The worm gear 119*a* meshes with the worm wheel 119*b*. The worm wheel 119*b* is fixed to the output shaft 22. A torque sensor detects a steering torque based on the respective rotational displacements of the input shaft 21 and the output shaft 22 when the torsion bar 27 is twisted due to the application of the steering torque to the handlebars 2 (refer to FIG. 1), and the motor-driven power steering apparatus 101 drives the electric motor 24 according to the value of the detected steering torque. Accordingly, in the motor-driven power steering apparatus 101, the generated torque of the electric motor 24 is transmitted to the output shaft 22 via the transmission mechanism that includes the worm gear 119*a* and the worm wheel 119*b*. As a result, the motor-driven power steering apparatus 101 can supplement a steering force applied by the driver on the handlebars 2 (refer to FIG. 1) with an assist torque that is generated from an electric motor 24.

The third housing 113*c* is a case member which is made to have a substantially U shape and covers the bottom of the second housing 113*b*. Accordingly, the third housing 113*c* is made to have a hollow shape, and a ceiling portion of the third housing 113*c* is made to be larger than a bottom portion thereof, and thereby a lower portion of the output shaft 22 can be accommodated in the third housing 113*c*. The ceiling portion of the third housing 113*c* has a flange that is formed to fit the shape of the bottom portion of the second housing 113*b*. An opening portion H0113*c* is formed in a bottom portion of the third housing 113*c*, and the output shaft 22 passes through the opening portion H0113*c*.

In a state where the respective mating surfaces thereof facing other, the first housing 113*a*, the second housing 113*b*, and the third housing 113*c* are joined together so that a sealed space is formed in the housing 113.

A seal member 114*a* having a thin annular shape is disposed between the first housing 113*a* and the second housing 113*b*. Accordingly, the gap between the first housing 113*a* and the second housing 113*b* is sealed. In this state, the first housing 113*a* and the second housing 113*b* are tightened using bolts 117*a*.

A seal member 114*b* having a thin annular shape or an O-ring 116 is disposed between the second housing 113*b* and the third housing 113*c*. Accordingly, the gap between the second housing 113*b* and the third housing 113*c* is sealed. In this state, the second housing 113*b* and the third housing 113*c* are tightened using bolts 117*b*.

An oil seal 115*a* is disposed between the opening portion H0113*a* of the first housing 113*a* and the input shaft 21. An oil seal 115*b* is disposed between the opening portion H0113*c* of the third housing 113*c* and the output shaft 22.

The interior of the housing 113 is sealed with seal members such as the seal members 114*a* and 114*b*, the oil seal 115*a* and 115*b*, and the O-ring 116. The sealability of the interior of the housing 113 is preferably inspected so as to make sure that flying debris such as dust or mud, or water cannot intrude into the housing 113.

The input shaft 21 is turnably supported by the bearing 31. In contrast, the output shaft 22 is turnably supported by the bearings 32A and 32B. The bearing 31 is fitted into the first housing 113*a*. The bearing 32A is fitted into the second housing 113*b*. The bearing 32B is fitted into the third housing 113*c*. The steering arm 161 is attached to the vicinity of a lower end of the output shaft 22.

The steering arm 161 is a steering member of the wheels (the front wheels) 9. The tie rods 8 are attached to the steering arm 161, and the wheels 9 are respectively connected to the tie rods 8. The tie rod 8 is disposed in a state where the tie rod 8 extends in a lateral direction of the vehicle. One end of the tie rod 8 is connected to the steering arm 161 in the vicinity of the center of the vehicle in the lateral direction, and the other end is connected to the wheel (the front wheel) 9. The steering arm 161 is spline-fitted to the output shaft 22, and is configured to turn about the output shaft 22.

When the driver turns the handlebars 2 to the maximum steering angle or greater in a clockwise direction or a counter-clockwise direction, or when the handlebars 2 turn to the maximum steering angle or greater due to an external force that is input from a protrusion (convex portion) or the like on a road surface to the motor-driven power steering apparatus 101 via the wheels (front wheels) 9 while the vehicle is travelling on a rough road, the motor-driven power steering apparatus 101 is required to restrict the turning of the handlebars 2 in such a manner that the vehicle does not roll over in the lateral direction. The motor-driven power steering apparatus 101 includes the arm stopper mechanism 160 as a mechanism for such a function.

The stopper 162 protrudes downward from a lower surface of the housing 113 (the third housing 113c) of the motor-driven power steering apparatus 101, and is provided in the vicinity of the output shaft 22. In the arm stopper mechanism 160, when the driver turns the handlebars 2 to the maximum steering angle or greater in the clockwise direction or the counter-clockwise direction, or when the handlebars 2 turn to the maximum steering angle or greater due to an external force that is input via the wheels (front wheels) 9, a striking surface 176 (refer to FIG. 8A) of the steering arm 161 strikes against a contact surface 186a (refer to FIG. 9A) of the stopper 162. Accordingly, the arm stopper mechanism 160 restricts the turning angle of the steering arm 161 using the stopper 162, and thus the turning of the handlebars 2 is restricted.

2: Schematic Configuration between Steering Arm and Wheels (Front Wheels)

Figure 4:
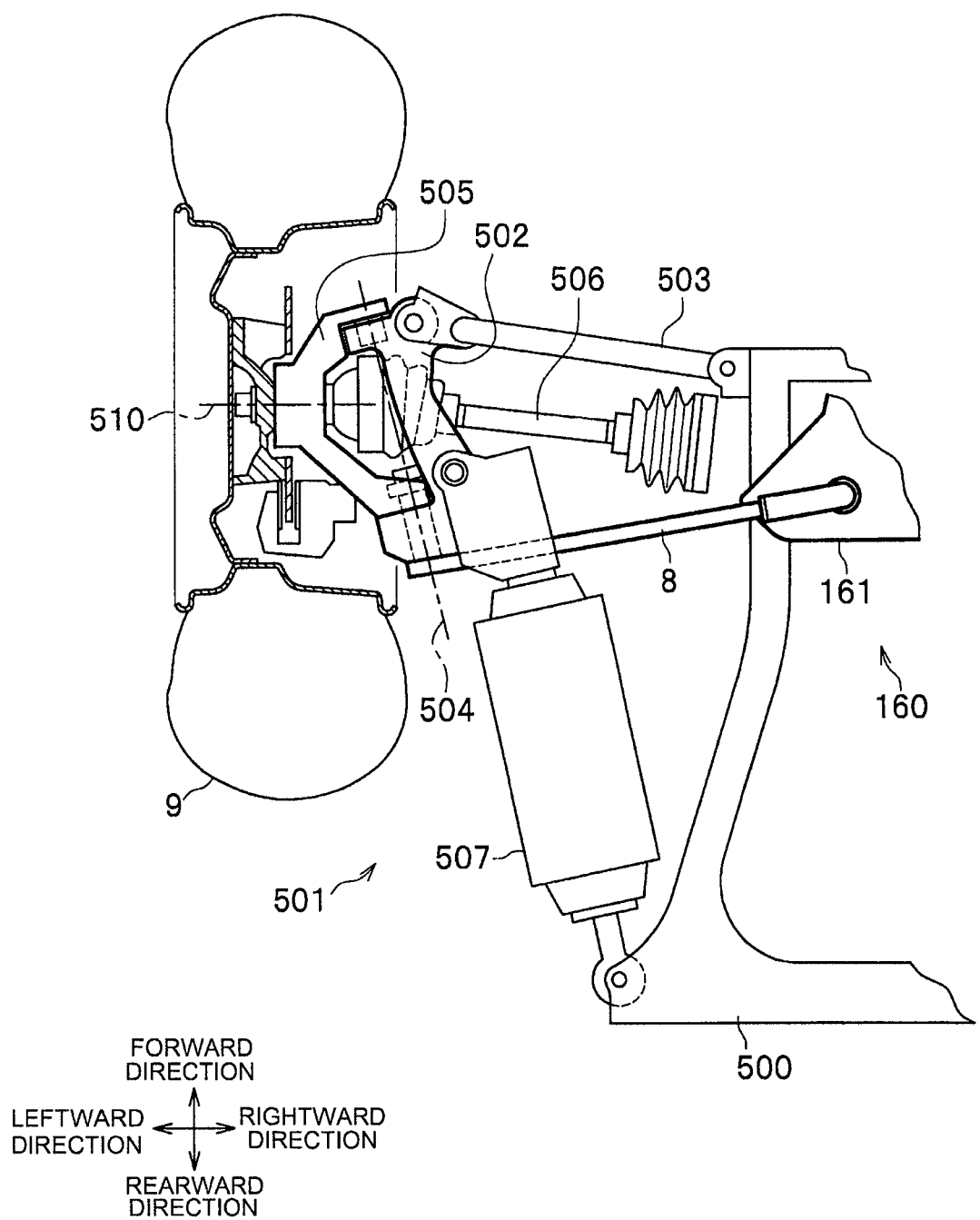
FIG. 4 is a schematic top view illustrating the configuration between a steering arm of the arm stopper mechanism according to the first embodiment and front wheels.

Subsequently, the schematic configuration between the steering arm 161 and the wheels (the front wheels) 9 will be described with reference to FIG. 4. FIG. 4 is a schematic top view illustrating the configuration between the steering arm 161 of the arm stopper mechanism 160 according to the first embodiment and the wheels (front wheels) 9.

As illustrated in FIG. 4, the wheels (the front wheels) 9 are suspended from a vehicle body 500 via a front wheel suspension apparatus 501. The front wheel suspension apparatus 501 includes a front cushion 507, an upper end of which is connected to the vehicle body 500 and which extends downward; a knuckle support member 502 that extends downward from a lower portion of the front cushion 507; a lower arm 503 that connects a lower portion of the knuckle support member 502, which extends in the lateral direction of the vehicle, to the vehicle body 500; a knuckle 505 that is attached to the knuckle support member 502 so as to be turnable about a kingpin axis line 504, and supports the wheel (front wheel) 9; and the tie rod 8 that turns the knuckle 505, which extends in the lateral direction of the vehicle, about the kingpin axis line 504. The knuckle 505 is provided with a hole through which a drive shaft 506 passes. The drive shaft 506 drives the wheels (the front wheels) 9 which rotate about a vehicle axis 510.

Figure 5A:
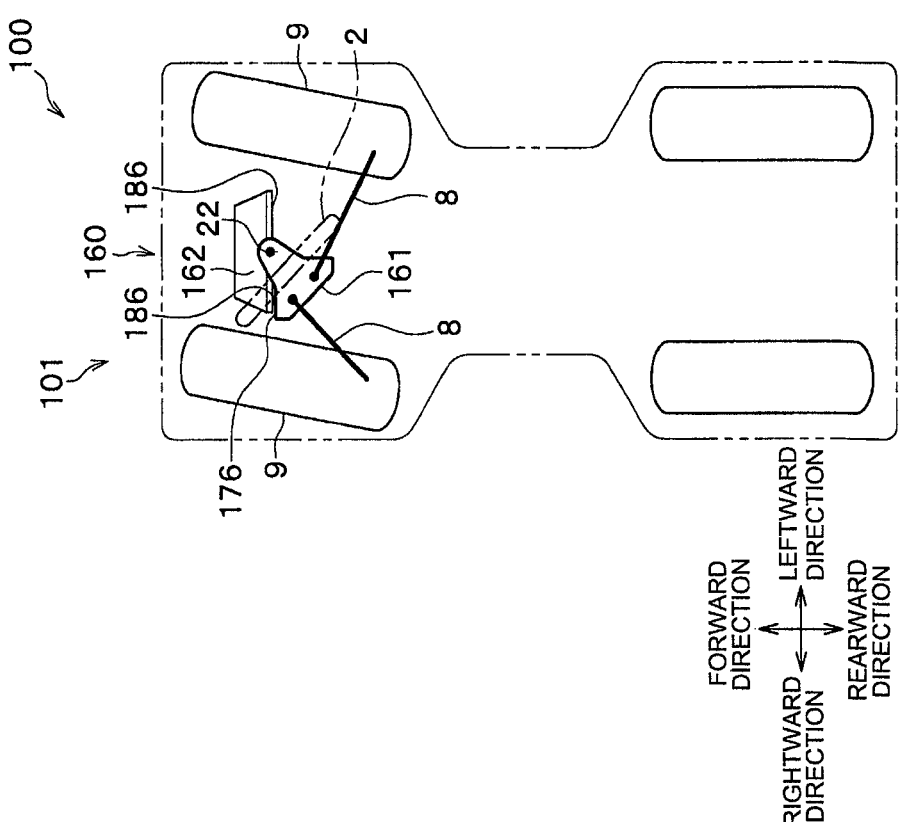
FIGS. 5A and 5B are schematic bottom views illustrating an operational relationship between the steering arm of the arm stopper mechanism according to the first embodiment and the front wheels.
Figure 5B:
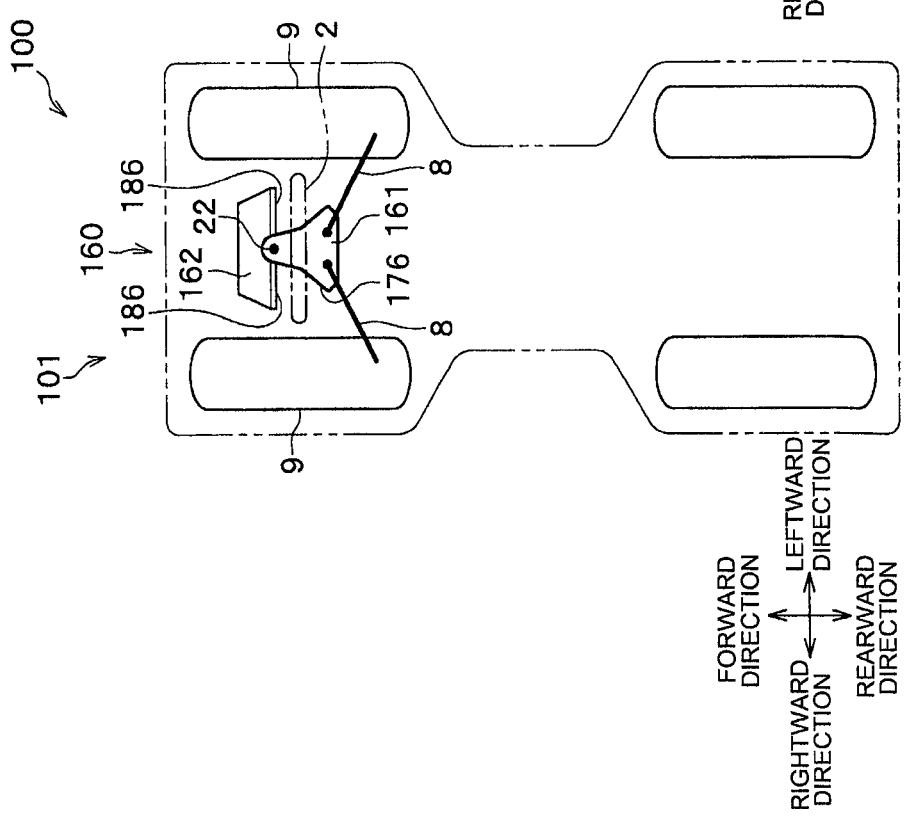

Subsequently, an operational relationship between the steering arm 161 and the wheels (the front wheels) 9 will be described with reference to FIG. 5A and 5B. FIGS. 5A and 5B are schematic bottom views illustrating the operational relationship between the steering arm 161 of the arm stopper mechanism 160 according to the first embodiment and the wheels (front wheels) 9.

FIG. 5A illustrates a state in which the handlebars 2 are not turned (that is, a state in which the handlebars 2 are maintained in a neutral state, and the saddle-type vehicle 100 moves straight). In contrast, FIG. 5B illustrates a state in which the handlebars 2 are turned to the maximum steering angle in the counter-clockwise direction (that is, a state in which the saddle-type vehicle 100 is turned left to the maximum).

As being apparent from the difference between FIGS. 5A and 5B, when the handlebars 2 are turned to the maximum steering angle in the counter-clockwise direction (refer to FIG. 5B), the steering arm 161 turns about the output shaft 22 in the counter-clockwise direction. At this time, the right wheel (the right front wheel) 9 is pushed toward the left via the right tie rod 8, and the left wheel (the left front wheel) 9 is pulled toward the left via the left tie rod 8. As a result, two wheels (front wheels) 9 are oriented toward the left. At this time, a right striking portion 174b of the steering arm 161 collides with a right contact portion 186b of the stopper 162 (refer to FIGS. 7 and 11).

In contrast, when the handlebars 2 are turned to the maximum steering angle in the clockwise direction, the steering arm 161 turns about the output shaft 22 in the clockwise direction. At this time, the right wheel (the right front wheel) 9 is pushed toward the right via the right tie rod 8, and the left wheel (the left front wheel) 9 is pulled toward the right via the left tie rod 8. As a result, the two wheels (front wheels) 9 are oriented toward the right. At this time, a left striking portion 174a of the steering arm 161 collides with a left contact portion 186a of the stopper 162.

3: Load Vectors Applied to Steering Arm

Figure 6:
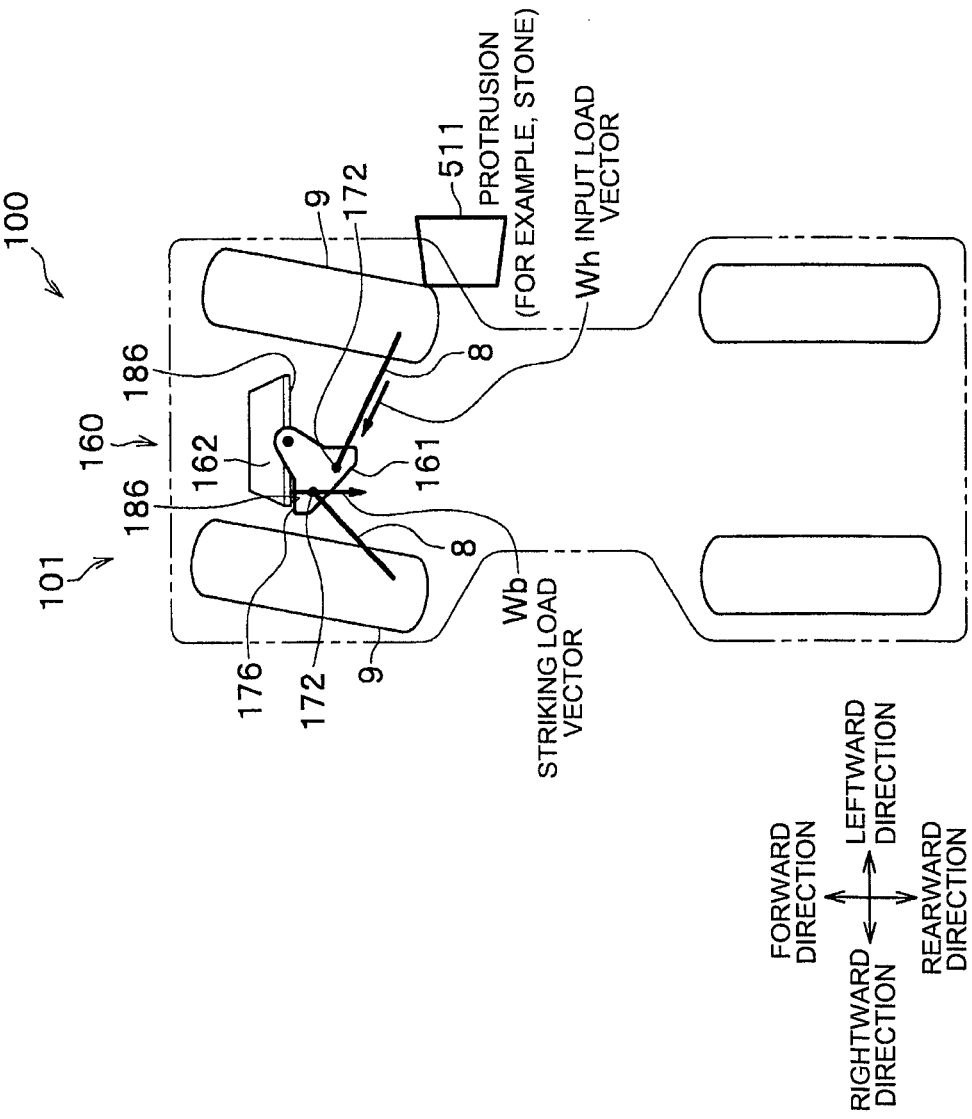
FIG. 6 is a view illustrating load vectors applied to the steering arm of the arm stopper mechanism according to the first embodiment.

In the saddle-type vehicle 100, in a state where the striking portion 174 of the steering arm 161 collides with the contact portion 186 of the stopper 162 (refer to FIG. 5B), an input load may be input to the steering arm 161 from the outside (refer to FIG. 6).

For example, in a case where the saddle-type vehicle 100 is equipped, not with the motor-driven power steering apparatus 101 that is provided with the arm stopper mechanism 160 according to the first embodiment, but with a motor-driven power steering apparatus 1 (refer to FIGS. 23 and 24) that is provided with an arm stopper mechanism 60 according to the comparative example which will be described later, since in designing the configuration of the arm stopper mechanism 60 according to the comparative example, a feature for reducing the value of a bending load vector Wt applied to the output shaft 22 (refer to Section 5: Relationship between Input Load Vector and Striking Load Vector, and Bending Load Vector, which will be described later) is not taken into consideration, a relatively large bending load may be applied to the output shaft 22. As a result, at this time, an excessive load may be applied to the bearings 32A and 32B (refer to FIG. 3) that support the output shaft 22; the bearing 31 (refer to FIG. 3) that supports the input shaft 21 which is connected to the output shaft 22 via the torsion bar 27; and the housing 113 (refer to FIG. 3) in the vicinity of the bearings 32A, 32B and 31.

Hereinafter, load vectors applied to the steering arm 161 will be described with reference to FIG. 6. FIG. 6 is a view illustrating the load vectors applied to the steering arm 161. FIG. 6 illustrates the saddle-type vehicle 100 in the following state.

That is, when the saddle-type vehicle 100 is traveling on a rough road, the saddle-type vehicle 100 may move upward and downward severely, and in some cases, the wheels (the front wheels) 9 may leap upward from (separate from) a road surface. For example, as illustrated in FIG. 6, if the driver turns the handlebars 2 to the maximum steering angle in the counter-clockwise direction right before or right after the wheels (the front wheels) 9 leap upward from a road surface, a side surface of each of the right and left wheels (the right and left front wheels) 9 lands on the road surface, prior to other portions of the wheels. At this time, for example, when the rear of the side surface of the left wheel (the left front wheel) 9 collides with a hard protrusion 511 such as a stone, the left wheel (the left front wheel) 9 receives a strong reaction force from the protrusion 511. FIG. 6 illustrates the state of the saddle-type vehicle 100 at this time.

At this time, the strong reaction force is input as an input load vector Wh to a left tie rod hole 172 (refer to FIGS. 7 and 8A) of the steering arm 161 via the left wheel (the left front wheel) 9 and the left tie rod 8.

At this time, since the right striking portion 174b of the steering arm 161 collides with the right contact portion 186b of the stopper 162, a striking load vector Wb perpendicular to the right contact portion 186b is input to the right striking portion 174b from the right contact portion 186b.

In a state where the striking portion 174 of the steering arm 161 has not collide with the contact portion 186 of the stopper 162, when the striking portion 174 of the steering arm 161 collides with the contact portion 186 of the stopper 162 due to the collision of the wheel (the front wheel) 9 with the protrusion 511, the application of the load vectors to the steering arm 161 is similar to the case illustrated in FIG. 6.

When the driver turns the handlebars 2 to the maximum steering angle in the clockwise direction right before or right after the wheels (the front wheels) 9 leap upward from a road surface, the input of the input load vector Wh and the striking load vector Wb is laterally reverse to the case illustrated in FIG. 6. That is, the input load vector Wh is input to a right tie rod hole 172 (refer to FIGS. 7 and 8A) of the steering arm 161, and in contrast, the striking load vector Wb is input to the left striking portion 174a from the left contact portion 186a.

4-1: Configuration of Arm Stopper Mechanism according to Comparative Example

Figure 23:
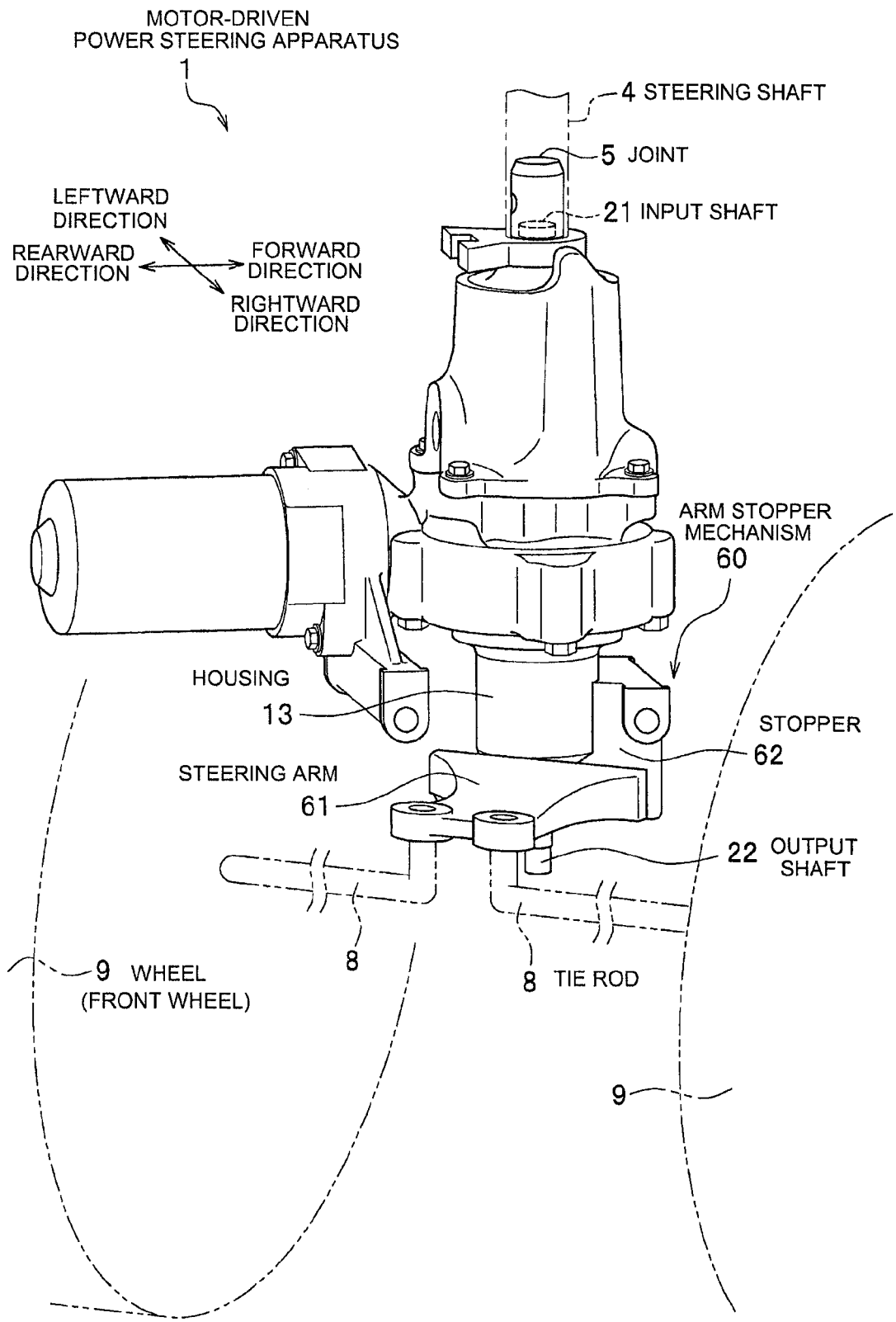
FIG. 23 is a schematic side view illustrating the configuration of a motor-driven power steering apparatus with an arm stopper mechanism according to a comparative example.
Figure 24:
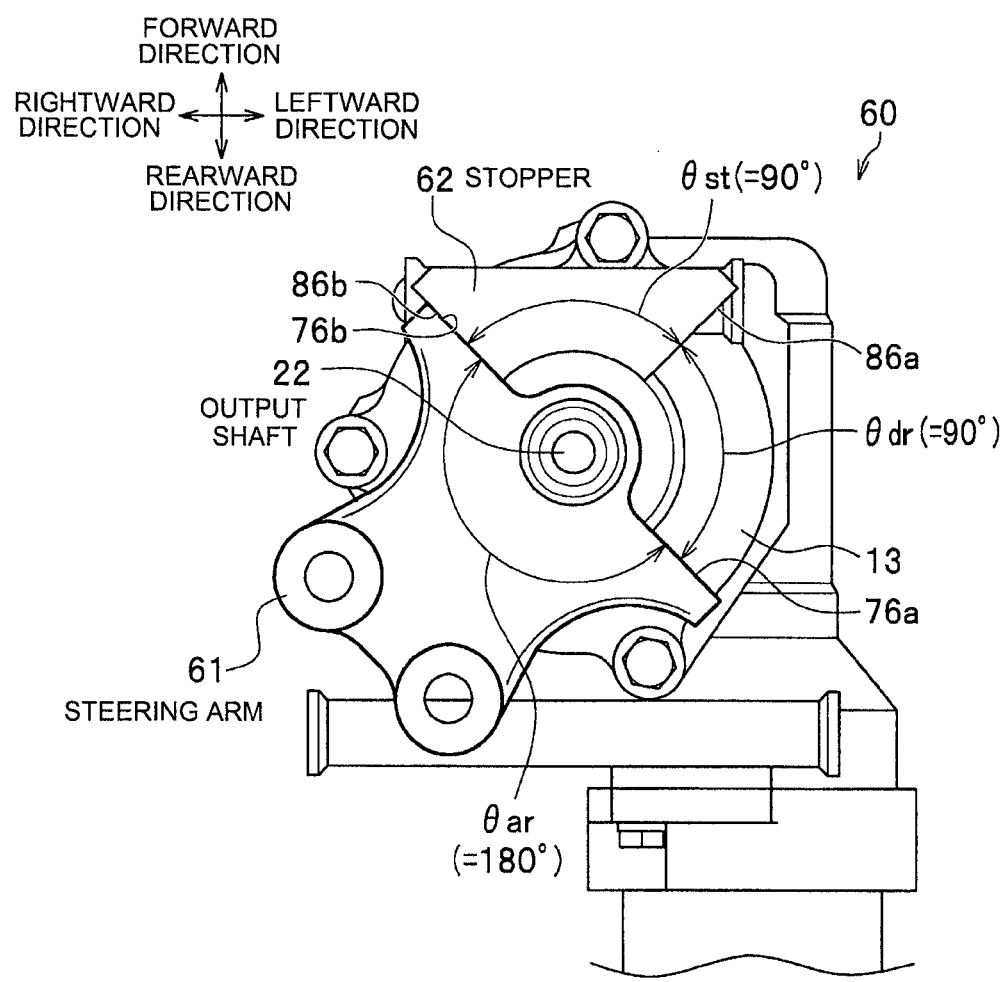
FIG. 24 is a schematic bottom view illustrating the configuration of the arm stopper mechanism according to the comparative example.
Figure 25B:
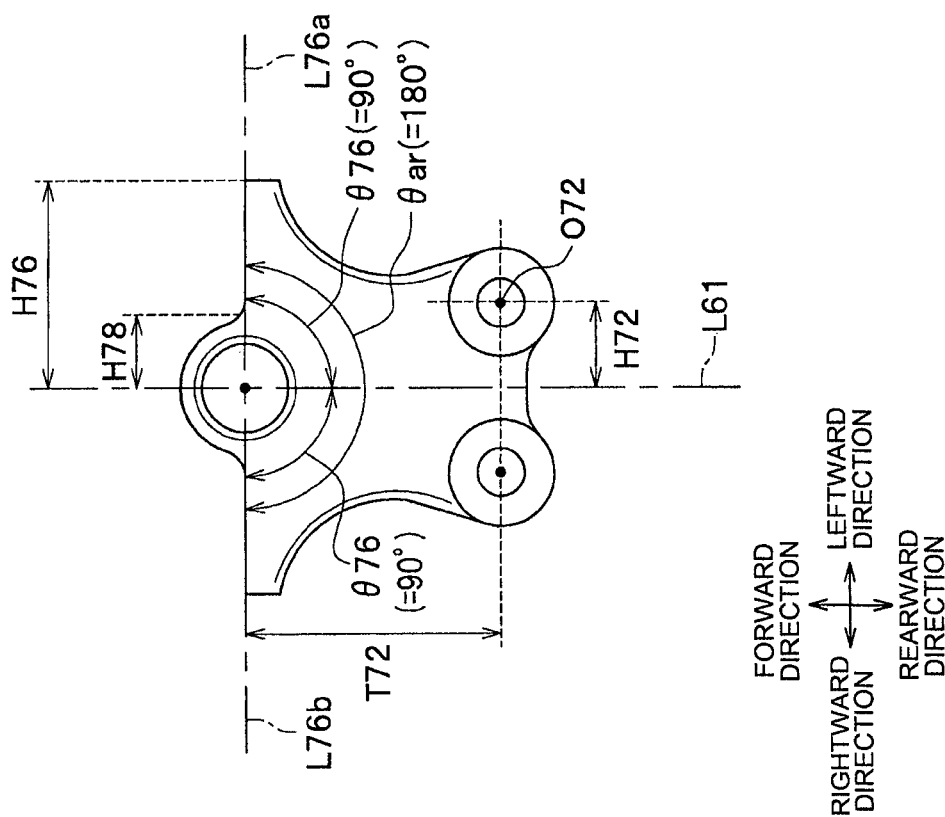
FIGS. 25A and 25B are schematic bottom views illustrating the configuration of a steering arm of the arm stopper mechanism according to the comparative example.
Figure 25A:
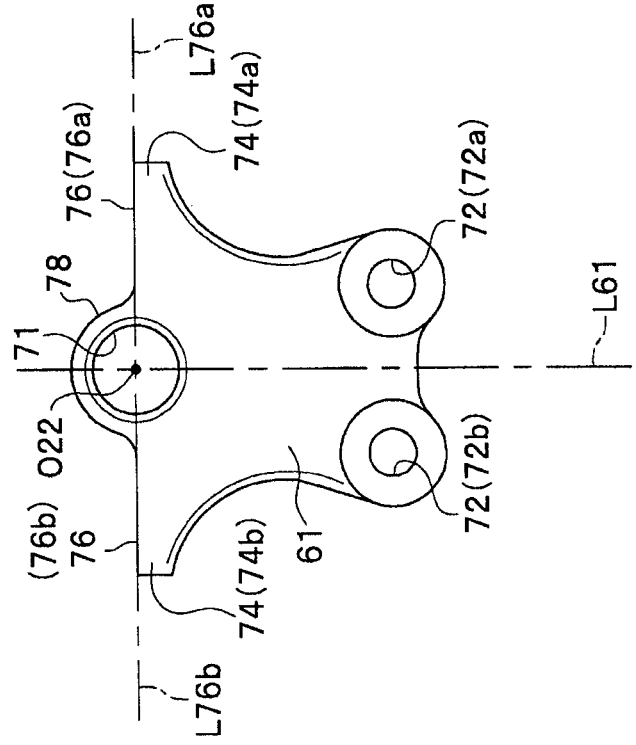

Subsequently, the configuration of the arm stopper mechanism 60 according to the comparative example will described with reference to FIGS. 23 to 26B for easy understanding of the characteristics of the arm stopper mechanism 160 according to the first embodiment. FIG. 23 is a schematic side view illustrating the configuration of the motor-driven power steering apparatus 1 with the arm stopper mechanism 60 according to the comparative example. FIG. 24 is a schematic bottom view illustrating the configuration of the arm stopper mechanism 60. FIGS. 25A and 25B are schematic bottom views illustrating the configuration of a steering arm 61 of the arm stopper mechanism 60. FIGS. 26A and 26B are schematic bottom views illustrating the configuration of a stopper 62 of the arm stopper mechanism 60.

The motor-driven power steering apparatus 1 according to the comparative example illustrated in FIG. 23 is the same apparatus as the motor-driven power steering apparatus 101 according to the first embodiment. Instead of the arm stopper mechanism 160 according to the first embodiment, the arm stopper mechanism 60 according to the comparative example is provided near a lower surface of a housing 13.

FIG. 24 is a bottom view illustrating the configuration of the arm stopper mechanism 60. As illustrated in FIG. 24, the arm stopper mechanism 60 includes the steering arm 61 that turns about the input shaft 22.

In the arm stopper mechanism 60 illustrated in FIG. 24, an angle θar made by striking surfaces 76a and 76b (refer to FIGS. 25A and 25B) of the steering arm 61 is set to be 180°. An angle θst made by the contact surfaces 86a and 86b (refer to FIGS. 26A and 26B) of the stopper 62 (angle between two contact surfaces 86a and 86b, and an angle formed in the stopper 62) is set to be 90°. A total angle θdr is the sum of the maximum clockwise steering angle and the maximum counter-clockwise angle of the steering arm 61, and is set to be 90° (that is, the maximum clockwise steering angle is 45°, and the maximum counter-clockwise steering angle is 45°).

FIGS. 25A and 25B illustrate the specific configuration of the steering arm 61. FIG. 25A illustrates the configuration of portions of the steering arm 61, and FIG. 25B illustrates the disposition position of each portion of the steering arm 61.

As illustrated in FIG. 23, the entirety of a portion (hereinafter, refer to as a "main body") of the steering arm 61 has a plate shape, and the tie rods 8 are attached to the portion.

As illustrated in FIGS. 25A and 25B, the steering arm 61 is provided with one output shaft hole 71 and two tie rod holes 72a and 72b. The output shaft hole 71 is a circular hole into which the output shaft 22 is fitted. The tie rod holes 72a and 72b are circular holes to which the tie rods 8 are respectively attached. Hereinafter, the tie rod holes 72a and 72b are referred to as a "tie rod hole 72" as a generic term.

The output shaft 22 is fitted into the output shaft hole 71, and thereby the center point of the output shaft hole 71 coincides with a center point O22 of the output shaft 22. Hereinafter, the center point of the output shaft hole 71 may refer to the "center point O22".

The tie rod holes 72a and 72b are respectively disposed at positions which are equally separated from a center line L61 of the steering arm 61 to the left and the right. In the example illustrated in FIGS. 25A and 25B, a center point O72 of each of the tie rod holes 72a and 72b is disposed at a position which is separated by a distance of T72 from the center point O22 of the output shaft hole 71 to the rear, and which is separated by a distance of H72 from the center line L61 of the steering arm 61 to the right or the left.

Here, the "center line L61 of the steering arm 61" is an imaginary straight line that passes through the center point O22 of the output shaft hole 71 and extends in a longitudinal direction of the vehicle. When the steering angle of the handlebars 2 is 0° in a neutral state, the "center line L61 of the steering arm 61" coincides with a "center line L62 (refer to FIGS. 26A and 26B) of the stopper 62" which will be described later. The "center line L62 of the stopper 62" is an imaginary straight line (hereinafter, referred to as a "center line of the entirety of the vehicle") that passes through the center point of the vehicle in the lateral direction and extends in the longitudinal direction of the vehicle.

The steering arm 61 includes portions (hereinafter, referred to as "striking portions") 74a and 74b which strike against the stopper 62. The striking portions 74a and 74b are respectively provided in the vicinities of opposite sides of the output shaft hole 71 of the main body (portion to which the tie rods 8 are attached) of the plate-shaped steering arm 61. The end surfaces of the striking portions 74a and 74b are respectively made as flat surfaces (hereinafter, referred to as "striking surfaces") 76a and 76b which strike against the stopper 62. Hereinafter, the striking portions 74a and 74b are referred to as a "striking portion 74" as a general term. The striking surfaces 76a and 76b are referred to as a "striking surface 76" as a general term.

In the steering arm 61, an angle θ76 made by the center line L61 of the steering arm 61 and the striking surface 76 is set to be 90°. Accordingly, the angle θar made by the striking surfaces 76a and 76b (angle between two striking surfaces 76a and 76b, and an angle formed in the steering arm 61) is set to be 180°.

In FIGS. 25A and 25B, a line L76a is an imaginary straight line that is disposed along the striking surface 76a. A line L76b is an imaginary straight line that is disposed along the striking surface 76b. The lines L76a and L76b intersect at the center point O22 of the output shaft hole 71. A length H76 is the distance from the center point O22 of the output shaft hole 71 to an end portion of the striking surface 76 in the steering arm 61.

The steering arm 61 includes a circular arc portion 78 that surrounds the output shaft hole 71, and the surrounding shape of the circular arc portion 78 is a circular arc shape. The circular arc portion 78 is formed to be continuous with the striking portions 74a and 74b. In FIGS. 25A and 25B, a length H78 is the distance from the center point O22 of the output shaft hole 71 to an end portion of the circular arc portion 78 in the steering arm 61.

FIGS. 26A and 26B illustrate the specific configuration of the stopper 62. FIG. 26A illustrates the configuration of portions of the stopper 62, and FIG. 26B illustrates the disposition position of each portion of the stopper 62.

As illustrated in FIG. 23, the stopper 62 is provided to protrude downward from the lower surface of the housing 13 of the motor-driven power steering apparatus 1. As illustrated in FIGS. 26A and 26B, when seen from below, the shape of the stopper 62 is made by forming a flabellate cut-away portion 81 (refer to FIG. 26A) having a radius of H81 in an apex portion of an isosceles triangle that has the center point O22 of the output shaft 22 as an apex, a bottom side having a length of H62, and an oblique side having a length of (H81+H86), and thereby the stopper 62 is bilaterally symmetrical with respect to the center line L62 thereof.

In the description herein, the "center line L62 of the stopper 62" is an imaginary straight line that passes through the center point O22 of the output shaft 22 and extends in the longitudinal direction. The "center line L62 of the stopper 62" is the center line of the entirety of the vehicle.

The stopper 62 includes two flat surfaces 86a and 86b that are respectively positioned on the oblique lines of the isosceles triangles, and the flat surfaces 86a and 86b function as contact surfaces that are brought into contact with the striking surfaces 76a and 76b of the steering arm 61, respectively. Hereinafter, the flat surface 86a is referred to as the "contact surface 86a", and the flat surface 86b is referred to as the "contact surface 86b". The contact surfaces 86a and 86b are referred to as the "contact surface 86" as a generic term.

An angle θ86 made by the center line L62 of the stopper 62 and the contact surface 86 is set to be 45°. Accordingly, the angle θst made by the contact surfaces 86a and 86b (angle between two contact surfaces 86a and 86b, and an angle formed in the stopper 62) is set to be 90°.

In FIGS. 26A and 26B, a line L86a is an imaginary straight line that is disposed along the contact surface 86a. A line L86b is an imaginary straight line that is disposed along the contact surface 86b. The lines L86a and L86b intersect at the center point O22 of the output shaft 22.

Figure 27:
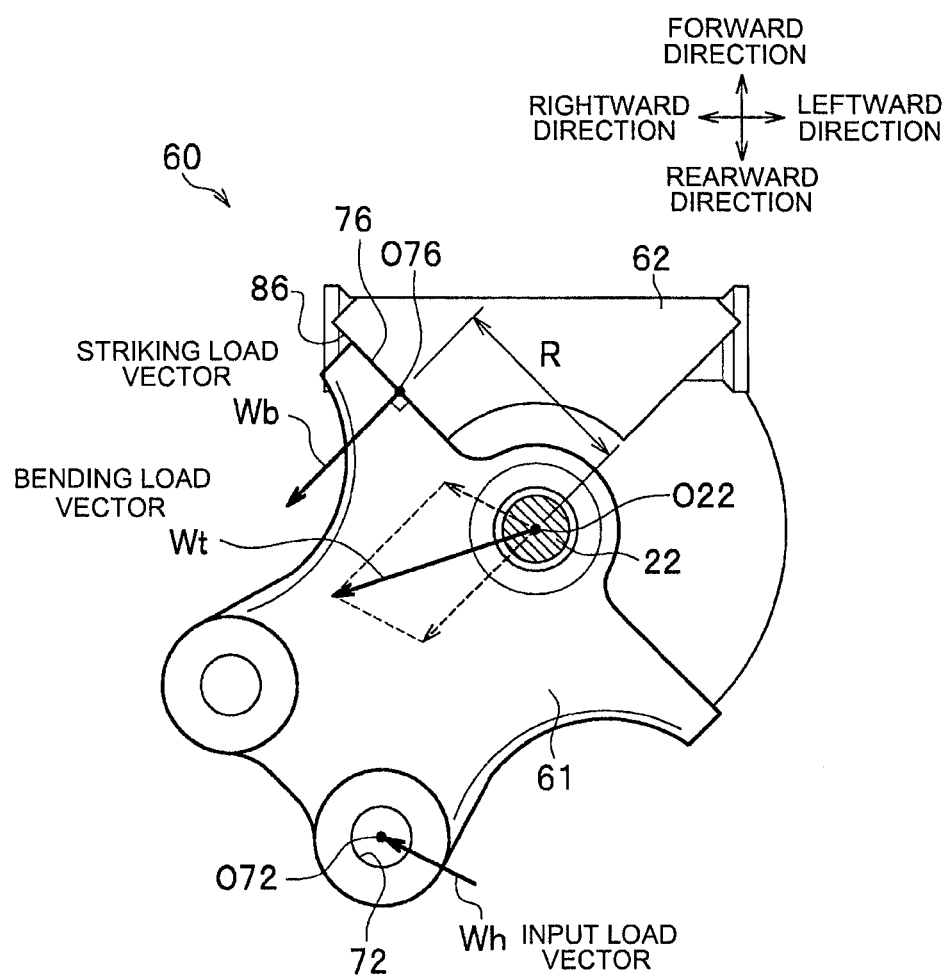
FIG. 27 is a view illustrating load vectors applied to main portions of the arm stopper mechanism according to the comparative example.

4-2: Load Vectors Applied to Main Portions of Arm Stopper Mechanism according to Comparative Example Subsequently, load vectors applied to main portions of the arm stopper mechanism 60 according to the comparative example will be described with reference to FIG. 27. FIG. 27 is a view illustrating the load vectors applied to the main portions of the arm stopper mechanism 60.

In the description herein, the "input load vector Wh" refers to a load vector that is input to the steering arm 61 from the wheel 9 (refer to FIG. 23) via the tie rod hole 72, the "striking load vector Wb" refers to a load vector that is applied to the striking surface 76 of the steering arm 61 from the contact surface 86 of the stopper 62, and the "bending load vector Wt" refers to a load vector that is applied to the output shaft 22 fitted into the output shaft hole 71 (refer to FIG. 25A).

In the description herein, a "striking center position O76" refers to a center position of a contact portion between the striking surface 76 of the steering arm 61 and the contact surface 86 of the stopper 62, and the striking load vector Wb is applied to the striking center position O76. In the example illustrated in FIG. 27, the striking center position O76 is set to a position that is separated by a distance of R from the center point O22 of the output shaft 22.

The description herein will be given based on an assumption that the handlebars 2 are turned to the maximum steering angle in the counter-clockwise direction so as to turn the travelling saddle-type vehicle 100 to the left to the maximum, as illustrated in FIG. 27, thereby the right striking surface 76b of the striking arm 61 striking the right contact surface 86b of the stopper 62, and the rear of the side surface of the left wheel (the left front wheel) 9 colliding with the protrusion 511 (refer to FIG. 6). At this time, according to the principle described in Section 3: Load Vectors Applied to Steering Arm, as illustrated in FIG. 27, in the arm stopper mechanism 60, the input load vector Wh is applied to the surroundings of the left tie rod hole 72, and the striking load vector Wb is applied to the striking center position O76. The bending load vector Wt, which is a combined vector of the input load vector Wh and the striking load vector Wb, is applied to the output shaft 22.

When the value of the bending load vector Wt increases, an excessive load may be applied to the bearings 32A and 32B (refer to FIG. 3) which support the output shaft 22; the bearing 31 (refer to FIG. 3) that supports the input shaft 21 which is connected to the output shaft 22 via the torsion bar 27; and the housing 113 (refer to FIG. 3) in the vicinity of the bearings 32A, 32B, and 31. The output shaft 22 is connected to the handlebars 2 via the torsion bar 27, the input shaft 21, and the steering shaft 4. For this reason, when the value of the bending load vector Wt increases, a bending load as a strong reaction force propagates to the handlebars 2, and thereby the control of the handlebars 2 becomes difficult.

In this configuration, the value of the bending load vector Wt is the value of a combined vector of the input load vector Wh and the striking load vector Wb. When the striking surface 76 of the steering arm 61 is in contact with the contact surface 86 of the stopper 62, the direction of the input load vector Wh is determined by a direction in which the tie rod 8 (refer to FIG. 23) is attached to the tie rod hole 72. The direction of the striking load vector Wb is perpendicular to the striking surface 76 of the steering arm 61.

5: Relationship between Input Load Vector and Striking Load Vector, and Bending Load Vector Subsequently, a relationship between the input load vector Wh and the striking load vector Wb, and the bending load vector Wt will be described with reference to FIGS. 27 and 28A to 28C. FIGS. 28A to 28C are schematic views illustrating the relationship between the input load vector Wh and the striking load vector Wb, and the bending load vector Wt, FIG. 28A is a schematic view for the comparative example illustrated in FIG. 27, and FIGS. 28B and 28C are schematic views for other review examples. The description herein will be given based on an assumption that as illustrated in FIG. 27, the right striking surface 76b of the steering arm 61 strikes against the right contact surface 86b of the stopper 62.

FIGS. 28A to 28C illustrate how the value of the bending load vector Wt changes in a case where as illustrated in FIG. 27, the right striking surface 76b of the steering arm 61 strikes against the right contact surface 86b of the stopper, and the disposition direction of each of the striking surface 76 of the steering arm 61 and the contact surface 86 of the stopper 62 is changed. In FIGS. 28A to 28C, a positional relationship between the center point O72 of the tie rod hole 72, the striking center position O76, and the center point O22 of the output shaft 22 is as illustrated in FIG. 27.

FIG. 28A illustrates a state where the disposition direction of each of the striking surface 76 of the steering arm 61 and the contact surface 86 of the stopper 62 illustrated in FIG. 27 is not changed. That is, in the example illustrated in FIG. 28A, the angle θ76 made by the center line L61 and the striking surface 76 in the steering arm 61 is set to be 90°. In other words, in the example illustrated in FIG. 28A, the angle θ86 made by the center line L62 and the contact surface 86 in the stopper 62 is set to be 45°.

In the example illustrated in FIG. 28B, the disposition direction of the striking surface 76 of the steering arm 61 is tilted by an angle of θb1 from the state illustrated in FIG. 28A toward the center line L61 in such a manner that the direction of the input load vector Wh is perpendicular to the direction of the striking load vector Wb. That is, in the example illustrated in FIG. 28B, the angle θ76 made by the center line L61 and the striking surface 76 in the steering arm 61 is set to an angle of (90−θb1)° that is less than 90°. In other words, in the example illustrated in FIG. 28B, the angle θ86 made by the center line L62 and the contact surface 86 in the stopper 62 is set to an angle of (45+θb1)° that is greater than 45°.

In the example illustrated in FIG. 28C, the disposition direction of the striking surface 76 of the steering arm 61 is tilted by an angle of θb2 (here, the angle θb2>the angle θb1) from the state illustrated in FIG. 28A toward the center line L61. That is, in the example illustrated in FIG. 28C, the angle θ76 made by the center line L61 and the striking surface 76 in the steering arm 61 is set to an angle of (90−θb2)° that is smaller than the angle of (90−θb1)° in the state in FIG. 28B. In other words, in the example illustrated in FIG. 28C, the angle θ86 made by the center line L62 and the contact surface 86 in the stopper 62 is set to an angle of (45+θb2)° that is larger than the angle of (45+θb1)°.

A described above, the value of the bending load vector Wt is the value of a combined vector of the input load vector Wh and the striking load vector Wb. For this reason, if it is assumed that the steering arm 61 collides with the stopper 62, and the attachment direction of the tie rod 8 remains the same with respect to the steering arm 61, in other words, if it is assumed that the direction of the input load vector Wh, that is, the attachment direction of the tie rod 8 remains the same, the value of the bending load vector Wt tends to increase as an angle θhb made by the respective directions of the input load vector Wh and the striking load vector Wb decreases. In contrast, the value of the bending load vector Wt tends to decrease as the angle θhb made by the respective directions of the input load vector Wh and the striking load vector Wb increases.

In the example illustrated in FIG. 28A, the angle θhb made by the respective directions of the input load vector Wh and the striking load vector Wb is an acute angle (angle of 0° or greater and less than 90°). In the example illustrated in FIG. 28B, the angle θhb made by the respective directions of the input load vector Wh and the striking load vector Wb is a right angle (90°). In the example illustrated in FIG. 28C, the angle θhb made by the respective directions of the input load vector Wh and the striking load vector Wb is an obtuse angle (90° to 180°).

For this reason, in the example illustrated in FIG. 28A, the value of the bending load vector Wt becomes greater than the value (value of the bending load vector Wt in the state illustrated in FIG. 28B) of a combined vector of the input load vector Wh and the striking load vector Wb which are orthogonal to each other. In contrast, in the example illustrated in FIG. 28C, the value of the bending load vector Wt becomes less than the value (value of the bending load vector Wt in the state illustrated in FIG. 28B) of a combined vector of the input load vector Wh and the striking load vector Wb which are orthogonal to each other.

Accordingly, as illustrated in FIG. 28C, in the arm stopper mechanism 60, the input load vector Wh and the striking load vector Wb are applied to cancel each other out by increasing the angle θhb which is made by the respective directions of the input load vector Wh and the striking load vector Wb, and thereby it is possible to reduce the value of the bending load vector Wt applied to the output shaft 22.

Here, as described above, FIG. 28A illustrates the example in which the angle θ76 made by the center line L61 and the striking surface 76 in the steering arm 61 is set to be 90°, that is, the example in which the angle θ86 made by the center line L62 and the contact surface 86 in the stopper 62 is set to be 45°.

FIG. 28B illustrates the example in which the angle θ76 made by the center line L61 and the striking surface 76 in the steering arm 61 is set to be the angle of (90−θb1)° which is less than 90°, that is, the example in which the angle θ86 made by the center line L62 and the contact surface 86 in the stopper 62 is set to be the angle of (45+θb1)° which is greater than 45°.

FIG. 28C illustrates the example in which the angle θ76 made by the center line L61 and the striking surface 76 in the steering arm 61 is set to be the angle of (90−θb2)° which is much smaller than the angle of (90−θb1)°, that is, the example in which the angle θ86 made by the center line L62 and the contact surface 86 in the stopper 62 is set to be the angle of (45+θb2)° which is much greater than the angle of (45+θb1)°.

Accordingly, as can be understood from the relationship illustrated in FIGS. 28A to 28C, as the angle θ76 made by the center line L61 and the striking surface 76 decreases, or the angle θ86 made by the center line L62 and the contact surface 86 in the stopper 62 increases, the angle θhb made by the respective directions of the input load vector Wh and the striking load vector Wb increases.

For this reason, in the arm stopper mechanism 60, it is possible to increase the angle θhb made by the respective directions of the input load vector Wh and the striking load vector Wb, by decreasing the angle θ76 made by the center line L61 and the striking surface 76 in the steering arm 61 (that is, by increasing the angle θ86 made by the center line L62 and the contact surface 86 in of the stopper 62). Accordingly, in the arm stopper mechanism 60, the input load vector Wh and the striking load vector Wb can be applied to cancel each other out, and thereby it is possible to reduce the value of the bending load vector Wt applied to the output shaft 22.

In designing the configuration of the arm stopper mechanism 60 according to the comparative example, the following point is not taken into consideration: the input load vector Wh and the striking load vector Wb are applied to cancel each other out so as to reduce the value of the bending load vector Wt applied to the output shaft 22. For this reason, in the arm stopper mechanism 60, a relatively large bending load may be applied to the output shaft 22, and at this time, an excessive load may be applied to the bearings 32A and 32B (refer to FIG. 3) which support the output shaft 22; the bearing 31 (refer to FIG. 3) that supports the input shaft 21 which is connected to the output shaft 22 via the torsion bar 27; and the housing 113 (refer to FIG. 3) in the vicinity of the bearings 32A, 32B, and 31. At this time, a bending load as a strong reaction force propagates to the handlebars 2, and thereby the control of the handlebars 2 becomes difficult.

6-1: Configuration of Arm Stopper Mechanism according to First Embodiment

In this regard, as in the arm stopper mechanism of the review example illustrated in FIG. 28C, in the configuration of the arm stopper mechanism 160 (refer to FIGS. 2 and 7) according to the first embodiment, the angle θhb (refer to FIG. 11) made by the respective directions of the input load vector Wh and the striking load vector Wb is set to be greater than the angle θhb (is preferably set to be an obtuse angle) (refer to FIG. 28A) of the arm stopper mechanism 60 according to the comparative example so as to reduce a value of the bending load vector Wt applied to the output shaft 22.

That is, as illustrated in FIG. 6, according to the configuration of the arm stopper mechanism 160 according to the first embodiment, in a case where the saddle-type vehicle 100 is turned to the maximum while travelling, the steering arm 161 comes into contact with the stopper 162, and the striking load vector Wb is input to the steering arm 161, when the wheel (front wheel) 9 on an inner side during the turning collides with the protrusion (stone or the like) 511, and the input load vector Wh is input to the steering arm 161 via the tie rod 8, and the bending load vector Wt (refer to FIG. 11), which is applied to the output shaft 22 from the steering arm 161, and bends the output shaft 22, is reduced.

Specifically, as illustrated in FIG. 8, in the configuration of the arm stopper mechanism 160 according to the first embodiment, an angle θ176 made by a center line L161 and the striking surface 176 in the steering arm 161 is set to be smaller than the angle θ76 (refer to FIG. 28A) of the arm stopper mechanism 60 according to the comparative example, or an angle θ186 made by a center line L162 and the striking surface 186 in the stopper 162 is set to be greater than the angle θ86 (refer to FIG. 28A) of the arm stopper mechanism 60 according to the comparative example.

Hereinafter, the configuration of the arm stopper mechanism 160 according to the first embodiment will be described with reference to FIGS. 7 to 10B. FIG. 7 is a schematic bottom view illustrating the configuration of the arm stopper mechanism 160. FIGS. 8A and 8B are schematic bottom views illustrating the steering arm 161 of the arm stopper mechanism 160. FIG. 8A illustrates the configuration of portions of the steering arm 161, and FIG. 8B illustrates the disposition position of each portion of the steering arm 161. FIGS. 9A and 9B are schematic bottom views illustrating the configuration of the stopper 162 of the arm stopper mechanism 160. FIG. 9A illustrates the configuration of portions of the stopper 162, and FIG. 9B illustrates the disposition position of each portion of the stopper 162. FIGS. 10A and 10B are schematic views illustrating an ideal dispositional relationship between the members of the arm stopper mechanism 160.

As illustrated in FIG. 7, the arm stopper mechanism 160 is different from the arm stopper mechanism 60 according to the comparative example, in that the shapes of the steering arm 161 and the stopper 162 are different from those of the arm stopper mechanism 60.

FIG. 7 is a bottom view illustrating the configuration of the arm stopper mechanism 160. As illustrated in FIG. 7, the arm stopper mechanism 160 includes the steering arm 161 that turns about the output shaft 22, and the stopper 162. The steering arm 161 is spline-joined to the output shaft 22, and the steering arm 161 together with the output shaft 22 turns about the center point O22 (center axis line) of the output shaft 22.

As illustrated in FIG. 2, the entirety of a main body of the steering arm 161 (portion of the steering arm 161 to which the tie rods 8 are attached) is made to have a plate shape. As illustrated in FIG. 7 and FIGS. 8A and 8B, when seen from below, the steering arm 161 is deployed in a fan shape, the center angle of which is an acute angle, and the opposite wings of which are respectively bent circumferentially outward from middle points of the wings. That is, the width of the steering arm 161 increases gradually from a proximal end portion to a distal end portion of the steering arm 161. The steering arm 161 is bilaterally symmetrical with respect to the center line L161. The tip end portion of each of opposite side surfaces of the steering arm 161 is bent circumferentially outward further than a substantially radial middle portion of each side surface.

As illustrated in FIGS. 8A and 8B, the steering arm 161 is made into a shape in which an output shaft hole 171 is disposed at the position of a pivot (center axis) of the fan shape, and two tie rod holes 172a and 172b are respectively disposed at arbitrary positions in the vicinity of a free end (outer circumferential edge) of the fan shape. Hereinafter, the tie rod holes 172a and 172b are referred to as the "tie rod holes 172" as a generic term. That is, the output shaft hole 171 having a circular cross section passes through the proximal end portion of the steering arm 161, and the tie rod holes 172a and 172b pass through the distal end portion thereof.

The output shaft 22 is fitted into the output shaft hole 171, and thereby the center point of the output shaft hole 171 coincides with the center point O22 of the output shaft 22. Hereinafter, the center point of the output shaft hole 171 refers to the "center point O22".

The tie rod holes 172a and 172b are respectively disposed at positions which are equally separated from the center line L161 of the steering arm 161 to the left and the right. The center line L161 is an imaginary line that extends through the center point O22 of the output shaft hole 171 in a radial direction, and bisects the substantially fan-shaped steering arm 161 in the circumferential direction. That is, the center line L161 is a center line of the circumferential symmetry of the steering arm 161. In the example illustrated in FIGS. 8A and 8B, a center point O172 of each of the tie rod holes 172a and 172b is disposed at a position which is separated by a distance of T172 from the center point O22 of the output shaft hole 171 to the rear, and which is separated a distance of H172 from the center line L161 of the steering arm 161 to the right or the left.

In the description herein, the "center line L161 of the steering arm 161" is an imaginary straight line that passes through the center point O22 of the output shaft hole 171 and extends in the longitudinal direction. When the steering angle of the handlebars 2 is 0° in a neutral state, the "center line L161 of the steering arm 161" coincides with a "center line L162 (refer to FIGS. 9A and 9B) of the stopper 162" which will be described later. The "center line L162 of the stopper 162" is the center line of the entirety of the vehicle (imaginary straight line that passes through the center point of the vehicle in the lateral direction and extends in the longitudinal direction of the vehicle).

The steering arm 161 includes a circular arc portion 178 having a radius of H178 that surrounds the output shaft hole 171, and the surrounding shape of the circular arc portion 178 is a circular arc shape. The steering arm 161 includes portions (portions that project outward) 174a and 174b which are respectively bent circumferentially outward from the middle points of the opposite wings of the fan shape, and the portions 174a and 174b function as striking portions which strike against the stopper 162. Hereinafter, the portions 174a and 174b are respectively referred to as "striking portion 174a" and "striking portion 174b". The striking portions 174a and 174b are referred to as the "striking portion 174" as a generic term.

The striking portions 174a and 174b include flat surfaces 176a and 176b which are formed in side portions of the main body (portion to which the tie rods 8 are attached) of the plate-shaped steering arm 161, respectively, and the flat surfaces 176a and 176b function as striking surfaces which strike against the stopper 162. That is, in the opposite side surfaces of the steering arm 161, the striking surfaces 176a and 176b are formed closer to the distal end portion than the middle portion in the radial direction. Hereinafter, the flat surfaces 176a and 176b are referred to as "striking surfaces 176a and 176b", respectively. The striking surfaces 176a and 176b are referred to as the "striking surface 176" as a generic term.

In FIGS. 8A and 8B, a line L176a is an imaginary straight line that is disposed along the striking surface 176a. A line L176b is an imaginary straight line that is disposed along the striking surface 176b. A length H176 is the distance between a point O162 at which the lines L176a and 176b of the steering arm 161 intersect, and an end portion of the striking surface 176.

In contrast, as illustrated in FIG. 2, the stopper 162 is provided to protrude downward from the lower surface of the housing 113 of the motor-driven power steering apparatus 101. As illustrated in FIGS. 9A and 9B, when seen from below, the shape of the stopper 162 is made by joining (assembling) a lower base of a trapezoidal portion 162a having a substantially trapezoidal shape to a long side of a rectangular portion 162b having a substantially rectangular shape.

The trapezoidal portion 162a and the rectangular portion 162b are disposed so as to perpendicularly intersect the center line L162 of the stopper 162, and extend in the lateral direction. In the description herein, the "center line L162 of the stopper 162" is an imaginary straight line that passes through the center point O22 of the output shaft 22 and extends in the longitudinal direction. The "center line L162 of the stopper 162" is the center line of the entirety of the vehicle.

The trapezoidal portion 162a and the rectangular portion 162b are disposed in such a manner that the center point O22 of the output shaft 22 coincides with a center point of the lower base of the trapezoidal portion 162a and a center point of the long side of the rectangular portion 162b. A cut-away portion 181 (refer to FIG. 9A) is formed in the stopper 162, and the cut-away portion 181 is concave near a front side and has a semicircular shape so as to surround a front half of the output shaft 22 while having the center point O22 of the output shaft 22 as its center. That is, the cut-away portion 181 is a semicircular concave portion which is formed at the lateral center of a rear edge portion of the stopper 162, and the rear of which is open. The output shaft 22 is inserted into the cut-away portion 181, and the center point O22 of the output shaft 22 is disposed inside the cut-away portion 181.

The amount of protrusion of the stopper 162 from the lower surface of the housing 113 increases from a front end of the trapezoidal portion 162a to a rear end of the rectangular portion 162b. The contact surfaces 186a and 186b are respectively formed on left and right sides of the cut-away portion 181 in a rear end surface of the rectangular portion 162b. According to the configuration of the stopper 162, only the contact surface 186 is brought into contact with the steering arm 161.

In the example illustrated in FIGS. 9A and 9B, the shape of the trapezoidal portion 162a is made to have an upper base having a width of H162a; the lower base having a width of H162b; and a height of T162a. The shape of the rectangular portion 162b is made to have a long side having a width of H162b, and a short side having a width of T162b.

The short side of the rectangular portion 162b is set to have a width of T162b that is the same value as a separation distance T176 (refer to FIG. 8B) set in the steering arm 161. The separation distance T176 is the distance between the striking surface 176, and a parallel plane that passes through the center point O22 of the output shaft hole 171 of the steering arm 161 and is parallel with the striking surface 176. The flat surfaces 186a and 186b are positioned on the other long side of the rectangular portion 162b, which is not joined to the trapezoidal portion 162a, and the flat surfaces 186a and 186b function as the contact surfaces that are brought into contact with the striking surface 176 (refer to FIG. 8A) of the steering arm 161. Hereinafter, the flat surfaces 186a and 186b are respectively referred to as "contact surfaces 186a and 186b". The contact surfaces 186a and 186b are referred to as the "contact surface 186" as a general term.

In the stopper 162, the angle θ186 made by the center line L162 of the stopper 162 and the contact surface 186 is set to be 90°. Accordingly, an angle θst1 made by the contact surfaces 186a and 186b (angle between two contact surfaces 186a and 186b, and an angle formed in the stopper 162) is set to be 180°. That is, the contact surfaces 186a and 186b are open at an angle of 180°, and the center of the opening is located at a lateral middle position (point O186) of the rear edge portion of the rectangular portion 162b.

In FIGS. 9A and 9B, a line L186a is an imaginary straight line that is disposed along the contact surface 186a. A line L186b is an imaginary straight line that is disposed along the contact surface 186b. The point O186 is a point at which the lines L186a and 186b of the stopper 162 intersect. In the example illustrated in FIGS. 9A and 9B, since the angle θst1 is set to be 180°, the lines L186a and L186b overlap each other.

In the arm stopper mechanism 160, the portions of the steering arm 161 are preferably configured as illustrated in FIGS. 10A and 10B. FIGS. 10A and 10B are schematic views illustrating an ideal configuration of the members of the arm stopper mechanism 160. FIG. 10A illustrates the disposition position of each portion of the steering arm 161, and FIG. 10B illustrates the disposition angle of each of the striking surfaces 176a and 176b of the steering arm 161.

Here, the disposition position of the striking surface 176 (refer to FIG. 8A) of the steering arm 161 will be mainly described. In the stopper 162 (refer to FIGS. 2 and 7) struck by the striking surface 176 of the steering arm 161, the portions of the stopper 162 are configured to correspond to the steering arm 161.

In FIGS. 10A and 10B, the line L161 is the center line of the steering arm 161. The point O22 indicates the center point of the output shaft hole 171 (refer to FIG. 8A) of the steering arm 161, and the center point of the output shaft 22. The point O172 is the center point of the tie rod hole 172 (refer to FIG. 8A) of the steering arm 161. A point O176 is the striking center position of the steering arm 161 (that is, a center position of a contact portion between the striking surface 176 of the steering arm 161 and the contact surface 186 (refer to FIG. 9A) of the stopper 162 according to the first embodiment). A length H172 is the distance from the center line L161 of the steering arm 161 to the center point O172 of the tie rod hole 172.

In the arm stopper mechanism 160, as can be understood from the characteristics of the arm stopper mechanism 60 according to the comparative example illustrated in FIG.

28A, and the arm stopper mechanism according to the first and second review examples illustrated in FIGS. 28B and 28C, it is possible to increase the angle θhb made by the respective directions of the input load vector Wh and the striking load vector Wb, by decreasing the angle θ176 made by the center line L161 and the striking surface 176 in the steering arm 161, or by increasing the angle θ186 made by the center line L162 and the contact surface 186 in the stopper 162. Accordingly, in the arm stopper mechanism 160, the input load vector Wh and the striking load vector Wb can be applied to cancel each other out, and thereby it is possible to reduce the value of the bending load vector Wt applied to the output shaft 22.

In the arm stopper mechanism 160, the angle θ176 made by the center line L161 and the striking surface 176 in the steering arm 161 is set to be smaller than the angle θ76 (refer to FIG. 28A) of the steering arm 61 of the arm stopper mechanism 60 according to the comparative example. That is, in the arm stopper mechanism 160, the angle θ186 made by the center line L162 and the contact surface 186 in the stopper 162 is set to be greater than the angle θ86 (refer to FIG. 28A) of the stopper 62 of the arm stopper mechanism 60 according to the comparative example.

The arm stopper mechanism 160 is required to restrict the turning angle of the handlebars 2 to an angle smaller than the maximum steering angle in order for the vehicle not to roll over in the lateral direction. For this reason, for example, in the steering arm 161 of the arm stopper mechanism 160, an optimum disposition angle for the angle θ176 is set to 45°, and an allowable design angle (hereinafter, referred to as an "allowable tilt angle") with respect to the angle θ176 is set to an angle of θα (for example, 10°) so that the maximum steering angle of the handlebars 2 can be defined.

In order to satisfy these conditions, the arm stopper mechanism 160 is configured as follows: the striking surfaces 176a and 176b of the steering arm 161 are disposed to be tilted by an angle of $(45\pm\theta\alpha)°$ in opposite directions with respect to the center line L161, and the center of the tilting is the arbitrary point O162 on the center line L161 of the steering arm 161. That is, an angle θar1 made by the striking surfaces 176a and 176b of the steering arm 161 (angle between the two striking surfaces 176a and 176b, and an angle formed in the steering arm 161) is set to an angle of $(90\pm2\times\theta\alpha)°$. As such, the striking surfaces 176a and 176b are open at an angle of $(90\pm2\times\theta\alpha)°$, and the center of the opening is the point O162 on the center line L186.

For example, FIG. 7 illustrates the configuration of the arm stopper mechanism 160 when the allowable tilt angle θα is set to be 0°. In the example illustrated in FIG. 7, the angle θar1 made by the striking surfaces 176a and 176b (refer to FIGS. 8A and 8B) of the steering arm 161 is set to be 90°. The angle θst1 made by the contact surfaces 186a and 186b (refer to FIGS. 9A and 9B) of the stopper 162 is set to be 180°. The total angle θdr1, the sum of the maximum clockwise steering angle and the maximum counter-clockwise angle of the steering arm 161, is set to be 90° (that is, the maximum clockwise steering angle is 45°, and the maximum counter-clockwise steering angle is 45°).

Figure 11:
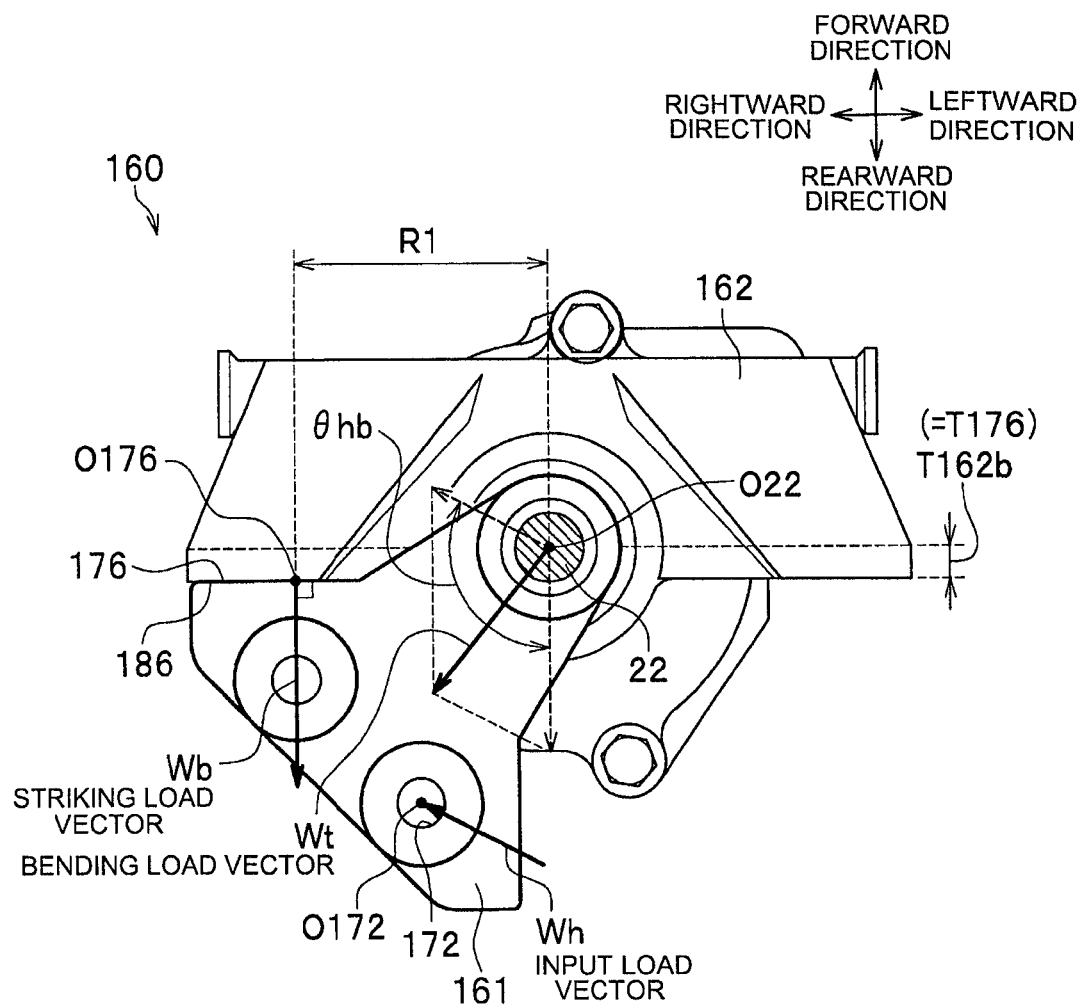
FIG. 11 is a view illustrating load vectors applied to main portions of the arm stopper mechanism according to the first embodiment.

6-2: Load Vectors Applied to Main Portions of Arm Stopper Mechanism according to First Embodiment Subsequently, load vectors applied to the main portions of the arm stopper mechanism 160 according to the first embodiment will be described with reference to FIG. 11. FIG. 11 is a view illustrating load vectors applied to the main portions of the arm stopper mechanism 160.

In the description herein, the "input load vector Wh" refers to a load vector that is input to the steering arm 161 from the wheel 9 (refer to FIG. 2) via the tie rod hole 172, the "striking load vector Wb" refers to a load vector that is applied to the striking surface 176 of the steering arm 161 from the contact surface 186 of the stopper 162, and the "bending load vector Wt" refers to a load vector that is applied to the output shaft 22 fitted into the output shaft hole 171 (refer to FIG. 8A).

In the description herein, the "striking center position O176" refers to the center position of the contact portion between the striking surface 176 of the steering arm 161 and the contact surface 186 of the stopper 162, and the striking load vector Wb is applied to the striking center position O176. In the example illustrated in FIG. 11, the striking center position O176 is set to a position that is separated a distance of R1 from the center point O22 of the output shaft 22 to the right, and the distance T162b (that is, the distance T176 (refer to FIG. 8B)) from the center point O22 to the rear.

The description herein will be given based on an assumption that as illustrated in FIG. 11, the handlebars 2 are turned to the maximum steering angle in the counter-clockwise direction so as to turn the travelling saddle-type vehicle 100 to the left to the maximum, thereby the right striking surface 176b of the steering arm 161 striking the right contact surface 186b of the stopper 162, and the rear of the side surface of the left wheel (the left front wheel) 9 colliding with the protrusion 511 (refer to FIG. 6). At this time, according to the principle described in Section 3: Load Vectors Applied to Steering Arm, as illustrated in FIG. 11, in the arm stopper mechanism 160, the input load vector Wh is applied to the surroundings of the left tie rod hole 172, and the striking load vector Wb is applied to the striking center position O176. The bending load vector Wt, which is a combined vector of the input load vector Wh and the striking load vector Wb, is applied to the output shaft 22.

In this configuration, the value of the bending load vector Wt is the value of a combined vector of the input load vector Wh and the striking load vector Wb. When the striking surface 176 of the steering arm 161 is in contact with the contact surface 186 of the stopper 162, the direction of the input load vector Wh is determined by a direction in which the tie rod 8 (refer to FIG. 2) is attached to the tie rod hole 172. The direction of the striking load vector Wb is perpendicular to the striking surface 176 of the steering arm 161.

In the arm stopper mechanism 160, since the configuration of each of the steering arm 161 and the stopper 162 is as described above, the input load vector Wh and the striking load vector Wb are applied to cancel each other out. For this reason, in the arm stopper mechanism 160, it is possible to reduce the value of the bending load vector Wt applied to the output shaft 22 to further than that applied to the arm stopper mechanism 60 according to the comparative example. For this reason, in the arm stopper mechanism 160, it is possible to reduce a bending load applied to the output shaft 22.

In particular, in the arm stopper mechanism 160, the value of the bending load vector Wt applied to the output shaft 22 is preferably set to be less than or equal to the value of a combined vector of the input load vector Wh and the striking load vector Wb which are orthogonal to each other. Accordingly, in the arm stopper mechanism 160, it is possible to considerably reduce the value of the bending load vector Wt applied to the output shaft 22, and thereby it is possible to efficiently reduce a bending load applied to the output shaft 22.

In the arm stopper mechanism 160, the input load vector Wh and the striking load vector Wb can be applied to cancel each other out by setting the angle θst1 made by two contact surfaces 186 of the stopper 162 to an angle greater than the angle θar1 made by two striking surfaces 176 of the steering arm 161, and to 90° or greater. As a result, in the arm stopper mechanism 160, it is possible to reduce the value of the bending load vector Wt applied to the output shaft 22, and thereby it is possible to reduce a bending load applied to the output shaft 22. Accordingly, in the arm stopper mechanism 160, it is possible to reduce a load applied to the bearings 32A and 32B which support the output shaft 22; the bearing 31 (refer to FIG. 3) that supports the input shaft 21 which is connected to the output shaft 22 via the torsion bar 27; and the housing 113 (refer to FIG. 3) in the vicinity of the bearings 32A, 32B, and 31. A bending load applied to the output shaft 22 is reduced, and thereby the bending load as a strong reaction force does not propagate to the handlebars 2, and it is possible to improve the controllability of the handlebars 2.

However, in the arm stopper mechanism 160, since the angle θst1 made by the two contact surfaces 186 of the stopper 162 is set be greater than the angle θar1 made by the two striking surfaces 176 of the steering arm 161, and to 90° or greater, and it is possible to decrease the angle θar1 of the steering arm 161, it is possible to reduce the size of the steering arm 161.

Hereinafter, this point will be described. In the arm stopper mechanism 160, the steering arm 161 turns about the output shaft 22 in a region in which the stopper 162 is not present. Accordingly, as illustrated in FIG. 7, in the arm stopper mechanism 160, the angle of 360° of the circumference of the output shaft 22 is divided into the angle θst1 made by the two contact surfaces 186 of the stopper 162; the angle θar1 made by the two striking surfaces 176 of the steering arm 161; and the total angle θdr1 of the maximum clockwise steering angle and the maximum counter-clockwise steering angle of the steering arm 161. For this reason, in the configuration of the arm stopper mechanism 160, if the maximum clockwise steering angle and the maximum counter-clockwise steering angle remain unchanged, and the angle θst1 made by the two contact surfaces 186 of the stopper 162 increases, the angle θar1 made by the two striking surfaces 176 of the steering arm 161 decreases. As a result, the circumferential width of the steering arm 161 decreases, and it is possible to reduce the size of the steering arm 161.

In particular, in the configuration of the arm stopper mechanism 160, when the angle θst1 made by the two contact surfaces 186 of the stopper 162 is set to be 180° or greater, the angle θar1 made by the two striking surfaces 176 of the steering arm 161 decreases further. As a result, it is possible to further reduce the size of the steering arm 161 of the arm stopper mechanism 160.

At this time, in the arm stopper mechanism 160, since the size of the steering arm 161 is further reduced, it is possible to bring the striking center position O176 of the striking load vector Wb close to the vicinity of the tie rod hole 72 to which the input load vector Wh is applied. For this reason, at this time, in the arm stopper mechanism 160, it is possible to efficiently prevent the occurrence of vibration.

In the arm stopper mechanism 160, the total angle θdr1 of 90° or greater, which is the sum of the maximum clockwise steering angle and the maximum counter-clockwise angle of the steering arm 161, is preferably ensured. For this reason, in the arm stopper mechanism 160, the total value of the angle θst1 made by the two contact surfaces 186 of the stopper 162, and the angle θar1 made by the two striking surfaces 176 of the steering arm 161 is preferably set to be 270° or less. Here, in the arm stopper mechanism 160, when these conditions are satisfied, it is possible to ensure the total angle θdr1 of 90° or greater, which is the sum of the maximum clockwise steering angle and the maximum counter-clockwise angle of the steering arm 161.

Configuration of Arm Stopper Mechanism Mounting Apparatus

As illustrated in FIG. 2, the motor-driven power steering apparatus 101 according to the first embodiment has attached members such as an apparatus 102 on which the arm stopper mechanism 160 is mounted (hereinafter, referred to as an "arm stopper mechanism mounting apparatus"), an upper holder 46 that is attached to the arm stopper mechanism mounting apparatus 102, and the electric motor 24.

The upper holder 46 is a member that covers an upper portion of the housing 113. In the motor-driven power steering apparatus 101, since the upper holder 46 is attached to the upper portion of the housing 113, it is possible to protect the upper portion of the housing 113, and members (for example, the upper portion of the input shaft 21) which are disposed in the upper portion of the housing 113.

In the arm stopper mechanism mounting apparatus 102 according to the first embodiment, the housing 113 is distinctively provided with a hole (hereinafter, referred to as a "measurement hole") 1100 (refer to FIGS. 12 to 15) for inspecting the sealability of the interior of the housing 113.

Figure 12:
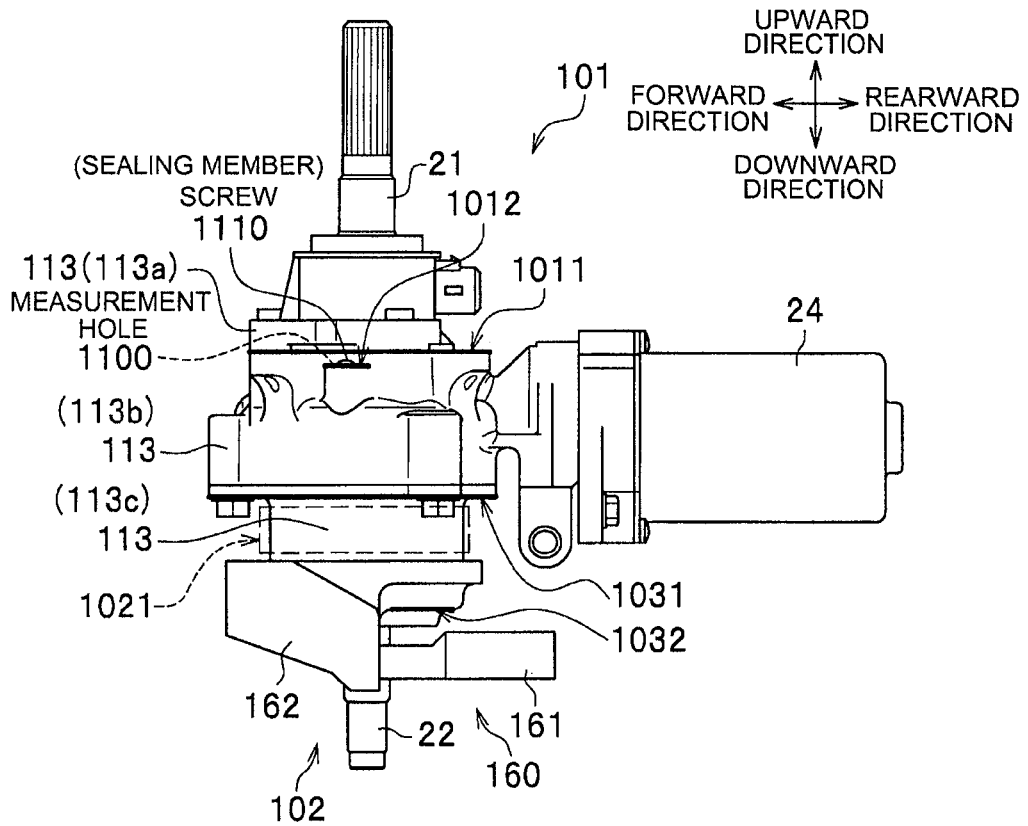
FIG. 12 is a schematic side view illustrating the configuration of an arm stopper mechanism mounting apparatus according to the first embodiment.
Figure 13:
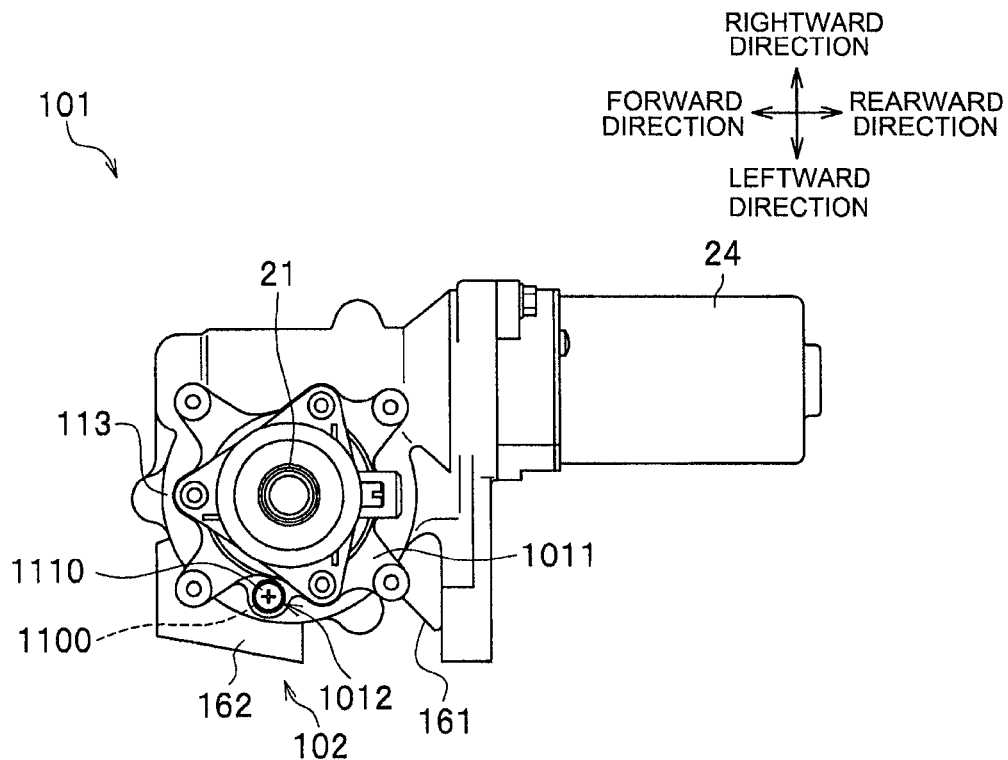
FIG. 13 is a view (1) illustrating the formation position of a measurement hole.
Figure 14:
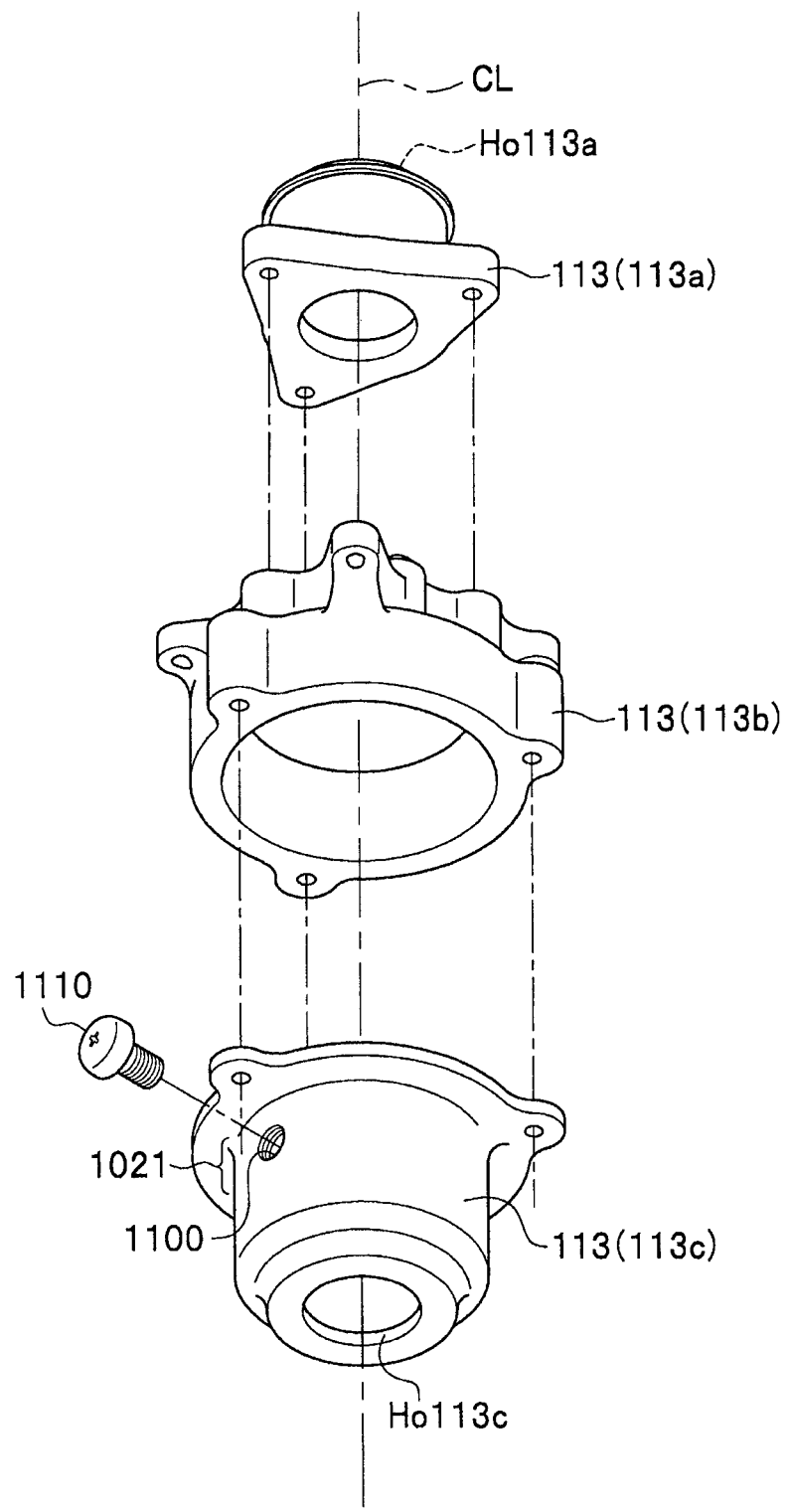
FIG. 14 is a view (2) illustrating the formation position of the measurement hole.
Figure 15:
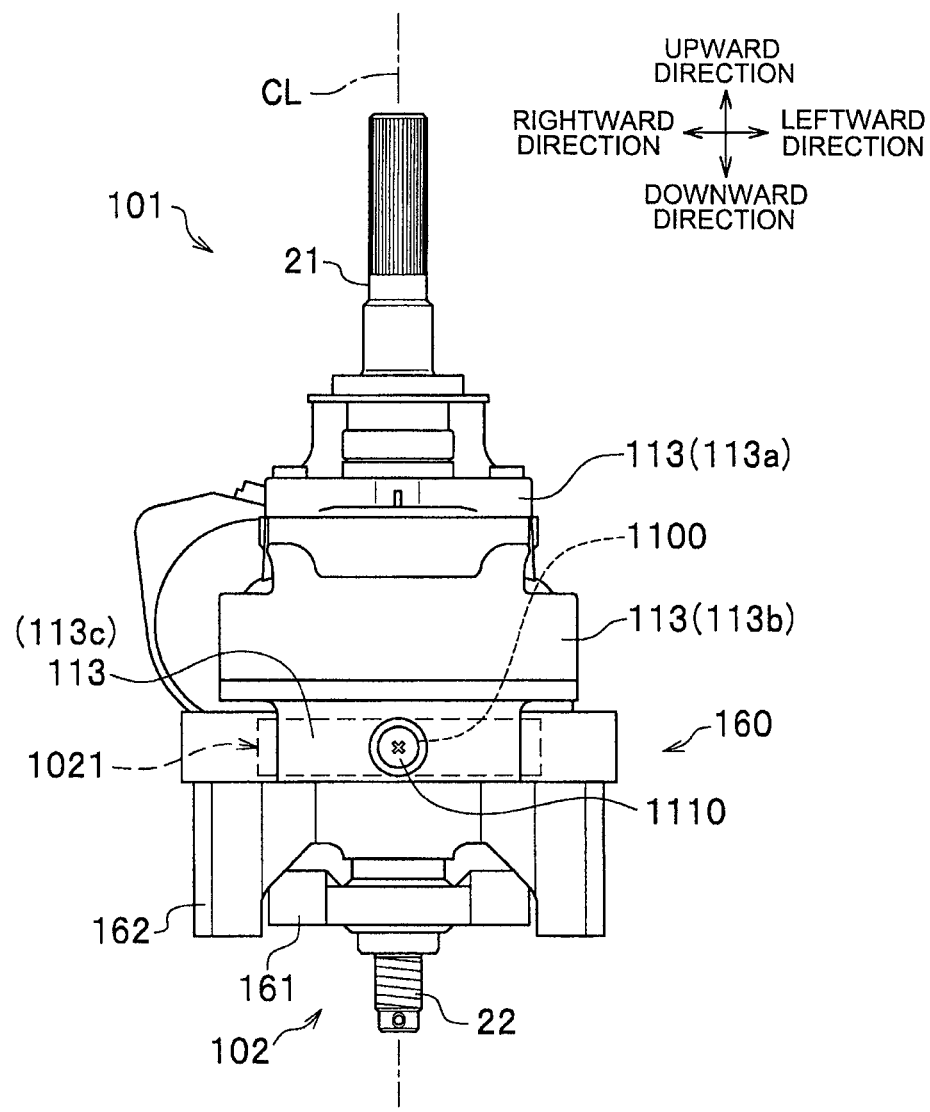
FIG. 15 is a view (3) illustrating the formation position of the measurement hole.

Hereinafter, the configuration of the arm stopper mechanism mounting apparatus 102 will be described with reference to FIGS. 12 to 15. FIG. 12 is a schematic side view illustrating the configuration of the arm stopper mechanism mounting apparatus 102 according to the first embodiment. In the example illustrated in FIG. 12, the electric motor 24 is attached to the arm stopper mechanism mounting apparatus 102. FIGS. 13 to 15 are views illustrating the formation position of the measurement hole 1100.

In the example illustrated in FIG. 12, candidate regions in the housing 113 for the formation of the measurement hole 1100 are: upper surface portions 1011, 1012; side surface portions 1021; and lower surface portions 1031, 1032. The upper surface portions 1011, 1012 and the lower surface portions 1031, 1032 are made into flat surfaces which are disposed in a substantially horizontal direction. The side surface portion 1021 is made into a curved surface having a cylindrical arc shape.

The following members are attached to the measurement hole 1100: a sealing member such as a screw 1110 (refer to FIGS. 12 to 15) or a cover member 1120 (refer to FIGS. 17A to 18) which will be described later; and a measurement fixture 1201 (refer to FIGS. 16A and 16B) which will be described later.

It is possible to form the measurement hole 1100 not only in one of the candidate regions (the upper surface portions 1011, 1012, the side surface portion 1021, and the lower surface portions 1031, 1032 of the housing 113) illustrated in FIG. 12, but also in a region which is not illustrated. For example, in the example illustrated in FIGS. 12 and 13, the measurement hole 1100 is formed in the upper surface portion 1012 of the second housing 113b. In contrast, in the example illustrated in FIGS. 14 and 15, the measurement hole 1100 is formed in the side surface portion 1021 of the third housing 113c.

As illustrated in FIGS. 14 and 15, the measurement hole 1100 is preferably positioned in the side surface portion 1021 of the housing 113, rather than the upper surface portions 1011, 1012 and the lower surface portions 1031, 1032 of the housing 113.

The reason for this is that flying debris such as dust or mud, or water can be efficiently prevented from intruding into the interior of the housing 113. That is, flying debris such as dust or mud, or water is likely to pile up on the upper surface portions 1011, 1012 of the housing 113. Mud or the like splashed by the wheels (front wheels) 9 (refer to FIG. 2) is likely to adhere to the lower surface portions 1031, 1032 of the housing 113. For this reason, if the measurement hole 1100 is formed in the upper surface portions 1011, 1012 or the lower surface portions 1031, 1032 of the housing 113, flying debris such as dust or mud, or water may intrude into the housing 113. In contrast, flying debris such as dust or mud, or water is relatively unlikely to adhere to the side surface portion 1021 of the housing 113. For this reason, when the measurement hole 1100 is formed in the side surface portion 1021 of the housing 113, it is possible to efficiently prevent flying debris such as dust or mud, or water from intruding into the housing 113.

In the schematic view illustrated in FIG. 14, the housing 113 includes the first housing 113a, the second housing 113b, and the third housing 113c, and the measurement hole 1100 is formed in the side surface portion 1021 of the third housing 113c, and the screw 1110 is attached to the measurement hole 1100. In the view illustrated in FIG. 15, the measurement hole 1100 is sealed with the screw 1110 attached to the measurement hole 1100.

Any circumferential region in the side surface portion 1021 of the housing 113 can be a candidate for the formation of the measurement hole 1100. For example, when selected from these candidate regions, the formation position of the measurement hole 1100 is preferably set, taking into consideration easiness of the attachment of the screw 1110 (refer to FIGS. 14 and 15) and the measurement fixture 1201 (refer to FIGS. 16A and 16B) which will be described later.

Method of Inspecting Sealability of Interior of Housing

In the first embodiment, for example, the sealability of the interior of the housing 113 is inspected by delivering air compressed at a given pressure into the housing 113 via the measurement hole 1100, leaving the housing 113 as it is for a while, and determining whether the internal pressure (pressure of the interior) of the housing 113 decreases.

Figure 16A:
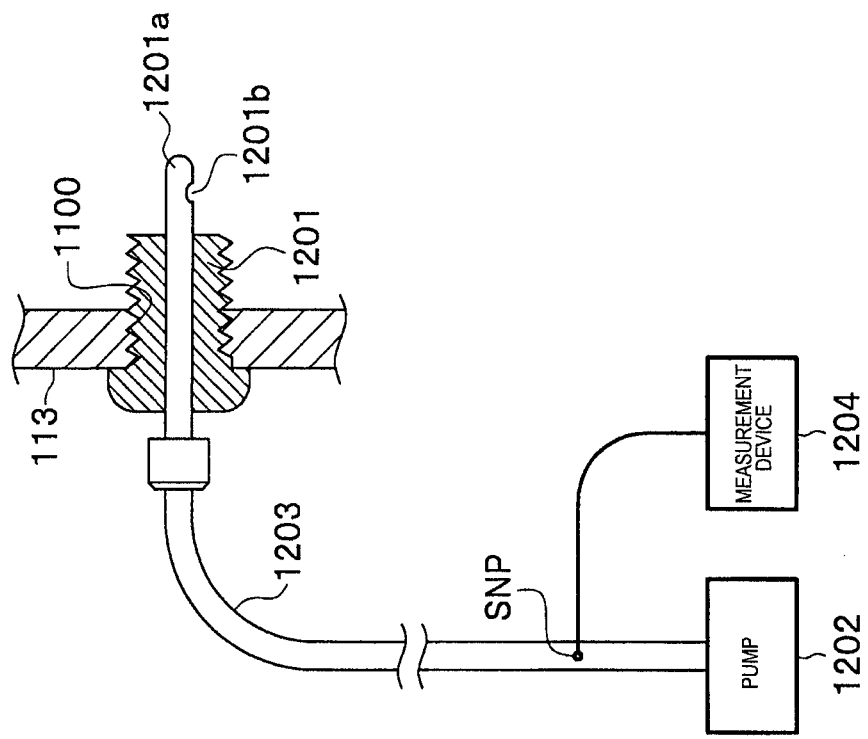
FIGS. 16A and 16B are views illustrating a method of inspecting the sealability of the interior of the housing.
Figure 16B:
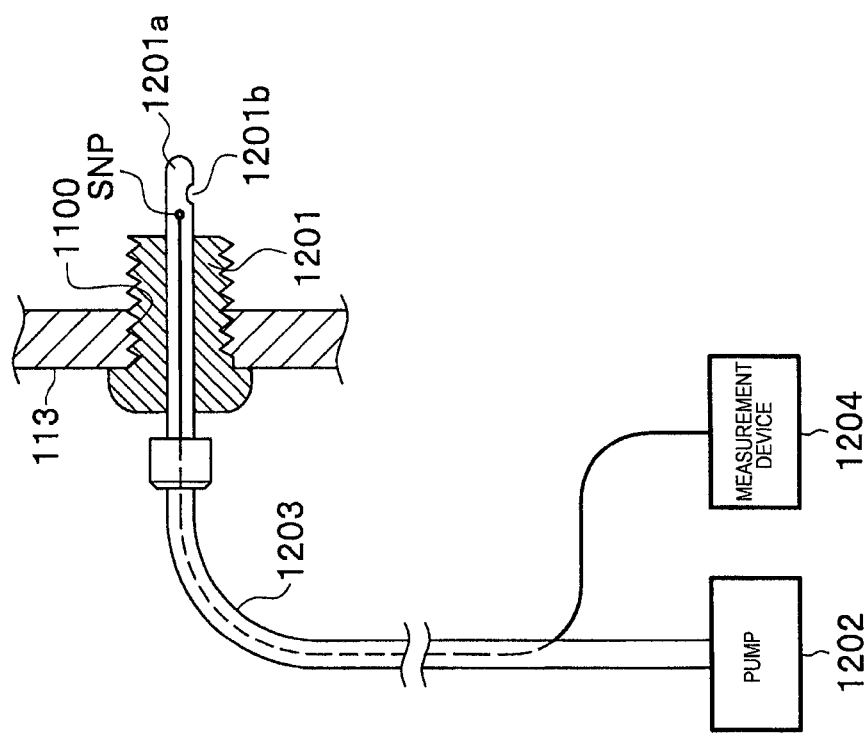

Hereinafter, a method of inspecting the sealability of the interior of the housing 113 will be described with reference to FIGS. 16A and 16B. FIGS. 16A and 16B are views illustrating a method of inspecting the sealability of the interior of the housing 113. In the example schematically illustrated in FIG. 16A, a pressure sensor SNP is installed in the housing 113, and the internal pressure of the housing 113 is directly measured. In contrast, in the example schematically illustrated in FIG. 16B, the pressure sensor SNP is installed in a hose 1203, and the internal pressure of the housing 113 is indirectly measured by measuring the internal pressure of the hose 1203. The description herein will be given based on an assumption that the measurement hole 1100 is formed in the side surface portion 1021 of the housing 113 (refer to FIG. 15).

As illustrated in FIGS. 16A and 16B, for example, the measurement fixture 1201 is attached to the measurement hole 1100 so as to inspect the sealability of the interior of the housing 113. The measurement fixture 1201 is a fixture for measuring the internal pressure of the housing 113.

In the example which is illustrated, a male screw is formed in an outer circumferential surface of the measurement fixture 1201, and the measurement fixture 1201 is formed of an axial member, through the interior of which a hollow needle member 1201a passes in an axial direction. In the example which is illustrated, a female screw is formed in the measurement hole 1100.

When the measurement fixture 1201 is attached to the measurement hole 1100, a tip end portion (in the example which is illustrated, an end portion that is disposed further to the right than the housing 113) of the needle member 1201a is disposed in an inner space of the housing 113. A discharge port 1201b for discharging air is formed in the tip end portion of the needle member 1201a.

In contrast, when the measurement fixture 1201 is attached to the measurement hole 1100, a rear end portion (in the example which is illustrated, an end portion that is disposed further to the left than the housing 113) of the needle member 1201a is disposed outside of the housing 113. The hose 1203 is attached to the rear end portion of the needle member 1201a. The hose 1203 is connected to a pump 1202 for delivering compressed air.

A measurement device 1204 is installed in the vicinity of the pump, and measures the pressure of the installation region of the pressure sensor SNP based on the value of a detection signal output from the pressure sensor SNP.

In the example illustrated in FIG. 16A, the pressure sensor SNP together with the needle member 1201a is inserted into the housing 113, and is installed in the housing 113. In contrast, in the example illustrated in FIG. 16B, the pressure sensor SNP is installed in the hose 1203. An inner space of the hose 1203 communicates with the inner space of the housing 113. For this reason, the internal pressure of the hose 1203 (pressure of the inner space of the hose 1203) has the same value as the internal pressure of the housing 113 (pressure of the inner space of the housing 113).

The pressure sensor SNP outputs a detection signal of a value indicative of the pressure of the installation region to the measurement device 1204. In the example illustrated in FIG. 16A, the measurement device 1204 can directly measure the internal pressure of the housing 113 based on the value of a detection signal output from the pressure sensor SNP. In the example illustrated in FIG. 16B, the measurement device 1204 can measure the internal pressure of the hose 1203 based on the value of a detection signal output from the pressure sensor SNP, and thereby the measurement device 1204 can indirectly measure the internal pressure of the housing 113.

In this configuration, an inspector operates the pump 1202 to deliver air compressed at a given pressure into the housing 113 via the hose 1203 and the needle member 1201a.

Thereafter, the inspector stops the pump 1202, and leaves the arm stopper mechanism mounting apparatus 102 as it is for a while. If the interior of the housing 113 is perfectly sealed, air in the housing 113 does not leak to the outside, and thereby the internal pressure of the housing 113 does not decrease. In contrast, if the interior of the housing 113 is imperfectly sealed, air in the housing 113 leaks to the outside, and thereby the internal pressure of the housing 113 decreases. Accordingly, the sealability of the interior of the housing 113 can be inspected using this principle.

The inspector compares the internal pressure of the housing 113 when the pump 1202 is stopped with the internal pressure of the housing 113 after the arm stopper mechanism mounting apparatus 102 is left as it is for a while after the pump 1202 is stopped.

When the result of the comparison confirms that the internal pressure of the housing 113 does not decrease (speaking strictly, a decrease in the internal pressure does not exceed a predetermined allowable range), the inspector determines that the interior of the housing 113 is perfectly sealed. In this case, first, the inspector detaches the measurement fixture 1201 from the measurement hole 1100, and then attaches the screw 1110 (refer to FIG. 15) to the measurement hole 1100. In this manner, the measurement hole 1100 is sealed by the inspector. The attached members such as the upper holder 46 (refer to FIG. 2) and the electric motor 24 (refer to FIG. 2) are attached to the arm stopper mechanism mounting apparatus 102 (refer to FIG. 15) with the measurement hole 1100 sealed, and then the assembly unit can be used as the motor-driven power steering apparatus 101.

It is possible to detach the screw 1110 from the measurement hole 1100. Accordingly, when inspecting the sealability of the interior of the housing 113, the inspector detaches the screw 1110 from the measurement hole 1100, attaches the measurement fixture 1201 to the measurement hole 1100, and then can perform an inspection process.

In contrast, when the result of the comparison confirms that the internal pressure of the housing 113 decreases (speaking strictly, a decrease in the internal pressure exceeds the predetermined allowable range), the inspector determines that the interior of the housing 113 is imperfectly sealed. In this case, since the arm stopper mechanism mounting apparatus 102 is not suitable for use, the arm stopper mechanism mounting apparatus 102 is scrapped or repaired.

Modification Example of Sealing Member

In the example illustrated in FIG. 15, the inspector seals the measurement hole 1100 by attaching the screw 1110 to the measurement hole 1100. However, for example, the inspector may seal the measurement hole 1100 by attaching the cover member 1120 illustrated in FIGS. 17A to 18 to the measurement hole 1100. The cover member 1120 is a sealing member with a ventilation mechanism 1121 that does not allow liquid to pass therethrough, but allows gas (here, air) to pass therethrough.

Figure 17A:
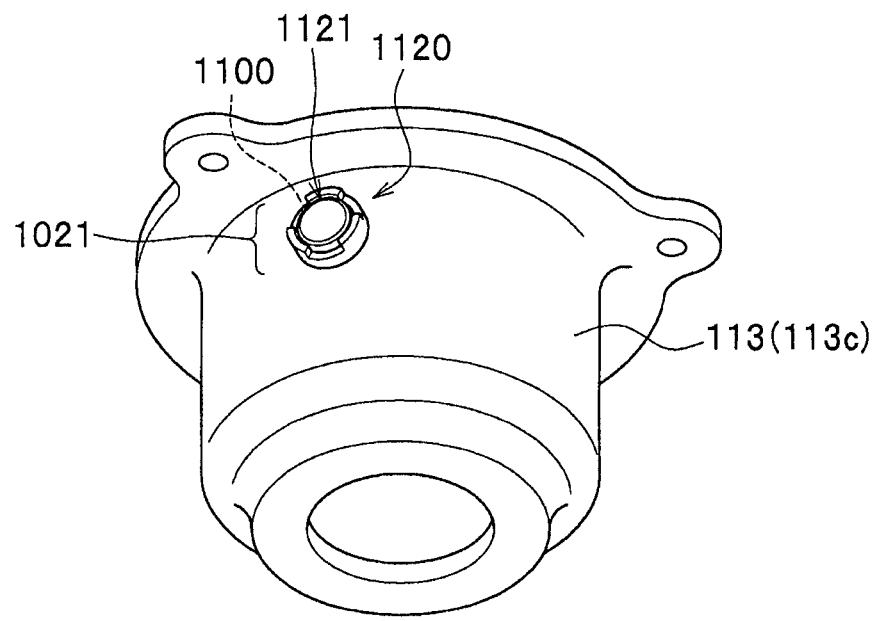
FIGS. 17A and 17B are schematic views illustrating the configuration of a cover member according to the first embodiment.
Figure 17B:
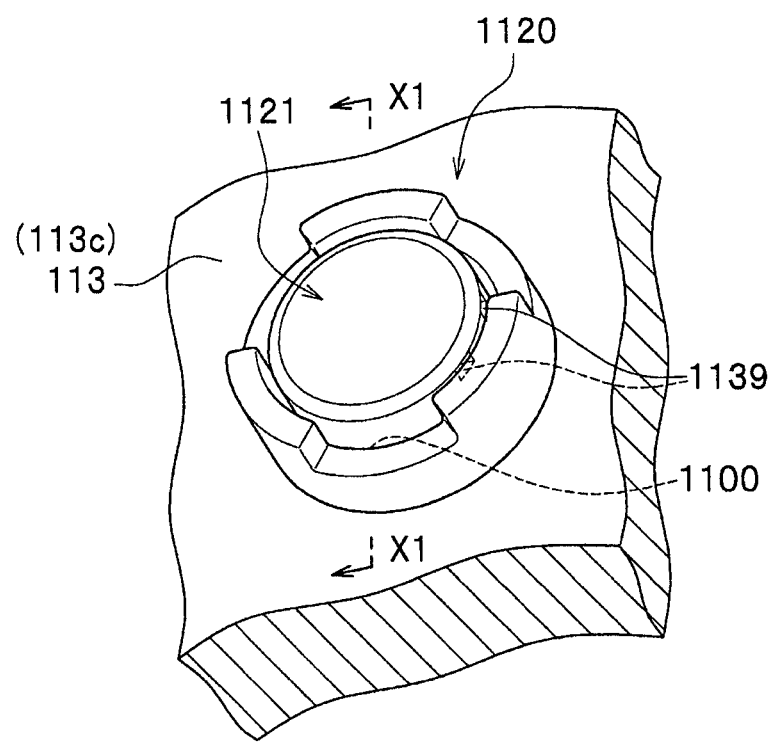
Figure 18:
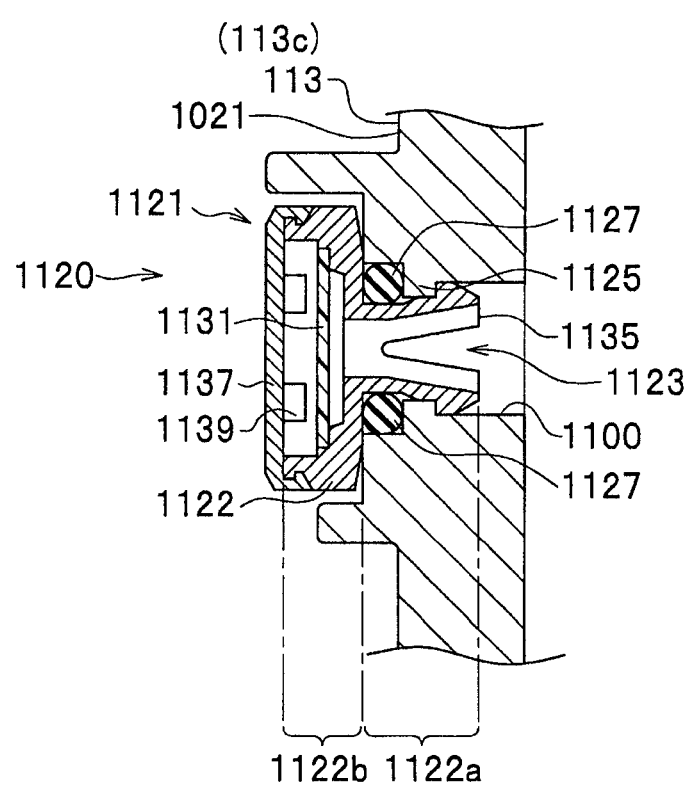
FIG. 18 is a schematic cross-sectional side view of the cover member according to the first embodiment.

Hereinafter, the configuration of the cover member 1120 will be described with reference to FIGS. 17A to 18. FIGS. 17A and 17B are schematic views illustrating the configuration of the cover member 1120 according to the first embodiment. In the view schematically illustrated in FIG. 17A, the measurement hole 1100 is formed in the side surface portion 1021 of the third housing 113c, and the cover member 1120 according to a modification example is attached to the measurement hole 1100. FIG. 17B is an enlarged schematic view illustrating the configuration of the cover member 1120. FIG. 18 is a schematic cross-sectional side view of the cover member 1120 according to the first embodiment. FIG. 18 is a schematic view illustrating the configuration of a cut surface of the cover member 1120 taken along line X1-X1 illustrated in FIG. 17B.

In the example illustrated in FIGS. 17A and 17B, the cover member 1120 is attached to the measurement hole 1100. The measurement hole 1100 functions as an air flow path between the inner space and the outer space of the housing 113. In the description herein, the measurement hole 1100 may be made as not only a screw hole having a female screw, but also a circular hole having an engaging portion 1125 illustrated in FIG. 18. The engaging portion 1125 is made as a protruding portion that protrudes radially inward from an inner circumferential surface of the measurement hole 1100.

As illustrated in FIG. 18, a housing 1122 of the cover member 1120 includes a tip end portion 1122a that is inserted into the measurement hole 1100, and a rear end portion 1122b that is disposed on an outer side of the measurement hole 1100. The housing 1122 is made of a resin material. In the example which is illustrated, both the tip end portion 1122a and the rear end portion 1122b are made to have a substantially cylindrical shape. The outer diameter of the tip end portion 1122a is substantially the same as the inner diameter of the measurement hole 1100. The outer diameter of the rear end portion 1122b is greater than the outer diameter of the tip end portion 1122a.

A hooking portion 1135 is formed in the vicinity of the tip of the tip end portion 1122a, and protrudes radially from an outer circumferential surface of the tip end portion 1122a. The hooking portion 1135 is made of a resin material like the housing 1122, and functions as a snap fit connection. For example, an O-ring 1127 which is an elastic member is mounted on an outer circumferential surface of the tip end portion of the cover member 1120, and the tip end portion with the O-ring 1127 mounted thereon is inserted into the measurement hole 1100. At this time, the hooking portion 1135 is subjected to elastic deformation, and is engaged with the engaging portion 1125 of the measurement hole 1100. Accordingly, the cover member 1120 is attached to the measurement hole 1100 of the housing 113. At this time, the O-ring 1127 seals the gap between the outer circumferential surface of the tip end portion 1122a of the cover member 1120 and the inner circumferential surface of the measurement hole 1100.

The description herein is given based on an assumption that the cover member 1120 is attached to the measurement hole 1100 using the hooking portion 1135; however, the cover member 1120 may be attached (fixed) to the measurement hole 1100 using a well-known attachment method (fixation method) such as adhesion, welding, or screwing.

A ventilation hole 1123 is formed so as to pass through the housing 1122 from the tip end portion 1122a to the rear end portion 1122b in an axial direction.

A ventilation film 1131 is disposed in the housing 1122, and divides the ventilation hole 1123 into a space near the tip end portion 1122a and a space near the rear end portion 1122b. The ventilation film 1131 has breathability, and is a film-shaped member that prevents the intrusion of water, mud, or the like from the outside. That is, the ventilation film 1131 is a film-shaped member that has breathability, waterproofing properties, and dust resistance. For example, a tetrafluoroethylene film can be used as the ventilation film 1131. The cover member 1120 includes the ventilation mechanism 1121 using the ventilation film 1131, which does not allow liquid to pass therethrough, but allows gas (here, air) to pass therethrough. The ventilation film 1131 is disposed so as to be orthogonal to the axial direction of the housing 1122.

A cover 1137 is attached to a rear end surface of the rear end portion 1122b (in the example illustrated in FIG. 18, a left end surface of the rear end portion 1122b) of the housing 1122. The cover 1137 is a member that covers the ventilation film 1131 while being positioned a given distance or greater away from the ventilation film 1131. The cover 1137 is made of a resin material. The cover 1137 is made to have a substantially circular plate shape, and the same outer diameter as the rear end portion 1122b of the housing 1122. The cover 1137 prevents the ventilation film 1131 from being damaged due to the collision of a small stone or the like with the ventilation film 1131.

The cover 1137 seals the ventilation hole 1123 near the rear end surface of the rear end portion 1122b. Through-holes 1139 are formed in a side wall surface in the vicinity of a rear end of the rear end portion 1122b of the housing 1122. The through-holes 1139 in the side wall surface of the rear end portion 1122b are positioned closer to the rear end surface than the disposition position of the ventilation film 1131. The through-holes 1139 allow an outer space of the rear end portion 1122b to communicate with the ventilation hole 1123 in the rear end portion 1122b. Accordingly, the cover member 1120 can take outside air into the ventilation hole 1123 via the through-holes 1139, or discharge inside air to the outside via the through-holes 1139.

With this configuration, similar to the screw 1110 (refer to FIG. 15), the cover member 1120 can prevent flying debris such as dust or mud, or water from intruding into the housing 113 from the outside.

However, different from the screw 1110 (refer to FIG. 15), even though air in the housing 113 expands due to the heated housing 113, the cover member 1120 can discharge the expanded air to the outside of the housing 113. For this reason, the cover member 1120 can prevent the expansion of air from causing a harmful influence (for example, a high load being applied to the seal member having relatively low pressure resistance).

Hereinafter, this point will be described in detail. When the motor-driven power steering apparatus 101 is used in a severe environment, for example, at high altitude in which the ambient pressure is low and the ambient temperature is high, the housing 113 is likely to be heated. When the housing 113 is heated, air in the housing 113 expands. When the sealing member such as the screw 1110 (refer to FIGS. 14 and 15) is used, air in the housing 113 is not discharged to the outside of the housing 113, and the expanded air stays in the housing 113 as it is. For this reason, the internal pressure of the housing 113 increases in association with the expansion of air. When the internal pressure of the housing 113 increases, a high load is applied to the members that are disposed in the housing 113. As a result, a harmful influence (for example, a high load being applied to the seal member having relatively low pressure resistance) may occur. In contrast, when the sealing member is the cover member 1120 (refer to FIGS. 17A to 18), the expanded air in the housing 113 is discharged to the outside of the housing 113 via the ventilation hole 1123, the ventilation film 1131, and the through-holes 1139. For this reason, the internal pressure of the housing 113 does not increase considerably. Accordingly, the cover member 1120 can prevent the expansion of air from causing a harmful influence (for example, a high load being applied to the seal member having relatively low pressure resistance).

The cover member 1120 can be detached from the measurement hole 1100. Accordingly, when inspecting the sealability of the interior of the housing 113, the inspector detaches the cover member 1120 from the measurement hole 1100, attaches the measurement fixture 1201 to the measurement hole 1100, and then can perform an inspection process.

As described above, it is possible to reduce the value of the bending load vector Wt applied to the output shaft 22 by mounting the arm stopper mechanism 160 on the arm stopper mechanism mounting apparatus 102 according to the first embodiment. Accordingly, it is possible to reduce a load applied to the bearings 32A and 32B that support the output shaft 22; the bearing 31 (refer to FIG. 3) that supports the input shaft 21 which is connected to the output shaft 22 via the torsion bar 27; and the housing 113 (refer to FIG. 3) in the vicinity of the bearings 32A, 32B, and 31. Since a bending load is prevented from being applied to the output shaft 22, the bending load as a strong reaction force does not propagate to the handlebars 2, and thus it is possible to improve the controllability of the handlebars 2. It is possible to reduce the size of the steering arm 161. Since the motor-driven power steering apparatus 101 is equipped with the arm stopper mechanism mounting apparatus 102, the motor-driven power steering apparatus 101 can improve the controllability of the handlebars 2.

In the arm stopper mechanism mounting apparatus 102 according to the first embodiment, it is possible to inspect the sealability of the interior of the housing 113 using the measurement hole 1100. For this reason, in the arm stopper mechanism mounting apparatus 102, it is possible to confirm the waterproofing properties and the dust resistance of the housing 113.

After the waterproofing properties and the dust resistance of the housing 113 are confirmed, the measurement hole 1100 of the arm stopper mechanism mounting apparatus 102 is sealed with the sealing member such as the screw 1110 (refer to FIG. 15) or the cover member 1120 (refer to FIGS. 17A to 18). Accordingly, the arm stopper mechanism mounting apparatus 102 is kept in a state where waterproofing performance and dust resistance performance of the housing 113 are ensured. For this reason, in the arm stopper mechanism mounting apparatus 102, and the motor-driven power steering apparatus 101 equipped with the arm stopper mechanism mounting apparatus 102, it is possible to prevent flying debris such as dust or mud, or water from intruding into the housing 113.

Second Embodiment

In the arm stopper mechanism 160 according to the first embodiment, the striking surfaces 176 are respectively provided in the side portions of the main body (portion to which the tie rods 8 are attached) of the steering arm 161. In the configuration of the steering arm 161, the striking portions 174 with the striking surface 176 project outward (in a turning direction) so that the maximum steering angle of the handlebars 2 is defined.

In contrast, in the configuration of an arm stopper mechanism 260 according to a second embodiment, the striking portions do not project outward. Except for the point that, instead of the arm stopper mechanism 160 according to the first embodiment, the arm stopper mechanism 260 according to the second embodiment is mounted, an arm stopper mechanism mounting apparatus 202 (refer to FIG. 19) and a motor-driven power steering apparatus 201 (refer to FIG. 19) according to the second embodiment are the same as the arm stopper mechanism mounting apparatus 102 (refer to FIG. 2) and the motor-driven power steering apparatus 101 (refer to FIG. 2) according to the first embodiment.

Configuration of Arm Stopper Mechanism according to Second Embodiment

Figure 19:
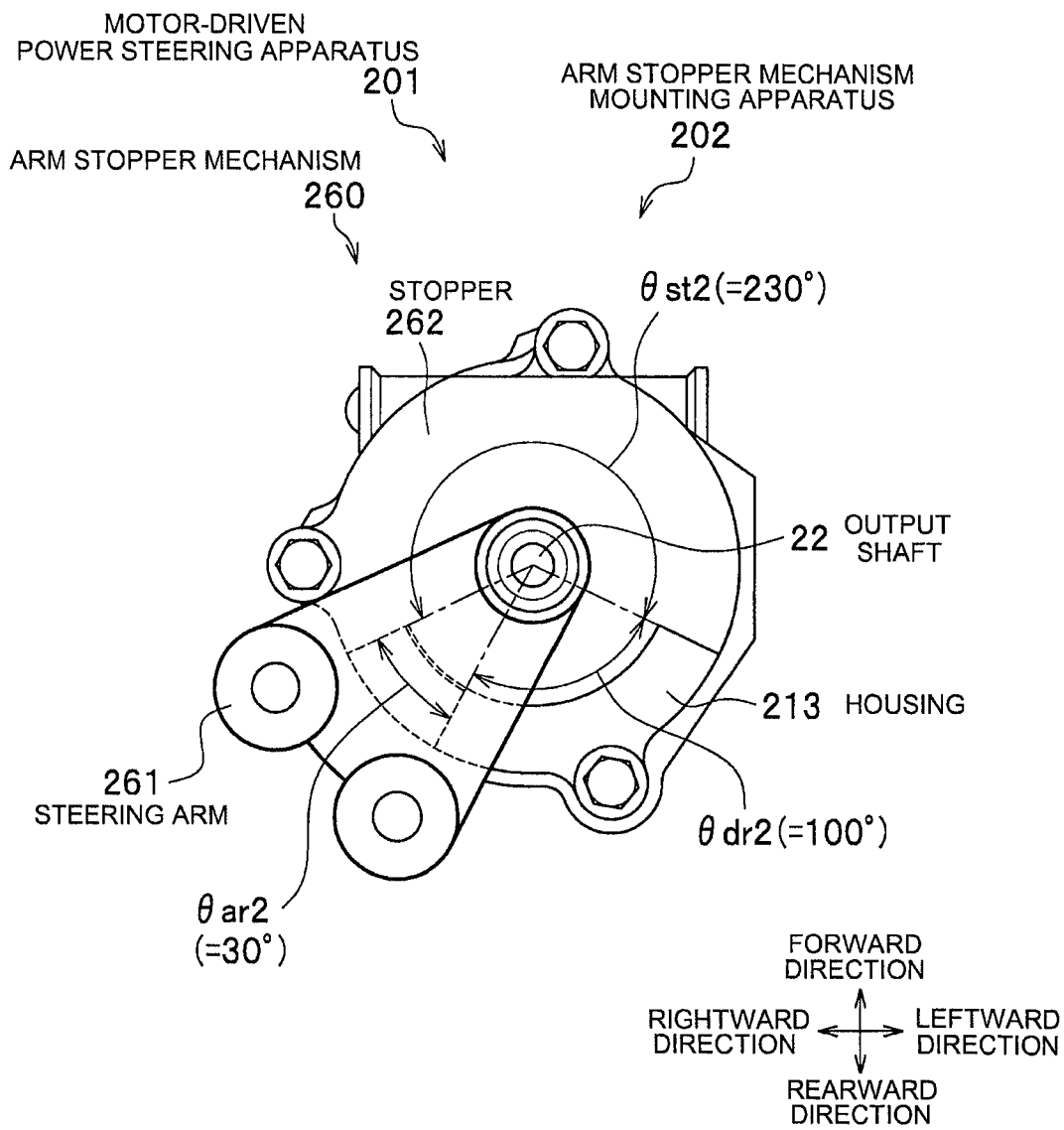
FIG. 19 is a schematic bottom view illustrating the configuration of an arm stopper mechanism according to a second embodiment.
Figure 21:
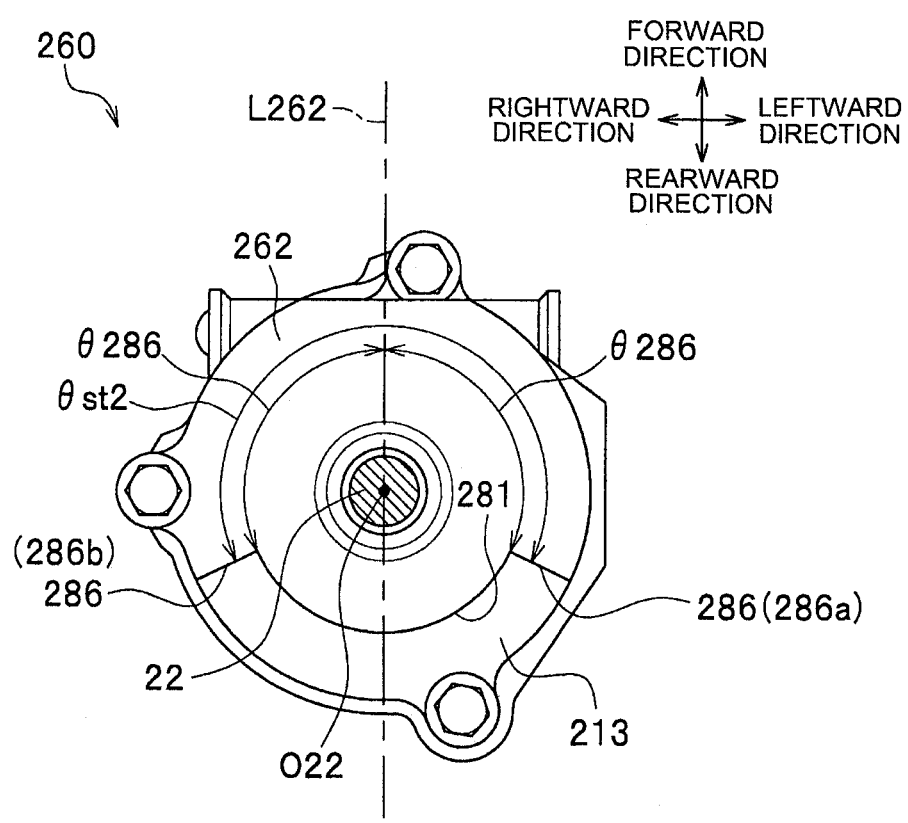
FIG. 21 is a schematic bottom view illustrating the configuration of a stopper of the arm stopper mechanism according to the second embodiment.

Hereinafter, the configuration of the arm stopper mechanism 260 according to the second embodiment will be described with reference to FIGS. 19 to 21. FIG. 19 is a schematic bottom view illustrating the configuration of the arm stopper mechanism 260. FIGS. 20A to 20C are schematic bottom views illustrating the configuration of a steering arm 261 of the arm stopper mechanism 260. FIG. 20A illustrates the configuration of portions of the steering arm 261, FIG. 20B is a side view illustrating the configuration of the steering arm 261, and FIG. 20C illustrates the disposition position of each portion of the steering arm 261. FIG. 21 is a schematic bottom view illustrating the configuration of a stopper 262 of the arm stopper mechanism 260. FIG. 21 illustrates the configuration of portions of the stopper 262.

FIG. 19 is a bottom view illustrating the configuration of the arm stopper mechanism 260. As illustrated in FIG. 19, the arm stopper mechanism 260 includes the steering arm 261 that turns about the output shaft 22, and the stopper 262.

As illustrated in FIG. 20B, the entirety of a main body (portion to which the tie rods 8 is attached) of the steering arm 261 has a plate shape. As illustrated in FIGS. 19 and 20A, in a bottom view, the steering arm 261 is deployed in a fan shape, the center angle of which is an acute angle. As illustrated in FIGS. 20A to 20C, the steering arm 261 is made into a shape in which an output shaft hole 271 is disposed at the position of a pivot (center axis) of the fan shape, and two tie rod holes 272a and 272b are respectively disposed in the vicinities of the opposite wings at a free end (outer circumferential edge) of the fan shape. Hereinafter, the tie rod holes 272a and 272b are referred to as a "tie rod hole 272" as a generic term.

The output shaft 22 is fitted into the output shaft hole 271, and thereby the center point of the output shaft hole 271 coincides with the center point O22 of the output shaft 22. Hereinafter, the center point of the output shaft hole 271 is referred to as the "center point O22".

When the steering arm 261 is in a neutral state, the tie rod holes 272a and 272b are respectively disposed at positions which are equally separated from a center line L261 of the steering arm 261 to the left and the right. In the example illustrated in FIG. 20C, a center point O272 of each of the tie rod holes 272a and 272b is disposed at a position which is present at the rear of the center point O22 of the output shaft hole 271, and which is separated by a distance of H272 from the center line L261 of the steering arm 261 to the right or the left.

In the description herein, the "center line L261 of the steering arm 261" is an imaginary straight line that passes through the center point O22 of the output shaft hole 271 and extends in the longitudinal direction. When the steering angle of the handlebars 2 is 0° (in a neutral state), the "center line L261 of the steering arm 261" coincides with a "center line L262 (refer to FIG. 21) of the stopper 262" which will be described later. The "center line L262 of the stopper 262" is a center line (imaginary straight line that passes through the center point of the vehicle in the lateral direction and extends in the longitudinal direction of the vehicle) of the entirety of the vehicle.

The steering arm 261 includes a circular arc portion 278 that surrounds the output shaft hole 271, and the surrounding shape of the circular arc portion 278 is a circular arc (circular) shape. The steering arm 261 includes a protruding portion 274 that protrudes upward from the vicinity of the center of a top surface of the main body (portion to which the tie rods 8 are attached) of the steering arm 261 (refer to FIGS. 20A and 20B), and the protruding portion 274 functions as a striking portion that strikes against the stopper 262. Hereinafter, the protruding portion 274 is referred to as a "striking portion 274".

The striking portion 274 include flat surfaces 276a and 276b which are formed in side portions of the striking portion 274, respectively, and the flat surfaces 276a and 276b function as striking surfaces which strike against the stopper 262. Hereinafter, the flat surfaces 276a and 276b are respectively referred to as "striking surfaces 276a and 276b". The striking surfaces 276a and 276b are referred to as a "striking surface 276" as a generic term.

In FIG. 20C, a line L276a is an imaginary straight line that is disposed along the striking surface 276a. A line L276b is an imaginary straight line that is disposed along the striking surface 276b.

In contrast, the stopper 262 is provided to protrude downward from a lower surface of a housing 213 of a motor-driven power steering apparatus 201. As illustrated in FIG. 21, when seen from below, the shape of the stopper 262 is made by cutting away a cut-away portion 281 from a substantially circular shape, and the cut-way portion 281 is one third of a circular arc, and the center of the circular arc is the center point O22 of the output shaft 22. End surfaces 286a and 286b of the stopper 262 function as contact surfaces, and are formed on circumferential outer sides of the stopper 262 by cutting away the cut-away portion 281. Hereinafter, the end surfaces 286a and 286b are respectively referred to as "contact surfaces 286a and 286b". The contact surfaces 286a and 286b are referred to as a "contact surface 286" as a generic term.

In the description herein, the "center line L262 of the stopper 262" is an imaginary straight line that passes through the center point O22 of the output that 22 and extends in the longitudinal direction. The "center line L262 of the stopper 262" is the center line of the entirety of the vehicle.

As can be understood from the characteristics of the arm stopper mechanism 60 according to the comparative example illustrated in FIG. 28A, and the arm stopper mechanism according to the first and second review examples illustrated in FIGS. 28B and 28C, it is possible to increase the angle θhb (refer to FIG. 22) made by the respective directions of the input load vector Wh and the striking load vector Wb, by decreasing an angle θ276 (refer to FIG. 20C) made by the center line L261 and the striking surface 276 in the steering arm 261, or by increasing an angle θ286 (refer to FIG. 21) made by the center line L262 and the contact surface 286 in the stopper 262. Accordingly, in the arm stopper mechanism 260, the input load vector Wh and the striking load vector Wb can be applied to cancel each other out, and thereby it is possible to reduce the value of the bending load vector Wt applied to the output shaft 22.

In the steering arm 261 of the arm stopper mechanism 260, the angle θ276 (refer to FIG. 20C) made by the center line L261 and the striking surface 276 in the steering arm 261 is set to be smaller than the angle θ76 (refer to FIG. 28C) of the steering arm 61 of the arm stopper mechanism 60 according to the comparative example. That is, in the stopper 262 of the arm stopper mechanism 260, the angle θ286 (refer to FIG. 21) made by the center line L262 and the contact surface 286 in the stopper 262 is set to be smaller than the angle θ86 (refer to FIG. 28A) of the stopper 62 of the arm stopper mechanism 60 according to the comparative example.

The arm stopper mechanism 260 is required to restrict the turning angle of the handlebars 2 to an angle smaller than the maximum steering angle in order for the vehicle not to roll over in the lateral direction. For this reason, for example, in the steering arm 261 of the arm stopper mechanism 260, an optimum disposition angle of the striking surface 276 with respect to the center line L261 is set to the tilt angle θ276 of each of the imaginary straight lines L276a and L276b with respect to the center line L261, in which each of the straight lines connects the center point O272 of the tie rod hole 272 and the center point O22 of the output shaft hole 271, and a design tilt angle allowable with respect to the angle θ276 is set to an angle of θβ (for example 5°) so that the maximum steering angle of the handlebars 2 can be defined.

In order to satisfy these conditions, the arm stopper mechanism 260 is configured as follows: the striking surfaces 276a and 276b of the steering arm 261 are disposed to be tilted by an angle of (θ276±θβ)° in opposite directions with respect to the center line L261, and the center of the tilting is the center point O22 of the output shaft hole 271 (refer to FIG. 20C). That is, an angle θar2 made by the striking surfaces 276a and 276b of the steering arm 261

(angle between the two striking surfaces 276a and 276b, and an angle formed in the steering arm 261) is set to an angle of $(2\times(\theta 276\pm\theta\beta))°$.

For example, in the configuration of the arm stopper mechanism 260 illustrated in FIG. 19, the tilt angle θ276 of each of the straight lines L276a and L276b is set to be 15° (that is, the angle θar2 made by the striking surfaces 276a and 276b (refer to FIGS. 20A to 20C) of the steering arm 261 is set to be 30°), and the allowable tilt angle θβ is set to be 0°. In the example illustrated in FIG. 19, in the arm stopper mechanism 260, the angle θar2 made by the striking surfaces 276a and 276b (refer to FIGS. 20A to 20C) of the steering arm 261 is set to be 30°. An angle θst2 made by the contact surfaces 286a and 286b (refer to FIG. 21) of the stopper 262 (angle between two contact surfaces 286a and 286b, and an angle formed in the stopper 262) is set to be 230°. A total angle θdr2, which is the sum of the maximum clockwise steering angle and the maximum counter-clockwise steering angle of the steering arm 261, is set to be 100°.

Figure 22:
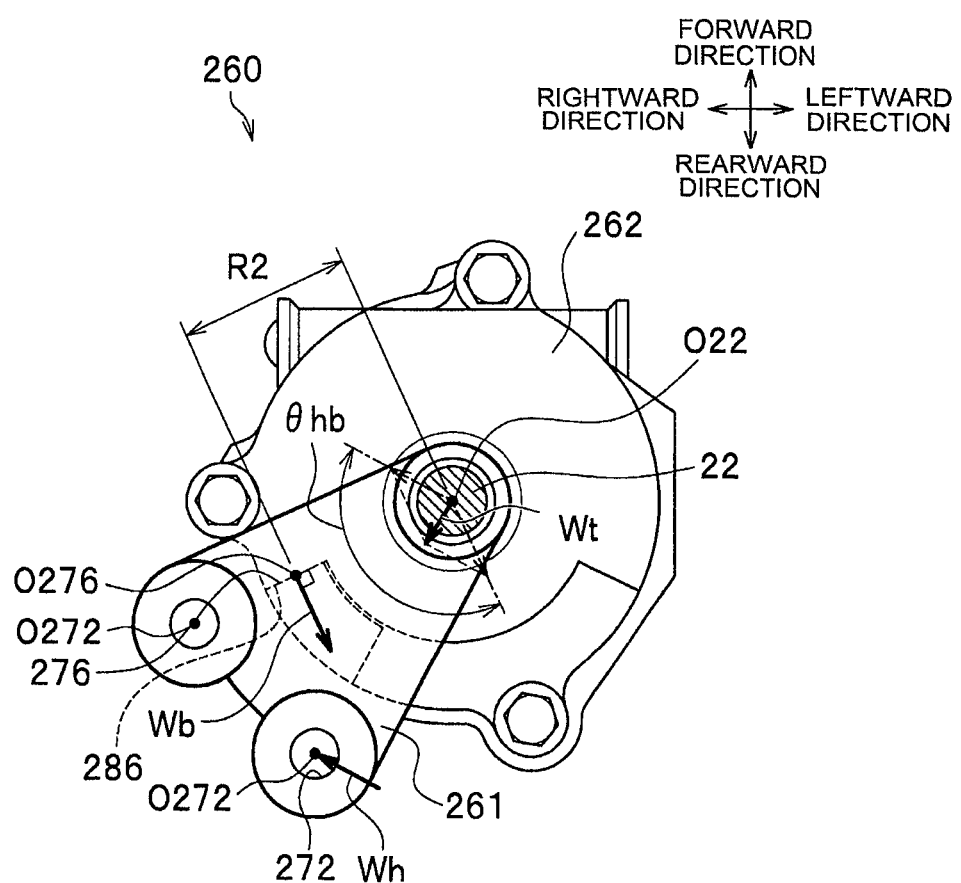
FIG. 22 is a view illustrating load vectors applied to main portions of the arm stopper mechanism according to the second embodiment.

Load Vectors Applied to Main Portions of Arm Stopper Mechanism according to Second Embodiment Hereinafter, load vectors applied to main portions of the arm stopper mechanism 260 will be described with reference to FIG. 22. FIG. 22 is a view illustrating the load vectors applied to the main portions of the arm stopper mechanism 260.

In the description herein, the "input load vector Wh" refers to a load vector that is input to the steering arm 261 from the wheel 9 (refer to FIG. 2) via the tie rod hole 272, the "striking load vector Wb" refers to a load vector that is applied to the striking surface 276 of the steering arm 261 from the contact surface 286 of the stopper 262, and the "bending load vector Wt" refers to a load vector that is applied to the output shaft 22 fitted into the output shaft hole 271 (refer to FIG. 20A).

In the description herein, a "striking center position O276" refers to a center position of a contact portion between the striking surface 276 of the steering arm 261 and the contact surface 286 of the stopper 262, and the striking load vector Wb is applied to the striking center position O276. In the example illustrated in FIG. 22, the striking center position O276 is set to a position which is present between the center point O22 of the output shaft 22 and the center point O272 of the tie rod hole 272, and which is separated by a distance of R2 from the center point O22 of the output shaft 22.

The description herein will be given based on an assumption that as illustrated in FIG. 22, the handlebars 2 are turned to the maximum steering angle in the counter-clockwise direction so as to turn the travelling saddle-type vehicle 100 to the left to the maximum, thereby the right striking surface 276b of the steering arm 261 striking the right contact surface 286b of the stopper 262, and the rear of the side surface of the left wheel (the left front wheel) 9 colliding with the protrusion 511 (refer to FIG. 6). At this time, as illustrated in FIG. 22, in the arm stopper mechanism 260, the input load vector Wh is applied to the surroundings of the left tie rod hole 272, and the striking load vector Wb is applied to the striking center position O276. The bending load vector Wt, which is a combined vector of the input load vector Wh and the striking load vector Wb, is applied to the output shaft 22.

The value of the bending load vector Wt is the value of a combined vector of the input load vector Wh and the striking load vector Wb. When the striking surface 276 of the steering arm 261 is in contact with the contact surface 286 of the stopper 262, the direction of the input load vector Wh is determined by the attachment direction of the tie rod 8 (refer to FIG. 2) attached to the tie rod hole 272. The direction of the striking load vector Wb is perpendicular to the striking surface 276 of the steering arm 261.

In the arm stopper mechanism 260, since the configuration of each of the steering arm 261 and the stopper 262 is as described above, the input load vector Wh and the striking load vector Wb are applied to cancel each other out. For this reason, in the arm stopper mechanism 260, it is possible to reduce the value of the bending load vector Wt applied to the output shaft 22 to further than that applied to the arm stopper mechanism 60 according to the comparative example. For this reason, in the arm stopper mechanism 260, it is possible to reduce a bending load applied to the output shaft 22.

In particular, in the arm stopper mechanism 260, the value of the bending load vector Wt applied to the output shaft 22 is preferably set to be less than or equal to the value of a combined vector of the input load vector Wh and the striking load vector Wb which are orthogonal to each other. Accordingly, in the arm stopper mechanism 260, it is possible to considerably reduce the value of the bending load vector Wt applied to the output shaft 22, and thereby it is possible to efficiently reduce a bending load applied to the output shaft 22.

As described above, similar to the arm stopper mechanism 160 according to the first embodiment, in the arm stopper mechanism 260 according to the second embodiment, it is possible to reduce the value of the bending load vector Wt applied to the output shaft 22. Accordingly, it is possible to reduce a load applied to the bearings 32A and 32B which support the output shaft 22; the bearing 31 (refer to FIG. 3) that supports the input shaft 21 which is connected to the output shaft 22 via the torsion bar 27; and the housing 113 (refer to FIG. 3) in the vicinity of the bearings 32A, 32B, and 31. A bending load applied to the output shaft 22 is reduced, and thereby the bending load as a strong reaction force does not propagate to the handlebars 2, and it is possible to improve the controllability of the handlebars 2.

Besides, since the striking portion 274 of the steering arm 261 does not project outward (in the turning direction), it is possible to decrease the size of the arm stopper mechanism 260 further than the arm stopper mechanism 160 according to the first embodiment. Since the motor-driven power steering apparatus 201 is equipped with the arm stopper mechanism 260, the motor-driven power steering apparatus 201 can improve the controllability of the handlebars 2.

The present invention is not limited to the embodiments, and various modifications can be made to the present invention insofar as the modifications do not depart from the scope of the present invention. For example, the present invention can also be applied to a steering apparatus that does not supplement assist power (that is, without the electric motor 24).

Supplementary Note

An arm stopper mechanism according to the present invention preferably has a steering arm which turns about an output shaft of a steering apparatus, and to which two tie rods to which wheels are respectively connected are attached; and a stopper that is provided in the vicinity of the output shaft, and restricts the turning angle of the steering arm. The steering arm preferably includes an output shaft hole into which the output shaft is fitted; two tie rod holes to which the tie rods are respectively attached; and two striking surfaces that strike against the stopper. The stopper preferably includes two contact surfaces that are respectively brought into contact with the two striking surfaces of the steering arm, and the arm stopper mechanism is preferably configured in such a manner that an input load vector, which is input via the tie rod hole distant from the striking surface, and a striking load vector applied to the striking surface are applied to cancel each other out, when any one of the two striking surfaces of the steering arm strikes against the contact surface of the stopper. The two striking surfaces are preferably disposed in such a manner that a bending load vector applied to the output shaft fitted into the output shaft hole is smaller than or equal to the value of a combined vector of the input load vector and the striking load vector which are orthogonal to each other. The direction of the input load vector is determined by an attachment direction of the tie road attached to the tie rod hole. The direction of the striking load vector is perpendicular to the striking surface of the steering arm.

What is claimed is:

1. An arm stopper mechanism mounting apparatus comprising:
    an output shaft that outputs a steering force to wheels of a vehicle;
    a housing that is provided with an inspection hole for inspecting a sealability of an interior of the housing, and turnably accommodates the output shaft;
    a sealing member that seals the inspection hole, and is detachable from the inspection hole when the sealability is inspected; and
    an arm stopper mechanism that comprises
        a steering arm which turns about the output shaft while being positioned near a lower surface of the housing, and to which two tie rods, to which the wheels are respectively connected, are attached, and
        a stopper which is provided in a vicinity of the output shaft, and restricts an angle of the turning of the steering arm,
    wherein when an imaginary straight line that passes through the output shaft and extends in a longitudinal direction of the vehicle is defined as a center line of the steering arm, the steering arm comprises, in a neutral state:
    an output shaft hole which is provided on the center line, and into which the output shaft is fitted;
    two tie rod holes which are respectively provided at positions that are separated by a distance from the center line to a right and a left, and that are separated by a distance from the output shaft hole to a rear side of the vehicle, and to which the tie rods are respectively attached; and
    two striking surfaces which are respectively provided at positions that are separated by a distance from the center line to a right and a left, and that are separated by a distance from the output shaft hole to a rear side of the vehicle, and which are to strike against the stopper,
    the stopper comprises two contact surfaces that are respectively provided at positions that are separated by a distance from the center line to a right and a left, and that are present in a turning direction of the striking surfaces of the steering arm, and that are respectively to be brought into contact with the striking surfaces, and
    wherein an angle made by the two contact surfaces of the stopper is greater than an angle made by the two striking surfaces of the steering arm, and is 90° or greater.

2. The arm stopper mechanism mounting apparatus according to claim 1, wherein the inspection hole is positioned at a side surface of the housing.

3. The arm stopper mechanism mounting apparatus according to claim 2, wherein the sealing member has a ventilation mechanism that does not allow liquid to pass therethrough, but allows air to pass therethrough.

4. The arm stopper mechanism mounting apparatus according to claim 1, wherein the sealing member has a ventilation mechanism that does not allow liquid to pass therethrough, but allows air to pass therethrough.

5. A steering apparatus comprising:
    the arm stopper mechanism mounting apparatus according to claim 1; and
    attached members that comprise an upper holder which covers an upper portion of the housing, and that are attached to the arm stopper mechanism mounting apparatus.

6. A steering apparatus comprising:
    the arm stopper mechanism mounting apparatus according to claim 1;
    a motor; and
    a transmission mechanism that transmits a generated torque of the motor to the output shaft.

7. A steering apparatus comprising:
    the arm stopper mechanism mounting apparatus according to claim 1; and
    a steering mechanism that transmits a steering force of a driver to the output shaft.

* * * * *